(12) United States Patent
Paluri et al.

(10) Patent No.: US 11,889,071 B2
(45) Date of Patent: *Jan. 30, 2024

(54) VIDEO OR IMAGE CODING APPLYING ADAPTIVE LOOP FILTER

(71) Applicant: LG ELECTRONICS INC., Seoul (KR)

(72) Inventors: Seethal Paluri, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,653

(22) Filed: Sep. 21, 2022

(65) Prior Publication Data

US 2023/0107177 A1    Apr. 6, 2023

Related U.S. Application Data

(63) Continuation of application No. 17/570,237, filed on Jan. 6, 2022, now Pat. No. 11,601,645, which is a (Continued)

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/176* (2014.11);
(Continued)

(58) Field of Classification Search
CPC .... H04N 19/117; H04N 19/13; H04N 19/132; H04N 19/159; H04N 19/176;
(Continued)

(56) References Cited

U.S. PATENT DOCUMENTS

| 2013/0101018 A1* | 4/2013 | Chong | H04N 19/82 375/E7.026 |
| 2016/0234492 A1 | 8/2016 | Li et al. | |

(Continued)

FOREIGN PATENT DOCUMENTS

| CN | 103460699 A | 12/2013 |
| CN | 103535035 A | 1/2014 |

(Continued)

OTHER PUBLICATIONS

Jonathan Taquet, et al., "Non-CE5: Complementary results of tests CE5-3 on Non-Linear ALF", Joint Video Experts Team (JVET) of ITU-T SG 16 WP 3 and ISO/IEC JTC 1/SC 29/WG 11, 14th Meeting: Geneva, CH, Mar. 19-27, 2019. JVET-N0243.

(Continued)

*Primary Examiner* — Md N Haque
(74) *Attorney, Agent, or Firm* — Bryan Cave Leighton Paisner LLP

(57) ABSTRACT

An image decoding method, according to the present disclosure may comprise: acquiring, from a bitstream, image information including adaptive loop filter (ALF) information including, alternative filter information for a chroma component of a current block, and residual information; generating reconstructed samples for the current block on the basis of the residual information; and generating modified reconstructed samples for the chroma component of the current block on the basis of the alternative filter information.

9 Claims, 17 Drawing Sheets

Related U.S. Application Data continuation of application No. PCT/KR2020/008941, filed on Jul. 8, 2020.

(60) Provisional application No. 62/871,223, filed on Jul. 8, 2019.

(51) Int. Cl.
*H04N 19/176* (2014.01)
*H04N 19/186* (2014.01)
*H04N 19/46* (2014.01)
*H04N 19/82* (2014.01)

(52) U.S. Cl.
CPC ........... *H04N 19/186* (2014.11); *H04N 19/46* (2014.11); *H04N 19/82* (2014.11)

(58) Field of Classification Search
CPC ...... H04N 19/186; H04N 19/70; H04N 19/82; H04N 19/91

See application file for complete search history.

(56) References Cited

U.S. PATENT DOCUMENTS

| | | |
|---|---|---|
| 2018/0041778 A1 | 2/2018 | Zhang ................... H04N 19/17 |
| 2018/0041779 A1 | 2/2018 | Zhang et al. |
| 2018/0063527 A1* | 3/2018 | Chen .................... H04N 19/117 |
| 2020/0029096 A1* | 1/2020 | Rusanovskyy ........ H04N 19/52 |
| 2020/0267383 A1 | 8/2020 | Jun ....................... H04N 19/105 |
| 2021/0227222 A1* | 7/2021 | Lee ........................ H04N 19/13 |
| 2021/0274175 A1* | 9/2021 | Lim ..................... H04N 19/167 |

FOREIGN PATENT DOCUMENTS

| | | | |
|---|---|---|---|
| CN | 107249131 A | 10/2017 | |
| CN | 113574898 A | 10/2021 | ........... H04N 19/117 |
| KR | 20190032396 A | 3/2019 | |
| KR | 20190042579 A | 4/2019 | |

OTHER PUBLICATIONS

Jonathan Taquet, et al., "CE5-4: Alternative luma filter sets and alternative chroma filters for ALF", Joint Video Experts Team (JVET) of ITU-T SG 16 WP 3 and ISO/IEC JTC 1/SC 29/WG 11, 15th Meeting: Gothenburg, SE, Jul. 3-12, 2019. JVET-O0090.

U.S. Appl. No. 17/570,237, filed Jan. 6, 2022.

\* cited by examiner (a)

VIDEO OR IMAGE CODING APPLYING ADAPTIVE LOOP FILTER

This is a Continuation of U.S. patent application Ser. No. 17/570,237, filed Jan. 6, 2022, which is a Bypass of PCT Application No. PCT/KR2020/008941, with an international filing date of Jul. 8, 2020, which claims the benefit of U.S. Provisional Application No. 62/871,223, filed on Jul. 8, 2019, all of which are incorporated by reference in their entirety herein.

BACKGROUND OF THE DISCLOSURE

Field of the Disclosure

The present disclosure relates to video or image coding applying adaptive loop filter.

Related Art

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

In addition, there is a discussion on filtering techniques using the adaptive loop filtering (ALF) to improve compression efficiency and increase subjective/objective visual quality. In order to efficiently apply these techniques, there is a need for a method for efficiently signaling related information.

SUMMARY

According to an embodiment of the present disclosure, an image decoding method performed by a decoding apparatus is provided. The method includes: obtaining image information including adaptive loop filter (ALF) information and residual information from a bitstream; generating reconstructed samples for a current block based on the residual information; deriving filter coefficients for the ALF based on the ALF information; and generating modified reconstructed samples for the current block based on the reconstructed samples and the filter coefficients, wherein the ALF information includes alternative filter information for a chroma component of the current block, and the filter coefficients for the chroma component of the current block are generated based on the alternative filter information.

According to another embodiment of the present disclosure, a video encoding method performed by an encoding apparatus is provided. The method includes: deriving prediction samples for a current block in a current picture; deriving residual samples for the current block based on the prediction samples; generating residual information and reconstructed samples based on the residual samples; deriving filter coefficients for an adaptive loop filter (ALF) for the reconstructed samples; generating ALF information based on the filter coefficients; and encoding image information including the ALF information and the residual information, wherein the ALF information includes alternative filter information for a chroma component of the current block, and the alternative filter information indicates an alternative filter for deriving modified reconstructed samples for the chroma component of the current block.

According to another embodiment of the present disclosure, there is provided a computer-readable digital storage medium in which a bitstream including image information causing a decoding apparatus to perform an image decoding method is stored. The image decoding method includes: obtaining image information including adaptive loop filter (ALF) information and residual information from a bitstream; generating reconstructed samples for a current block based on the residual information; deriving filter coefficients for the ALF based on the ALF information; and generating modified reconstructed samples for the current block based on the reconstructed samples and the filter coefficients, wherein the ALF information includes alternative filter information on a chroma component of the current block, and the filter coefficients for the chroma component of the current block are generated based on the alternative filter information.

Advantageous Effects

According to an embodiment of the present disclosure, overall image/video compression efficiency can be increased.

According to an embodiment of the present disclosure, subjective/objective visual quality can be increased through efficient filtering.

According to an embodiment of the present disclosure, ALF-related information can be efficiently signaled.

BRIEF DESCRIPTION OF THE DRAWINGS

FIG. 12 shows fixed orders corresponding to position dependent filter coefficients.

DESCRIPTION OF EXEMPLARY EMBODIMENTS

Figure 1:
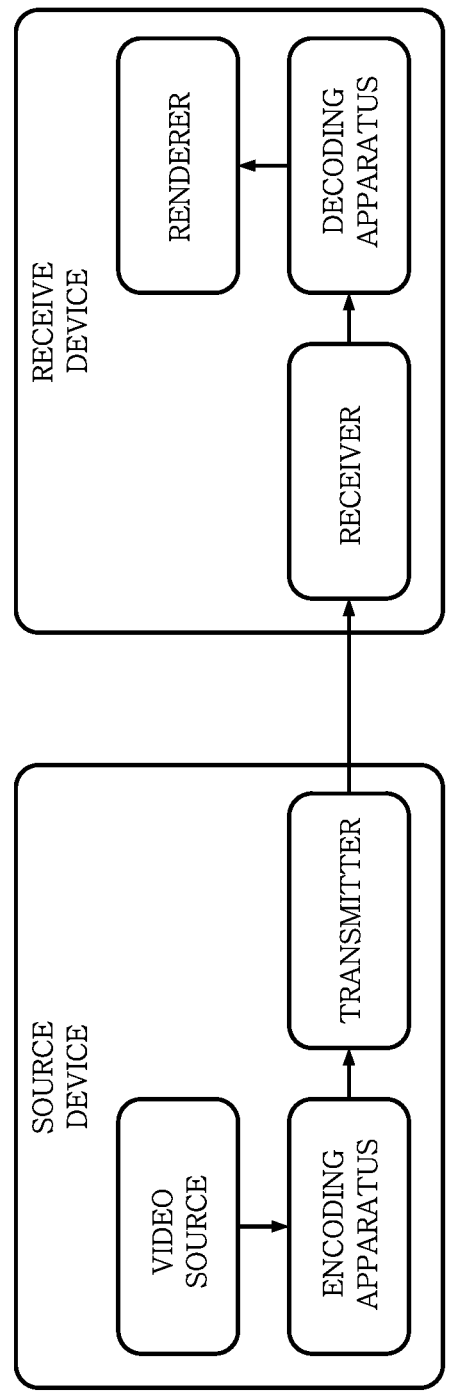
FIG. 1 schematically illustrates an example of a video/image coding system to which the embodiments of the present disclosure may be applied.

While the present disclosure can have a variety of modifications and configurations, certain embodiments have been illustrated in the drawings and explained in detail herein. However, this should not be construed as limiting the present disclosure to any specific embodiment. The terms used herein are presented for the description of the specific embodiments but are not intended to limit the technical idea of the present disclosure. The terms of a singular form may include plural forms unless otherwise specified. It will be understood that the terms "comprising" or "having," when used herein, specify the presence of stated features, integers, steps, operations, elements, components, or combinations thereof, but do not preclude the presence or addition of one or more other features, integers, steps, operations, elements, components, or combinations thereof.

Each of the components in the drawings described in the present disclosure are illustrated independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of the present disclosure without departing from the spirit of the present disclosure.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C."

A slash (/) or comma used in the present specification may mean "and/or." For example, "A/B" may mean "A and/or B." Accordingly, "A/B" may mean "only A," "only B", or "both A and B." For example, "A, B, C" may mean "A, B, or C."

In the present specification, "at least one of A and B" may mean "only A", "only B," or "both A and B." In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C." In addition, "at least one of A, B, or C" or "at least one of A, B, and/or C" may mean "at least one of A, B, and C."

In addition, a parenthesis used in the present specification may mean "for example." Specifically, when indicated as "prediction (intra prediction)," it may mean that "intra prediction" is proposed as an example of the "prediction." In other words, the "prediction" of the present specification is not limited to "intra prediction," and "intra prediction" may be proposed as an example of the "prediction." In addition, when indicated as "prediction (i.e., intra prediction)," it may also mean that "intra prediction" is proposed as an example of the "prediction."

A technical feature described individually in one figure in the present specification may be individually implemented, or may be simultaneously implemented.

Hereinafter, preferred embodiments of the present disclosure will be described in more detail with reference to the accompanying drawings. Hereinafter, the same reference numerals are used for the same components in the drawings, and repeated descriptions of the same components may be omitted.

FIG. 1 schematically illustrates an example of a video/image coding system to which the present disclosure may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present disclosure relates to video/image coding. For example, a method/embodiment disclosed in the present document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles.

A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice may include multiple complete tiles or multiple consecutive CTU rows in one tile of a picture, which may be included in one NAL unit. In this document, tile group and slice can be used interchangeably. For example, in this document, a tile group/tile group header may be referred to as a slice/slice header.

Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

Figure 2:
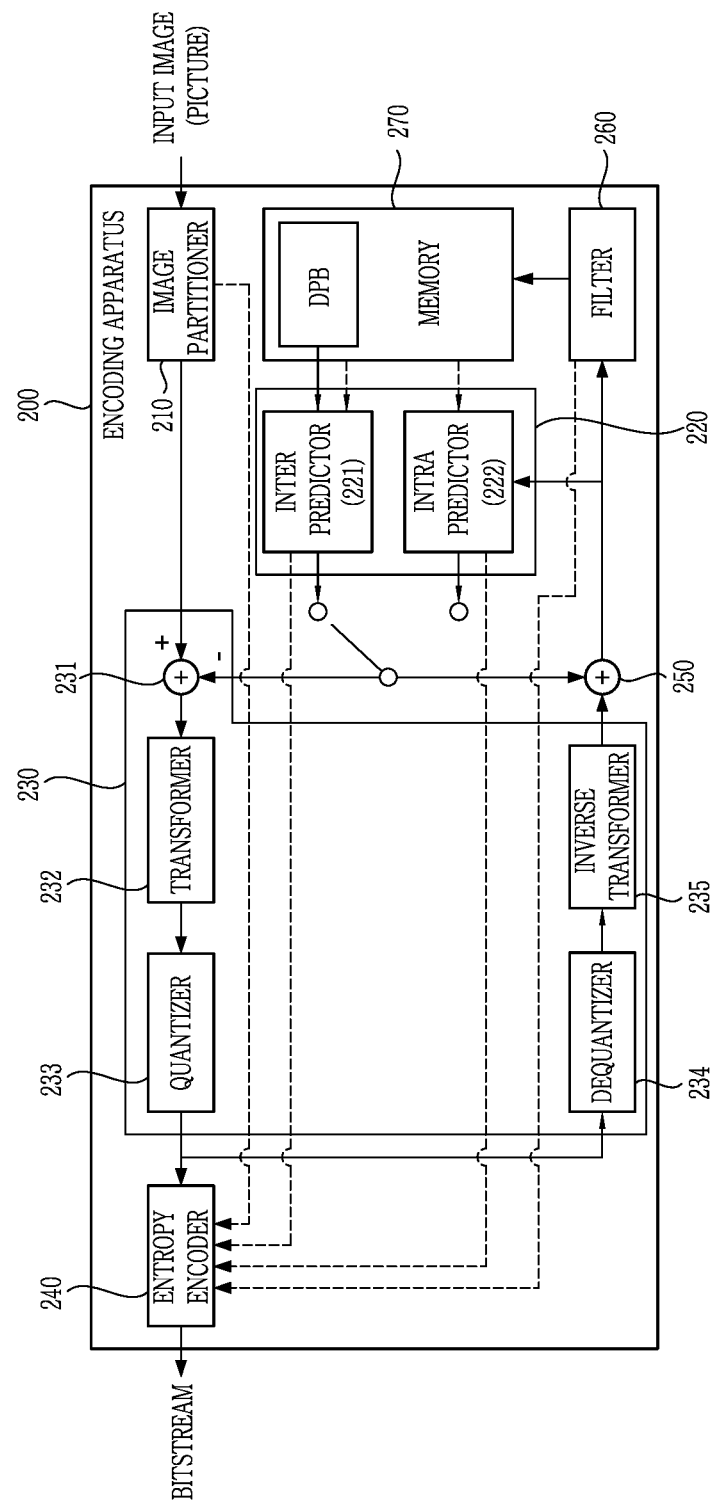
FIG. 2 is a diagram schematically illustrating a configuration of a video/image encoding apparatus to which the embodiments of the present disclosure may be applied.

FIG. 2 is a diagram schematically illustrating a configuration of a video/image encoding apparatus to which the present disclosure may be applied. Hereinafter, a video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoding apparatus 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

Further, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

Figure 3:
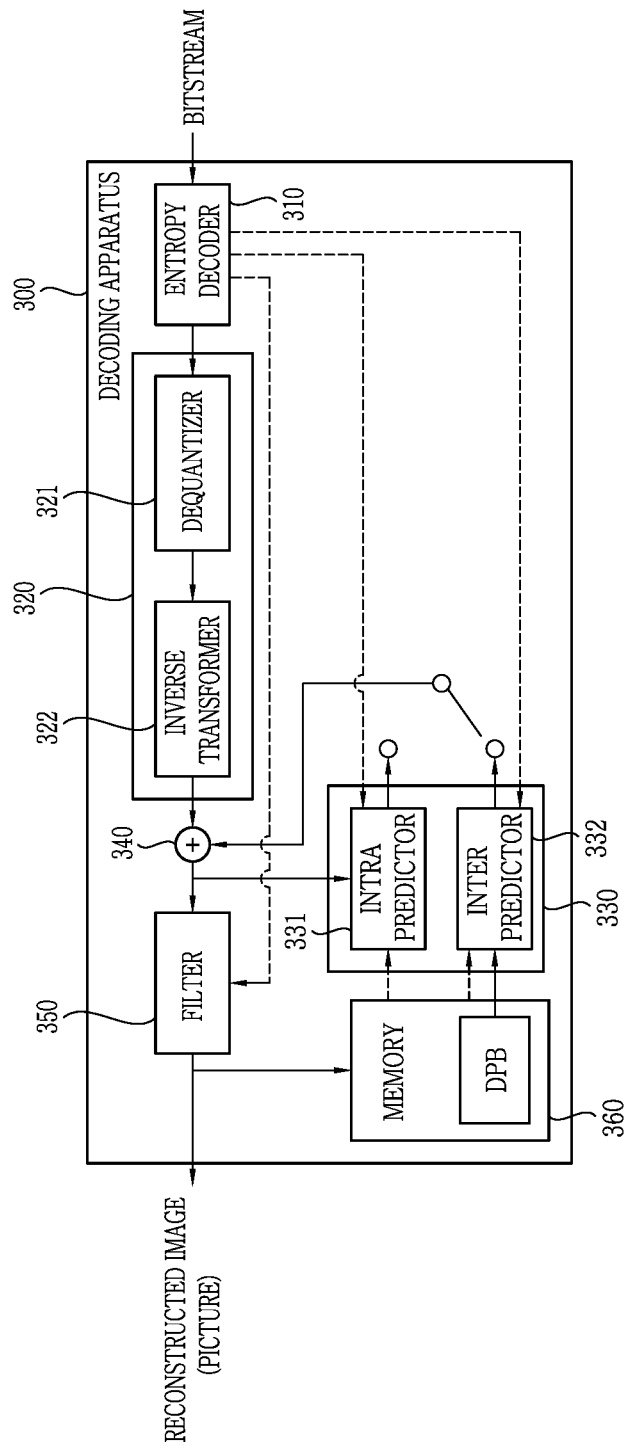
FIG. 3 is a diagram schematically illustrating a configuration of a video/image decoding apparatus to which the embodiments of the present disclosure may be applied.

FIG. 3 is a diagram schematically illustrating a configuration of a video/image decoding apparatus to which the present disclosure may be applied.

Referring to FIG. 3, the decoding apparatus 300 may include an entropy decoder 310, a residual processor 320, a predictor 330, an adder 340, a filter 350, a memory 360. The predictor 330 may include an intra predictor 331 and an inter predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 330 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in video coding, prediction is performed to increase compression efficiency. Through this, it is possible to generate a predicted block including prediction samples for a current block, which is a block to be coded. Here, the predicted block includes prediction samples in a spatial domain (or pixel domain). The predicted block is derived equally from the encoding device and the decoding device, and the encoding device decodes information (residual information) on the residual between the original block and the predicted block, not the original sample value of the original block itself. By signaling to the device, image coding efficiency can be increased. The decoding apparatus may derive a residual block including residual samples based on the residual information, and generate a reconstructed block including reconstructed samples by summing the residual block and the predicted block, and generate a reconstructed picture including reconstructed blocks.

The residual information may be generated through transformation and quantization processes. For example, the encoding apparatus may derive a residual block between the original block and the predicted block, and perform a transform process on residual samples (residual sample array) included in the residual block to derive transform coefficients, and then, by performing a quantization process on the transform coefficients, derive quantized transform coefficients to signal the residual related information to the decoding apparatus (via a bitstream). Here, the residual information may include location information, a transform technique, a transform kernel, and a quantization parameter, value information of the quantized transform coefficients etc. The decoding apparatus may perform dequantization/inverse transformation process based on the residual information and derive residual samples (or residual blocks). The decoding apparatus may generate a reconstructed picture based on the predicted block and the residual block. The encoding apparatus may also dequantize/inverse transform the quantized transform coefficients for reference for inter prediction of a later picture to derive a residual block, and generate a reconstructed picture based thereon.

In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficients may be called coefficients or residual coefficients, or may still be called transform coefficients for uniformity of expression.

In the present document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of the present document as well.

Intra prediction may refer to prediction that generates prediction samples for the current block based on reference samples in a picture to which the current block belongs (hereinafter, referred to as a current picture). When intra prediction is applied to the current block, neighboring reference samples to be used for intra prediction of the current block may be derived. The neighboring reference samples of the current block may include samples adjacent to the left boundary of the current block having a size of nW×nH and a total of 2×nH samples neighboring the bottom-left, samples adjacent to the top boundary of the current block and a total of 2×nW samples neighboring the top-right, and one sample neighboring the top-left of the current block. Alternatively, the neighboring reference samples of the current block may include a plurality of upper neighboring samples and a plurality of left neighboring samples. In addition, the neighboring reference samples of the current block may include a total of nH samples adjacent to the right boundary of the current block having a size of nW×nH, a total of nW samples adjacent to the bottom boundary of the current block, and one sample neighboring (bottom-right) neighboring bottom-right of the current block.

However, some of the neighboring reference samples of the current block may not be decoded yet or available. In this case, the decoder may configure the neighboring reference samples to use for prediction by substituting the samples that are not available with the available samples. Alternatively, neighboring reference samples to be used for prediction may be configured through interpolation of the available samples.

When the neighboring reference samples are derived, (i) the prediction sample may be derived based on the average or interpolation of neighboring reference samples of the current block, and (ii) the prediction sample may be derived based on the reference sample present in a specific (prediction) direction for the prediction sample among the periphery reference samples of the current block. The case of (i) may be called non-directional mode or non-angular mode and the case of (ii) may be called directional mode or angular mode.

Furthermore, the prediction sample may also be generated through interpolation between the second neighboring sample and the first neighboring sample located in a direction opposite to the prediction direction of the intra prediction mode of the current block based on the prediction sample of the current block among the neighboring reference samples. The above case may be referred to as linear interpolation intra prediction (LIP). In addition, chroma prediction samples may be generated based on luma samples using a linear model. This case may be called LM mode.

In addition, a temporary prediction sample of the current block may be derived based on filtered neighboring reference samples, and at least one reference sample derived according to the intra prediction mode among the existing neighboring reference samples, that is, unfiltered neighboring reference samples, and the temporary prediction sample may be weighted-summed to derive the prediction sample of the current block. The above case may be referred to as position dependent intra prediction (PDPC).

In addition, a reference sample line having the highest prediction accuracy among the neighboring multi-reference sample lines of the current block may be selected to derive the prediction sample by using the reference sample located in the prediction direction on the corresponding line, and then the reference sample line used herein may be indicated (signaled) to the decoding apparatus, thereby performing intra-prediction encoding. The above case may be referred to as multi-reference line (MRL) intra prediction or MRL based intra prediction.

In addition, intra prediction may be performed based on the same intra prediction mode by dividing the current block into vertical or horizontal subpartitions, and neighboring reference samples may be derived and used in the subpartition unit. That is, in this case, the intra prediction mode for the current block is equally applied to the subpartitions, and the intra prediction performance may be improved in some cases by deriving and using the neighboring reference samples in the subpartition unit. Such a prediction method may be called intra subpartitions (ISP) or ISP based intra prediction.

The above-described intra prediction methods may be called an intra prediction type separately from the intra prediction mode. The intra prediction type may be called in various terms such as an intra prediction technique or an additional intra prediction mode. For example, the intra prediction type (or additional intra prediction mode) may include at least one of the above-described LIP, PDPC, MRL, and ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the intra prediction mode described above. Meanwhile, post-filtering may be performed on the predicted sample derived as needed.

Specifically, the intra prediction procedure may include an intra prediction mode/type determination step, a neighboring reference sample derivation step, and an intra prediction mode/type based prediction sample derivation step. In addition, a post-filtering step may be performed on the predicted sample derived as needed.

When intra prediction is applied, the intra prediction mode applied to the current block may be determined using the intra prediction mode of the neighboring block. For example, the decoding apparatus may select one of most probable mode (mpm) candidates of an mpm list derived based on the intra prediction mode of the neighboring block (ex. left and/or upper neighboring blocks) of the current block based on the received mpm index and select one of the other remaining intro prediction modes not included in the mpm candidates (and planar mode) based on the remaining intra prediction mode information. The mpm list may be configured to include or not include a planar mode as a candidate. For example, if the mpm list includes the planar mode as a candidate, the mpm list may have six candidates. If the mpm list does not include the planar mode as a candidate, the mpm list may have three candidates. When the mpm list does not include the planar mode as a candidate, a not planar flag (ex. intra_luma_not_planar_flag) indicating whether an intra prediction mode of the current block is not the planar mode may be signaled. For example, the mpm flag may be signaled first, and the mpm index and not planar flag may be signaled when the value of the mpm flag is 1. In addition, the mpm index may be signaled when the value of the not planar flag is 1. Here, the mpm list is configured not to include the planar mode as a candidate does not is to signal the not planar flag first to check whether it is the planar mode first because the planar mode is always considered as mpm.

For example, whether the intra prediction mode applied to the current block is in mpm candidates (and planar mode) or in remaining mode may be indicated based on the mpm flag (ex. Intra_luma_mpm_flag). A value 1 of the mpm flag may indicate that the intra prediction mode for the current block is within mpm candidates (and planar mode), and a value 0 of the mpm flag may indicate that the intra prediction mode for the current block is not in the mpm candidates (and planar mode). The value 0 of the not planar flag (ex. Intra_luma_not_planar_flag) may indicate that the intra prediction mode for the current block is planar mode, and the value 1 of the not planar flag value may indicate that the intra prediction mode for the current block is not the planar mode. The mpm index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may index remaining intra prediction modes not included in the mpm candidates (and planar mode) among all intra prediction modes in order of prediction mode number to indicate one of them. The intra prediction mode may be an intra prediction mode for a luma component (sample). Hereinafter, intra prediction mode information may include at least one of the mpm flag (ex. Intra_luma_mpm_flag), the not planar flag (ex. Intra_luma_not_planar_flag), the mpm index (ex. mpm_idx or intra_luma_mpm_idx), and the remaining intra prediction mode information (rem_intra_luma_pred_mode or intra_luma_mpm_remainder). In the present document, the MPM list may be referred to in various terms such as MPM candidate list and candModeList. When MIP is applied to the current block, a separate mpm flag (ex. intra_mip_mpm_flag), an mpm index (ex. intra_mip_mpm_idx), and remaining intra prediction mode information (ex. intra_mip_mpm_remainder) for MIP may be signaled and the not planar flag is not signaled.

In other words, in general, when block splitting is performed on an image, a current block and a neighboring block to be coded have similar image characteristics. Therefore, the current block and the neighboring block have a high probability of having the same or similar intra prediction mode. Thus, the encoder may use the intra prediction mode of the neighboring block to encode the intra prediction mode of the current block.

For example, the encoder/decoder may configure a list of most probable modes (MPM) for the current block. The MPM list may also be referred to as an MPM candidate list. Herein, the MPM may refer to a mode used to improve coding efficiency in consideration of similarity between the current block and neighboring block in intra prediction mode coding. As described above, the MPM list may be configured to include the planar mode or may be configured to exclude the planar mode. For example, when the MPM list includes the planar mode, the number of candidates in the MPM list may be 6. And, if the MPM list does not include the planar mode, the number of candidates in the MPM list may be 5.

The encoder/decoder may configure an MPM list including 5 or 6 MPMs.

In order to configure the MPM list, three types of modes can be considered: default intra modes, neighbor intra modes, and the derived intra modes.

For the neighboring intra modes, two neighboring blocks, i.e., a left neighboring block and an upper neighboring block, may be considered.

As described above, if the MPM list is configured not to include the planar mode, the planar mode is excluded from the list, and the number of MPM list candidates may be set to 5.

In addition, the non-directional mode (or non-angular mode) among the intra prediction modes may include a DC mode based on the average of neighboring reference samples of the current block or a planar mode based on interpolation.

When inter prediction is applied, the predictor of the encoding apparatus/decoding apparatus may derive a prediction sample by performing inter prediction in units of blocks. Inter prediction may be a prediction derived in a manner that is dependent on data elements (ex. sample values or motion information) of picture(s) other than the current picture. When inter prediction is applied to the current block, a predicted block (prediction sample array) for the current block may be derived based on a reference block (reference sample array) specified by a motion vector on the reference picture indicated by the reference picture index. Here, in order to reduce the amount of motion information transmitted in the inter prediction mode, the motion information of the current block may be predicted in units of blocks, subblocks, or samples based on correlation of motion information between the neighboring block and the current block. The motion information may include a motion vector and a reference picture index. The motion information may further include inter prediction type (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, a motion information candidate list may be configured based on neighboring blocks of the current block, and flag or index information indicating which candidate is selected (used) may be signaled to derive a motion vector and/or a reference picture index of the current block. Inter prediction may be performed based on various prediction modes. For example, in the case of a skip mode and a merge mode, the motion information of the current block may be the same as motion information of the neighboring block. In the skip mode, unlike the merge mode, the residual signal may not be transmitted. In the case of the motion vector prediction (MVP) mode, the motion vector of the selected neighboring block may be used as a motion vector predictor and the motion vector of the current block may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). The motion vector in the L0 direction may be referred to as an L0 motion vector or MVL0, and the motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are earlier in output order than the current picture as reference pictures, and the reference picture list L1 may include pictures that are later in the output order than the current picture. The previous pictures may be called forward (reference) pictures, and the subsequent pictures may be called reverse (reference) pictures. The reference picture list L0 may further include pictures that are later in the output order than the current picture as reference pictures. In this case, the previous pictures may be indexed first in the reference picture list L0 and the subsequent pictures may be indexed later. The reference picture list L1 may further include previous pictures in the output order than the current picture as reference pictures. In this case, the subsequent pictures may be indexed first in the reference picture list 1 and the previous pictures may be indexed later. The output order may correspond to picture order count (POC) order.

Figure 4:
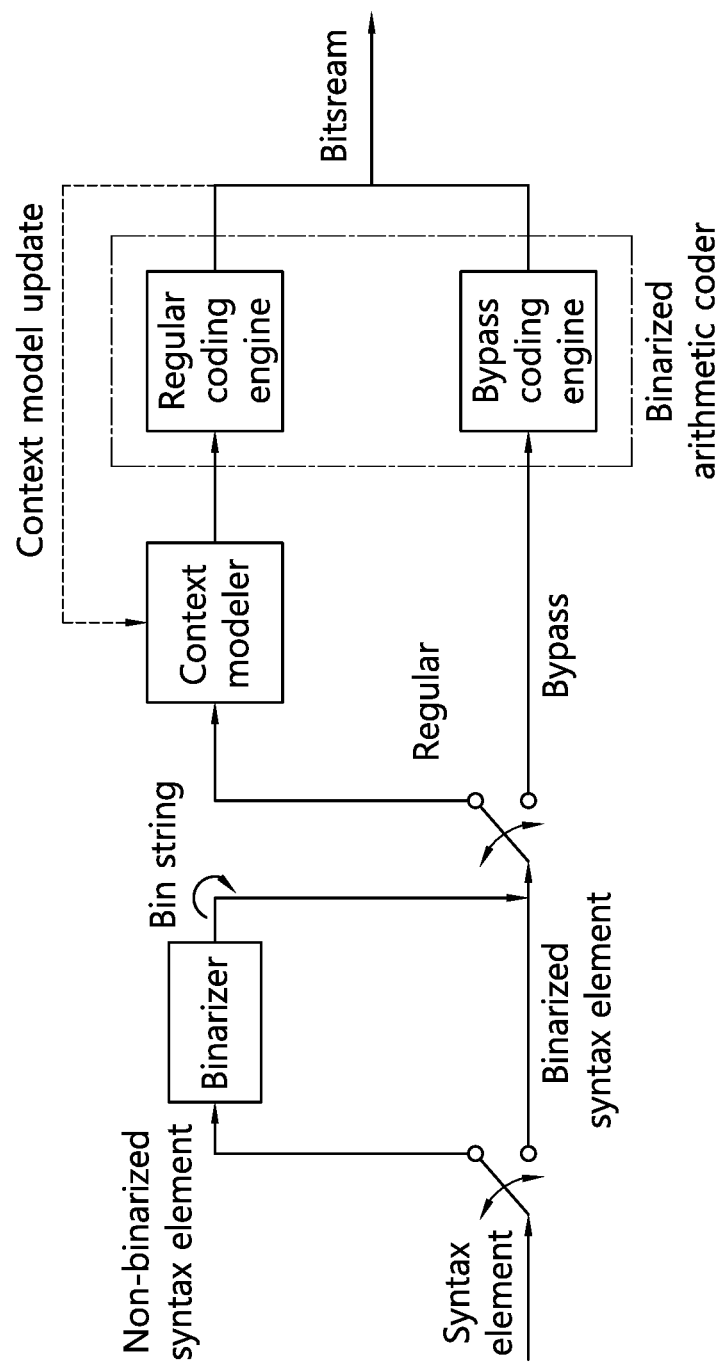
FIG. 4 shows a block diagram of context-adaptive arithmetic coding (CABAC).

FIG. 4 shows a block diagram of context-adaptive arithmetic coding (CABAC).

The encoding process of CABAC first converts an input signal into a binary value through binarization when the input signal is a syntax element rather than a binary value. When the input signal is already a binary value, it may be bypassed without binarization. Here, each binary number 0 or 1 constituting a binary value is called a bin. For example, when a binary string (a bin string) after binarization is 110, each of 1, 1, and 0 is called one bin. The bin(s) for one syntax element may indicate the value of the corresponding syntax element.

The binarized bins are input to a regular coding engine or a bypass coding engine. The regular coding engine allocates a context model that reflects a probability value to the corresponding bin, and encodes the corresponding bin based on the allocated context model.

In the regular coding engine, after coding for each bin, the probabilistic model for the corresponding bin may be updated. Bins coded in this way are called context-coded bins. The bypass coding engine omits a procedure of estimating a probability for an input bin and a procedure of updating a probabilistic model applied to the corresponding bin after coding. The coding speed is improved by coding the input bin by applying a uniform probability distribution (e.g., 50:50) instead of allocating a context. Bins coded in this way are called bypass bins. The context model may be allocated and updated for each bin to be context coded (regular coded), and the context model may be indicated based on ctxidx or ctxInc. ctxidx may be derived based on ctxInc. Specifically, for example, the context index (ctxidx) indicating the context model for each of the regularly coded bins may be derived as the sum of the context index increment (ctxInc) and the context index offset (ctxIdxOffset). Here, the ctxInc may be derived differently for each bin. The ctxIdxOffset may be represented by the lowest value of the ctxIdx. The lowest value of the ctxIdx may be referred to as an initial value (initValue) of the ctxIdx. The ctxIdxOffset is a value generally used to distinguish context models for other syntax elements, and a context model for one syntax element may be distinguished/derived based on the ctxinc.

In the entropy encoding procedure, it may be determined whether to perform encoding through the regular coding engine or to perform encoding through the bypass coding engine, and accordingly, a coding path may be switched. Entropy decoding may perform the same process as the entropy encoding in reverse order.

Figure 5:
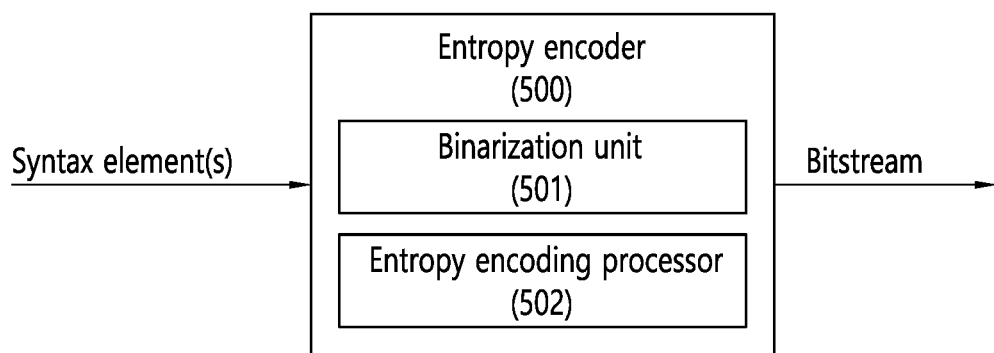
FIG. 5 shows an entropy encoder of an encoding apparatus.

FIG. 5 shows an entropy encoder of an encoding apparatus.

An entropy encoder 500 of FIG. 5 may be the same as the entropy encoder 240 of FIG. 2 described above. A binarization unit 501 in the entropy encoder 500 may perform binarization on a target syntax element. Here, the binarization may be based on various binarization methods such as a truncated rice binarization process and a fixed-length binarization process, and the binarization method for a target syntax element may be pre-defined.

An entropy encoding processor 502 in the entropy encoder 500 may perform entropy encoding on the target syntax element. The encoding apparatus may encode an empty string of a target syntax element based on regular coding (context based) or bypass coding based on an entropy coding technique such as context-adaptive arithmetic coding (CABAC) or context-adaptive variable length coding (CAVLC), and the output may be included in the bitstream. As described above, the bitstream may be transmitted to a decoding apparatus through a (digital) storage medium or a network.

Figure 6:
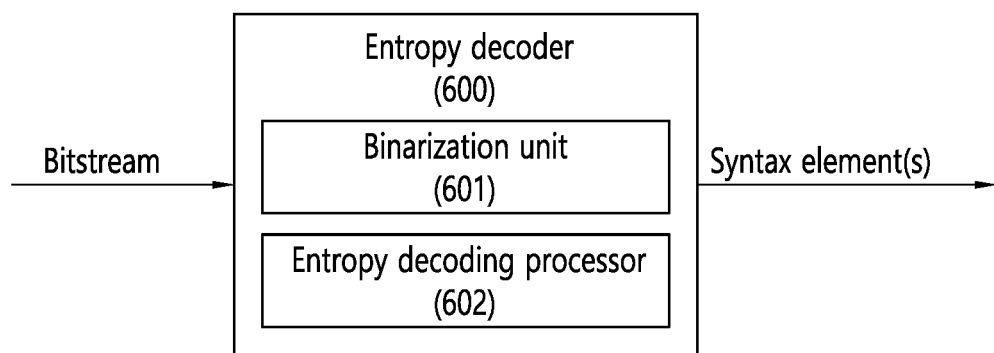
FIG. 6 shows an entropy decoder of a decoding apparatus.

FIG. 6 shows an entropy decoder of a decoding apparatus.

An entropy decoder 600 of FIG. 6 may be the same as the entropy decoder 310 of FIG. 3 described above. A binarization unit 601 in the entropy encoder 600 may perform binarization on a target syntax element. Here, the binarization may be based on various binarization methods such as a truncated rice binarization process and a fixed-length binarization process, and a binarization method for a target syntax element may be predefined. The decoding apparatus may derive available bin strings (bin string candidates) for available values of the target syntax element through the binarization process.

An entropy decoding processor 602 in the entropy decoder 600 may perform entropy decoding on the target syntax element. The decoding apparatus sequentially decodes and parses each bin for the target syntax element from the input bit(s) in the bitstream, and compares the derived bin string with available bin strings for the corresponding syntax element. If the derived bin string is the same as one of the available bin strings, a value corresponding to the bin string is derived as the value of the corresponding syntax element. If not, the above-described process is performed again after further parsing the next bit in the bitstream. Through this process, the corresponding information may be signaled using a variable length bit without using a start bit or an end bit for specific information (a specific syntax element) in the bitstream. Through this, relatively fewer bits may be allocated to a low value, and overall coding efficiency can be increased.

Figure 7:
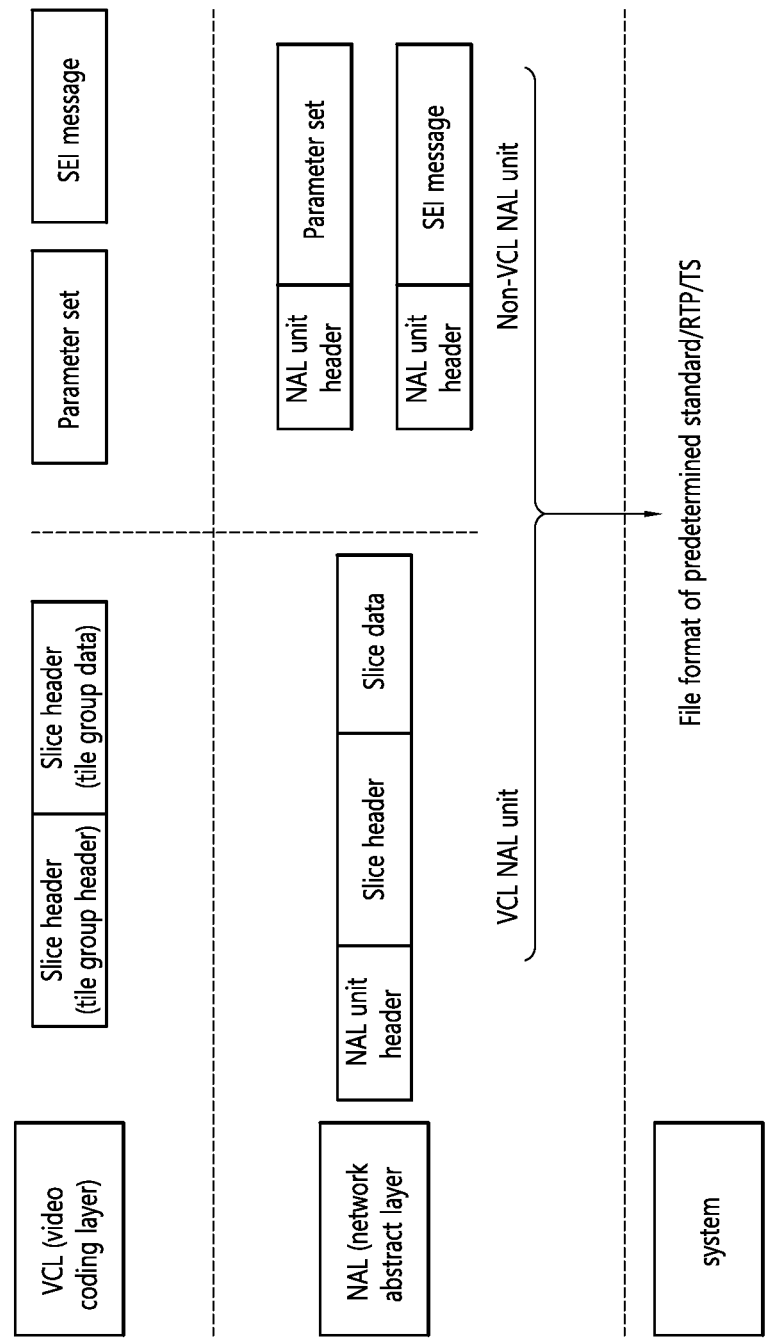
FIG. 7 exemplarily shows a hierarchical structure for a coded image/video.

FIG. 7 exemplarily shows a hierarchical structure for a coded image/video.

Referring to FIG. 7, coded image/video is divided into a video coding layer (VCL) that handles the decoding process of the image/video and itself, a subsystem that transmits and stores the coded information, and NAL (network abstraction layer) in charge of function and present between the VCL and the subsystem.

In the VCL, VCL data including compressed image data (slice data) is generated, or a parameter set including a picture parameter set (PSP), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in a VCL. In this case, the RBSP refers to slice data, parameter set, SEI message, etc., generated in the VCL. The NAL unit header may include NAL unit type information specified according to RBSP data included in the corresponding NAL unit.

As shown in the figure, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), etc., and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS(Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In the present document, a tile group may be mixed or replaced with a slice or a picture. Also, in the present document, a tile group header may be mixed or replaced with a slice header or a picture header.

The slice header (slice header syntax) may include information/parameters that may be commonly applied to the slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS). The high level syntax (HLS) in the present document may include at least one of the APS syntax, the PPS syntax, the SPS syntax, the VPS syntax, the DPS syntax, and the slice header syntax.

In the present document, the image/image information encoded from the encoding apparatus and signaled to the decoding apparatus in the form of a bitstream includes not only partitioning related information in a picture, intra/inter prediction information, residual information, in-loop filtering information, etc., but also information included in a slice header, information included in the APS, information included in the PPS, information included in an SPS, and/or information included in the VPS.

Meanwhile, in order to compensate for a difference between an original image and a reconstructed image due to an error occurring in a compression coding process such as quantization, an in-loop filtering process may be performed on reconstructed samples or reconstructed pictures as described above. As described above, the in-loop filtering may be performed by the filter of the encoding apparatus and the filter of the decoding apparatus, and a deblocking filter, SAO, and/or adaptive loop filter (ALF) may be applied. For example, the ALF process may be performed after the deblocking filtering process and/or the SAO process are completed. However, even in this case, the deblocking filtering process and/or the SAO process may be omitted.

Figure 8:
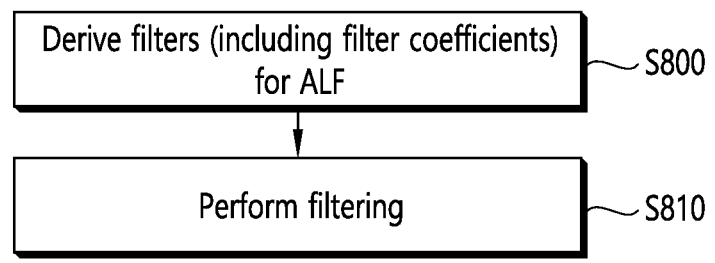
FIG. 8 is a flowchart schematically illustrating an example of an ALF process.

FIG. 8 is a flowchart schematically illustrating an example of an ALF process. The ALF process disclosed in FIG. 8 may be performed in an encoding apparatus and a decoding apparatus. In this document, the coding apparatus may include the encoding apparatus and/or the decoding apparatus.

Referring to FIG. 8, the coding apparatus derives a filter for ALF (S800). The filter may include filter coefficients. The coding apparatus may determine whether to apply the ALF, and when determining to apply the ALF, may derive a filter including filter coefficients for the ALF. Information for deriving a filter (coefficients) for ALF or a filter (coefficients) for ALF may be referred to as an ALF parameter. Information on whether ALF is applied (i.e., ALF enabled flag) and ALF data for deriving the filter may be signaled from the encoding apparatus to the decoding apparatus. ALF data may include information for deriving a filter for the ALF. Also, for example, for hierarchical control of ALF, an ALF enabled flag may be signaled at the SPS, picture header, slice header, and/or CTB level, respectively.

In order to derive the filter for the ALF, the activity and/or directivity of the current block (or ALF target block) is derived, and the filter may be derived based on the activity and/or the directionality. For example, the ALF process may be applied in units of 4×4 blocks (based on luma components). The current block or the ALF target block may be, for example, a CU, or may be a 4×4 block within a CU. Specifically, for example, filters for ALF may be derived based on first filters derived from information included in the ALF data and predefined second filters, and the coding apparatus may select one of the filters based on the activity and/or the directionality. The coding apparatus may use filter coefficients included in the selected filter for the ALF.

The coding apparatus performs filtering based on the filter (S810). Modified reconstructed samples may be derived based on the filtering. For example, the filter coefficients in the filter may be arranged or allocated according to a filter shape, and the filtering may be performed on reconstructed samples in the current block. Here, the reconstructed samples in the current block may be reconstructed samples after the deblocking filter process and the SAO process are completed. For example, one filter shape may be used, or one filter shape may be selected and used from among a plurality of predetermined filter shapes. For example, a filter shape applied to the luma component and a filter shape applied to the chroma component may be different. For example, a 7×7 diamond filter shape may be used for the luma component, and a 5×5 diamond filter shape may be used for the chroma component.

Figure 9:
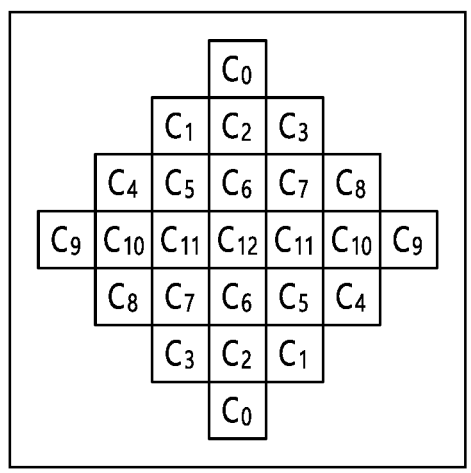
FIG. 9 shows examples of the shapes of an ALF filters.
Figure 9:
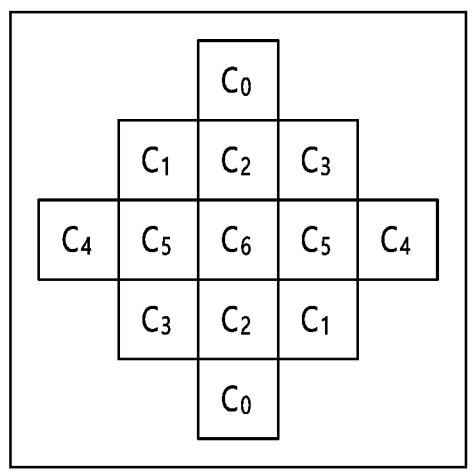

FIG. 9 shows examples of the shape of an ALF filter. C0~C11 in (a) of FIG. 9 and C0~C5 in (b) of FIG. 9 may be filter coefficients depending on positions within each filter shape.

(a) of FIG. 9 shows the shape of a 7×7 diamond filter, and (b) of FIG. 9 shows the shape of a 5×5 diamond filter. In FIG. 9, Cn in the filter shape represents a filter coefficient. When n in Cn is the same, this indicates that the same filter coefficients can be assigned. In the present document, a position and/or unit to which filter coefficients are assigned according to the filter shape of the ALF may be referred to as a filter tab. In this case, one filter coefficient may be assigned to each filter tap, and the arrangement of the filter taps may correspond to a filter shape. A filter tab located at the center of the filter shape may be referred to as a center filter tab. The same filter coefficients may be assigned to two filter taps of the same n value that exist at positions corresponding to each other with respect to the center filter tap. For example, in the case of a 7×7 diamond filter shape, 25 filter taps are included, and since filter coefficients C0 to C11 are assigned in a centrally symmetric form, filter coefficients may be assigned to the 25 filter taps using only 13 filter coefficients. Also, for example, in the case of a 5×5 diamond filter shape, 13 filter taps are included, and since filter coefficients C0 to C5 are assigned in a centrally symmetrical form, filter coefficients may be assigned to the 13 filter taps using only 7 filter coefficients. For example, in order to reduce the data amount of signaled information on filter coefficients, 12 filter coefficients among 13 filter coefficients for the 7×7 diamond filter shape may be signaled (explicitly), and one filter coefficient may be derived (implicitly). Also, for example, 6 filter coefficients among 7 filter coefficients for a 5×5 diamond filter shape may be signaled (explicitly) and one filter coefficient may be derived (implicitly).

According to an embodiment of the present document, the ALF parameter used for the ALF process may be signaled through an adaptation parameter set (APS). The ALF parameter may be derived from filter information for the ALF or ALF data.

The ALF is a type of in-loop filtering technique that can be applied in video/image coding as described above. The ALF may be performed using a Wiener-based adaptive filter. This may be to minimize a mean square error (MSE) between original samples and decoded samples (or reconstructed samples). A high level design for an ALF tool may incorporate syntax elements accessible from the SPS and/or slice header (or tile group header).

Figure 10:
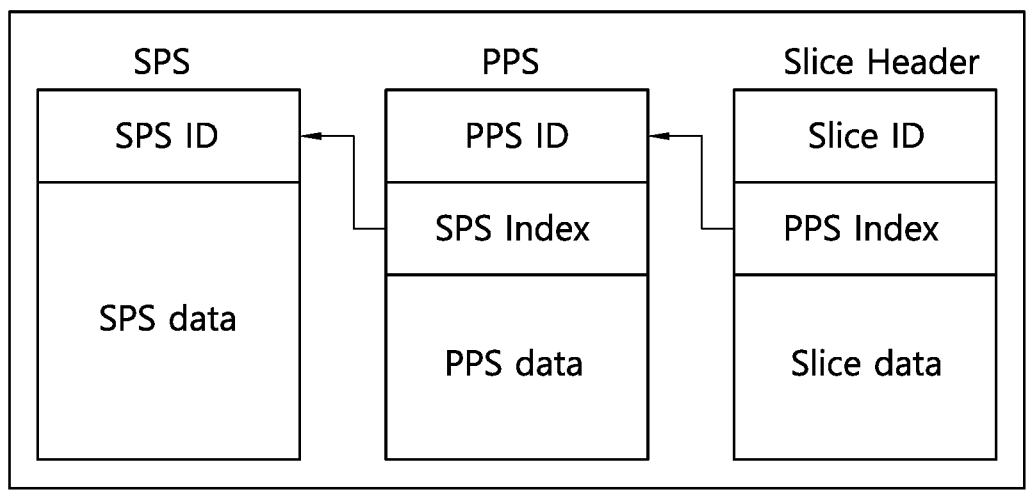
FIG. 10 shows an example of a hierarchical structure of ALF data.

FIG. 10 shows an example of a hierarchical structure of ALF data.

Referring to FIG. 10, a coded video sequence (CVS) 900 may include an SPS, one or more PPSs, and one or more coded pictures that follow. Each coded picture may be divided into rectangular regions. The rectangular regions may be referred to as tiles. One or more tiles may be aggregated to form a tile group or slice. In this case, the tile group header may be linked to the PPS, and the PPS may be linked to the SPS. According to the existing method, the ALF data (ALF parameter) is included in the tile group header. Considering that one video consists of a plurality of pictures and one picture includes a plurality of tiles, the frequent ALF data (ALF parameter) signaling in units of tile groups reduces coding efficiency.

According to an embodiment proposed in the present disclosure, the ALF parameter may be included in the APS and signaled as follows.

Figure 11:
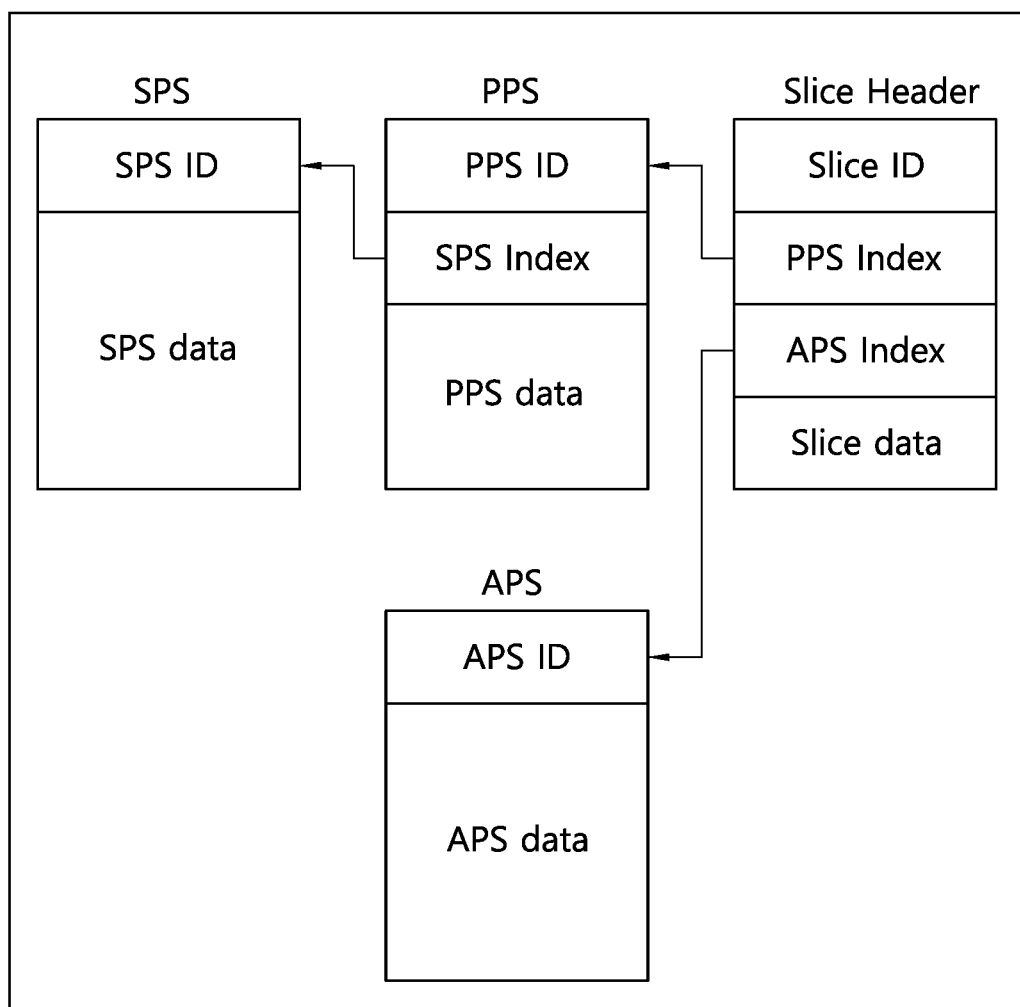
FIG. 11 shows another example of a hierarchical structure of ALF data.

FIG. 11 shows another example of a hierarchical structure of ALF data.

Referring to FIG. 11, a CVS 1100 may include an SPS, one or more PPSs, one or more APSs, and one or more coded pictures that follow. That is, an APS is defined, and the APS may carry necessary ALF data (ALF parameters). In addition, the APS may have self-identification parameters and ALF data. The self-identification parameter of the APS may include an APS ID. That is, the APS may include information indicating the APS ID in addition to the ALF data field. The tile group header or the slice header may refer to the APS using APS index information. In other words, the tile group header or the slice header may include APS index information, and the ALF process for the target block may be performed based on the ALF data (ALF parameter) included in the APS having the APS ID indicated by the APS index information. Here, the APS index information may be referred to as APS ID information.

In addition, the SPS may include a flag allowing the use of the ALF. For example, when CVS begins, an SPS may be checked, and the flag may be checked in the SPS. For example, the SPS may include the syntax of Table 1 below. The syntax of Table 1 may be a part of the SPS.

TABLE 2

| seq_parameter_set_rbsp( ) { | Descriptor |
|---|---|
| ... | |
| sps_alf_enabled_flag | u(1) |
| } | |

The semantics of syntax elements included in the syntax of Table 1 may be expressed, for example, as shown in Table 2 below.

TABLE 2 sps_alf_enabled_flag equal to 0 specifies that the adaptive loop filter is disabled.
sps_alf_enabled_flag equal to 1 specifies that the adaptive loop filter is enabled.

That is, the syntax element sps_alf_enabled_flag may indicate whether ALF is enabled. When the value of the ALF enabled flag sps_alf_enabled_flag signaled by the SPS (or SPS level) is 1, it may be determined that the ALF is enabled for pictures in the CVS referring to the SPS. In addition, when the value of sps_alf_enabled_flag is 0, it may be determined that the ALF is not enabled for pictures in the CVS referring to the SPS.

Meanwhile, as described above, the ALF may be individually turned on/off by signaling an additional enabled flag at a lower level than the SPS. For example, when the ALF tool is enabled for CVS, slice_alf_enabled_flag may be signaled in a tile group header or a slice header. For example, the slice header may include the syntax of Table 3 below.

TABLE 3

| slice_header( ) { | Descriptor |
|---|---|
| slice_pic_parameter_set_id | ue(v) |
| if( sps_alf_enabled_flag ) { | |
| slice_alf_enabled_flag | u(1) |
| if(slice_alf_enabled_flag ) | |
| num_alf_aps_ids | tb(v) |
| for(i = 0; i<num_alf_aps_ids;i++) | |
| slice_alf_aps_id_luma[i] | u(5) |
| slice_alf_chroma_idc | tu(v) |
| if(slice_alf_aps _chroma_idc && (slice_type != I \|\| num_alf_aps_ids != 1)) | |
| slice_alf_aps_id_chorma | u(5) |
| } | |

Semantics of syntax elements included in the syntax of Table 3 may be expressed, for example, as shown in the following table.

TABLE 4 slice_alf_enabled_flag equal to 1 specifies that adaptive loop filter is enabled and may be applied to Y, Cb, or Cr color component in a slice. slice_alf_enabled_flag equal to 0 specifies that adaptive loop filter is disabled for all color components in a tile group.
num_alf_aps_ids specifies the number of ALF APSs that the slice refers to. The value of num_alf_aps_ids shall be in the range of 0 to 6, inclusive.

TABLE 4-continued

The maximum value maxVal of the truncated binary binarization tb(v) is set equal to
1 for intra slices and slices in an IRAP picture, and set equal to 6 otherwise.
slice_alf_aps_id_luma[i] specifies the adaptation_parameter_set_id of the APS that the
slice refers to. The TemporalId of the APS NAL unit having adaptation_parameter_set_
id equal to tile_group_aps_id shall be less than or equal to the TemporalId of the coded
tile group NAL unit.
When multiple APSs with the same value of adaptation_parameter_set_id are referred to
by two of more tile groups of the same picture, the multiple APSs with the same value
of adaptation_parameter_set_id shall have the same content.
slice_alf_chroma_idc equal to 0 specifies that the adaptive loop filter is not applied to Cb and
Cr colour components, slice_alf_chroma_idc equal to 1 indicates that the adaptive loop filter is
applied to the Cb colour component. slice_alf_chroma_idc equal to 2 indicates that the adaptive
loop filter is applied to the Cr colour component. slice_alf_chroma_idc equal to 3 indicates that
the adaptive loop filter is applied to Cb and Cr colour components. When slice_alf chroma_idc
is not present, it is inferred to be equal to 0.
The maximum value maxVal of the trauncated unary binarization tu(v) is set equal to 3.
slice_alf_aps_id_chroma specifies the adaptation_parameter_set_id that the chroma
component of the slice refers to. When slice_alf_aps_id_chroma is not present, it is inferred to
be equal to slice_alf_aps_id _luma[ 0 ]. The TemporalId of the ALF APS NAL unit having
adaptation_parameter_set_id equal to slice_alf_aps_id_chroma shall be less than or equal to the
TemporalId of the coded slice NAL unit.
For intra slices and slices in an IRAP picture, slice_alf_aps_id_chroma shall not refer to an ALF
APS associated with other pictures rather than the picture containing the intra slices or the IRAP
picture.

The slice_alf_enabled_flag may be parsed/signaled when, for example, ALF is enabled at the SPS level. Each tile group composed of one or more tiles may determine whether ALF is enabled based on slice_alf_enabled_flag.

When the value of the ALF enabled flag sps_alf_enabled_flag signaled in a tile group header or a slice header is 1, ALF data may be parsed through the slice header. For example, the slice_alf_enabled_flag may specify an ALF enabling condition for luma and chroma components.

The ALF data may be accessed through APS ID information, that is, slice_alf_aps_id. An APS referenced by a corresponding tile group or a corresponding slice may be identified based on the APS ID information. The APS may include ALF data.

Meanwhile, the structure of the APS including the ALF data may be described based on, for example, the syntax of Table 5 below. The syntax of Table 5 may be a part of the APS.

TABLE 5

| adaptation_parameter_set_rbsp( ) { | Descriptor |
|---|---|
| adaptation_parameter_set_id | u(5) |
| alf_data( ) | |
| aps_extension_flag | u(1) |
| if( aps_extension_flag) | |
| while( more_rbsp_data( ) ) | |
| aps_extension_data_flag | u(1) |
| rbsp_trailing_bits( ) | |
| } | |

Semantics of syntax elements included in the syntax of Table 5 may be expressed, for example, as shown in Table 6 below.

TABLE 6 adaptation_parameter_set_id provides an identifier for the APS for reference by other syntax
elements.
NOTE - APSs can be shared across pictures and can be different in different tile groups within a picture.
aps_extension_flag equal to 0 specifies that no aps_extension_data_flag syntax elements are
present in the APS RBSP syntax structure. aps_extension_flag equal to 1 specifies that there are
aps_extension_data_flag syntax elements present in the APS RBSP syntax structure.
aps_extension_data_flag may have any value. Its presence and value do not affect decoder
conformance to profiles specified in this version of this Specification Decoders conforming to
this version of this Specification shall ignore all aps_extension_data_flag syntax elements.

As described above, the syntax element adaptation_parameter_set_id may indicate the identifier of the corresponding APS. That is, the APS may be identified based on the syntax element adaptation_parameter_set_id. The syntax element adaptation_parameter_set_id may be referred to as APS ID information. Also, the APS may include an ALF data field. The ALF data field alf_data( ) may be parsed/signaled after the syntax element adaptation_parameter_set_id.

Core processing/handling of ALF information may be performed in a slice header or a tile group header. The above described ALF data field may include information on processing of the ALF filter. For example, information that can be extracted from the ALF data field includes information on the number of filters used, information indicating whether the ALF is applied only to a luma component, information on a color component, information on an exponential golomb (EG) parameters and/or delta values of filter coefficients, etc.

Meanwhile, the ALF data field may include, for example, ALF data syntax as follows.

TABLE 7

| alf_data( adaptation_parameter_set_id ) { | Descriptor |
|---|---|
|   alf_luma_filter_signal_flag | u(1) |
|   alf_chroma_filter_signal_flag | u(1) |
|   if( alf_luma_filter_signal_flag ) { | |
|     alf_luma_clip_flag | u(1) |
|     alf_luma_num_filters_signalled_minus1 | tb(v) |
|     if( alf_luma_num_filters_signalled_minus1 > 0 ) { | |
|       for( filtIdx = 0: filtIdx < NumAlfFilters; filtIdx++ ) | |
|         alf_luma_coeff_delta_idx[ filtIdx ] | tb(v) |
|     } | |
|     alf_luma_use_fixed_filter_flag | u(1) |
|     if( alf_luma_use_fixed_filter_flag ) { | |
|       alf_luma_fixed_filter_set_idx | tb(v) |
|       alf_luma_fixed_filter_pred_present_flag | u(1) |
|       if( alf_luma_fixed_filter_pred_present_flag ) ( | |
|         for( i = 0: i < NumAlfFilters; i++ ) | |
|           alf_luma_fixed_filter_pred_flag[ i ] | u(1) |
|       } | |
|     } | |
|     alf_luma_coeff_delta_flag | u(1) |
|     if ( !alf_luma_coeff_delta_flag && | |
| alf_luma_num_filters_signalled_minus1 > 0 ) | |
|       alf_luma_coeff_delta_prediction_flag | u(1) |
|     alf_luma_min_eg_order_minus1 | ue(v) |
|     for( i = 0; i < 3; i++ ) | |
|       alf_luma_eg_order_increase_flag[ i ] | u(1) |
|     if( alf_luma_coeff_delta_flag ) { | |
|       for( sIdx = 0; sIdx <= alf_luma_num_filters_signalled_minus1; sIdx++ ) | |
|         alf_luma_coeff_flag[ sIdx ] | u(1) |
|     } | |
|     for( sIdx = 0; sIdx <= alf_luma_num_filters_signalled_minus1; sfIdx++ ) { | |
|       if( alf_luma_coeff_flag[ sfIdx ] ) { | |
|         for ( j = 0; j < 12; j++ ) { | |
|           alf_luma_coeff_delta_abs[ sIdx ][ j ] | uek(v) |
|           if( alf_luma_coeff_delta_abs[ sIdx ][ j ] ) | |
|             alf_luma_coeff_delta_sign[ sIdx ][ j ] | u(1) |
|         } | |
|       } | |
|     } | |
|     if( alf_luma_clip_flag ) { | |
|       alf_luma_clip_min_eg_order_minus1 | ue(v) |
|       for( i = 0; i < 3; i++ ) | |
|         alf_luma_clip_eg_order_increase_flag[ i ] | u(1) |
|       for( sfIdx = 0; sfIdx <= alf_luma_num_filters_signalled_minus1; sfIdx++ ) { | |
|         if( alf_luma_coeff_flag[ sfIdx ] ) { | |
|           for( j = 0; j < 12; j++) { | |
|             if( filtCoeff[ sfIdx ][ j ] | |
|               alf_luma_clip_idx[ sfIdx ][ j ] | uek(v) |
|           } | |
|         } | |
|       } | |
|     } | |
|   } | |
| } | |

TABLE 7-continued

| alf_data( adaptation_parameter_set_id ) { | Descriptor |
|---|---|
|   if( alf_chroma_filter_signal_flag > 0 ) { | |
|     alf_chroma_clip_flag | u(1) |
|     alf_chroma_min_eg_order_minus1 | ue(v) |
|     for( i = 0; i < 2; i++ ) { | |
|       alf_chroma_eg_order_increase_flag[ i ] | u(1) |
|     for( j = 0: j < 6: j++ ) { | |
|       alf_chroma_coeff_abs[ i ] | uek(v) |
|       if( alf_chroma_coeff_abs[ j ] > 0 ) | |
|         alf_chroma_coeff_sign[ j ] | u(1) |
|     } | |
|   if( alf_chroma_clip_flag ) { | |
|     alf_chroma_clip_min_eg_order_minus1 | ue(v) |
|     for( i = 0; i < 2; i++ ) | |
|       alf_chroma_clip_eg_order_increase_flag[ i ] | u(1) |
|     for( j = 0; j < 6; j++ ) { | |
|       if( alf_chroma_coeff_abs[ j ] ) | |
|         alf_chroma_clip_idx[ j ] | uek(v) |
|     } | |
|   } | |
| } | |
| } | |

Semantics of syntax elements included in the syntax of Table 7 may be expressed, for example, as shown in the following table.

Parsing of ALF data in the slice header is started by first parsing/signaling a syntax element alf_luma_filter_signal_flag indicating whether a luma filter set is signaled. Similarly, the syntax element alf_chroma_filter_signal_flag indicating whether a chroma filter is signaled may be parsed/signaled.

When alf_luma_filter_signal_flag is enabled, alf_luma_clip_flag may be parsed.

When this flag is disabled, it may specify that linear adaptive loop filtering is applied to the luma component. When this flag is enabled, it may specify that non-linear adaptive loop filtering is applied to the luma component.

In addition, information on the number of used luma filters may be parsed.

As an example, the maximum number of filters that may be used may be set to 25. When the number of signaled luma filters is at least one, for each filter in the range from 0 to the maximum number of filters (i.e., 25, which may alternatively be known as class), index information for the filter may be parsed/signaled. This may imply that every class (i.e., from 0 to the maximum number of filters) is associated with a filter index.

Next, alf_luma_use_fixed_filter_flag, which is a flag indicating whether a fixed filter is used in the current slice, may be parsed/signaled. When alf_luma_use_fixed_filter_flag is enabled, an index for the fixed filter set may be signaled using the alf_luma_fixed_filter_set_idx parameter. The parameter may have values ranging from 0 to 15. In addition, alf_luma_fixed_filter_pred_present_flag may be parsed/signaled. This flag may specify whether to predict the i-th filter coefficient using a fixed filter. Then, for each filter, a flag indicating whether a fixed filter is used for the corresponding filter may be decoded.

When a filter to be used for each class is labeled based on the filter index, alf_luma_coeff_delta_flag may be parsed/signaled. The flag may be used to interpret whether flag, alf_luma_coeff_delta_prediction_flag related to prediction of an ALF luma filter coefficient delta value exists in a slice header.

If the number of luma filters signaled by the syntax element alf_luma_num_filters_signalled_minus1 is greater than 0 and the value of the syntax element alf_luma_coeff_delta_flag is 0, it means that the syntax element alf_luma_coeff_delta_prediction_flag is present in the slice header and its status is evaluated. If the state of the syntax element alf_luma_coeff_delta_prediction_flag indicates 1, this may mean that luma filter coefficients are predicted from previous luma (filter) coefficients. If the state of the syntax element alf_luma_coeff_delta_prediction_flag indicates 0, this may mean that luma filter coefficients are not predicted from deltas of previous luma (filter) coefficients.

Furthermore, when delta filter coefficients (i.e., alf_luma_coeff_delta_abs) are coded based on the exponential Golomb code, order k (order-k) of the exponential Golomb (EG) code may be determined in order to decode the delta luma filter coefficients (i.e., alf_luma_coeff_delta_abs). For example, filter coefficients may be decoded based on exponential Golomb coding using order k. The order of the exponential Golomb code may be expressed as EG(k).

In order to determine the EG(k), the syntax element alf_luma_min_eg_order_minus1 may be parsed/signaled. The syntax element alf_luma_min_eg_order_minus1 may be an entropy-coded syntax element. The syntax element alf_luma_min_eg_order_minus1 may indicate a smallest order of an EG used for decoding the delta luma filter coefficients. For example, the value of the syntax element alf_luma_min_eg_order_minus1 may be in the range of 0 to 6.

After the syntax element alf_luma_min_eg_order_minus1 is parsed/signaled, the syntax element alf_luma_eg_order_increase_flag may be parsed/signaled. If the value of the syntax element alf_luma_eg_order_increase_flag is 1, this indicates that the order of the EG indicated by the syntax element alf_luma_min_eg_order_minus1 increases by 1. If the value of the syntax element alf_luma_eg_order_increase_flag is 0, this indicates that the order of the EG indicated by the syntax element alf_luma_min_eg_order_minus1 does not increase. The order of the EG may be represented by an index of the EG. The EG order (or EG index) (related to the luma component) based on the syntax element alf_luma_min_eg_order_minus1 and the syntax element alf_luma_eg_order_increase_flag may be determined, for example, as follows.

TABLE 9

1. The maximum golomb index is pre-defined according to the filter type. That is for a 5 × 5 filter the maximum golomb index is 2, and for a 7 × 7 the maximum golomb index is 3.
2. An initial constant, Kmin is set to be alf_luma_min_eg_order_minus1 + 1
3. For each index, i in the ange of {0 to maximun golomb index}, an intermediate array, i.e., KminTab[i] is computed, consisting of the sum of
   KminTab[i] = Kmin + alf_luma_eg_order_incrcase_flag[i]
4. Kmin is refreshed at the end of each iteration to be
   Kmin = KminTab[i]

Based on the determination process, expGoOrderY may be derived as expGoOrderY=KminTab. Through this, an array including EG orders can be derived, which can be used by the decoding apparatus. The expGoOrderY may indicate the EG order (or EG index).

The table below may represent a method for deriving the Golomb order based on the above-described algorithm. That is, the above-described algorithm may be based on the table below. In the table below, the Golomb index may be the input, and the k order to be used may be the corresponding output.

TABLE 10

|  | Golomb index = 0 | Golomb index = 1 | Golomb index = 2 |
|---|---|---|---|
| Kmin = 1 | 1 | 1 | 2 |
| alf_luma_eg_order_increase_flag[ i ] | 0 | 1 | 1 |
| Golomb order-k | 1 | 2 | 3 |

Referring to Table 10, the (minimum) Golomb order and/or the (minimum) Golomb index may be increased based on alf_eg_order_increase_flag[i]. For example, if alf_luma_min_eg_order_minus1=0, Kmin may be set to =0+1. When the Golomb index is 0, alf_luma_eg_order_increase_flag[i] may be parsed. When the flag is enabled (if available), the Golomb order corresponding to the Golomb index=0 may increase by 1 from the initial Kmin value. As shown in Table 11, when the flag is disabled (not available) when the Golomb index=0, the Golomb order may not increase. Kmin may be updated with the Golomb order and for example the Golomb index may be treated (updated) as 1. Here, the value of alf_luma_eg_order_increase_flag[1] may be 1. Therefore, the Kmin Golomb order can be increased to 2. Similarly, alf_luma_eg_order_increase_flag[2] is enabled (available), which may indicate that Kmin is increased by 1 to make the final golomb order 3.

Figure 12:
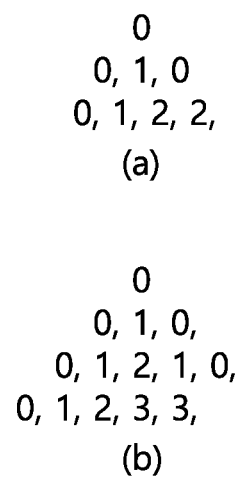

FIG. 12 exemplarily shows Golomb indexes of filter coefficients according to types of filters. (a) of FIG. 12 may represent a 5×5 filter, and (b) of FIG. 12 may represent a 7×7 filter. Here, only a part of the symmetric filter can be shown. In FIG. 12, the numbers of each position may represent pre-assigned Golomb indices for ALF filter coefficients corresponding to each position.

In one example, the kth-order Golomb order for a given filter coefficient may be determined by indexing the Golomb index of the given coefficient position into Table 11 above. Each ALF filter coefficient can be decoded using the k-th order.

In one example, there may be a pre-defined Golomb order index (i.e., golombOrderIdxY). The pre-defined Golomb order may be used to determine a final golomb order for coding the coefficients.

For example, the pre-defined Golomb order may be configured as, for example, the following equation.

$$\text{golombOrderIdx}Y[\ ]=0,0,1,0,1,2,1,0,0,1,2 \quad \text{[Equation 1]}$$

Here, the order k=expGoOrderY[golombOrderIdxY[j]], and j may represent the j-th signaled filter coefficient. For example, if j=2, that is, the third filter coefficient, golomborderIdxY[2]=1, and thus k=expGoOrderY[1].

In this case, for example, if the value of the syntax element alf_luma_coeff_delta_flag represents true, that is, 1, the syntax element alf_luma_coeff_flag may be signaled for every filter that is signaled. The syntax element alf_luma_coeff_flag indicates whether a luma filter coefficient is (explicitly) signaled.

When the EG order and the states of the aforementioned related flags (i.e., alf_luma_coeff_delta_flag, alf_luma_coeff_flag, etc.) are determined, difference information and sign information of the luma filter coefficients may be parsed/signaled (i.e., alf_luma_coeff_flag is true), if indicated). Delta absolute value information (alf_luma_coeff_delata_abs syntax element) for each of the 12 filter coefficients may be parsed/signaled. In addition, if the syntax element alf_luma_coeff_delta_abs has a value, sign information (syntax element alf_luma_coeff_delta_sign) may be parsed/signaled. The information including the difference information and the sign information of the luma filter coefficients may be referred to as information about the luma filter coefficients.

The deltas of the filter coefficients may be determined along with the sign and stored. In this case, the deltas of the signed filter coefficients may be stored in the form of an array, which may be expressed as filterCoefficients. The deltas of the filter coefficients may be referred to as delta luma coefficients, and the deltas of the signed filter coefficients may be referred to as signed delta luma coefficients.

To determine the final filter coefficients from the signed delta luma coefficients, the (luma) filter coefficients may be updated as the follow equation.

$$\text{filterCoefficients}[\text{sigFiltIdx}][j]\mathrel{+}=\text{filterCoefficients}[\text{sigFiltIdx}][j] \quad \text{[Equation 2]}$$

Here, j may indicate a filter coefficient index, and sigFiltIdx may indicate a signaled filter index. j={0, . . . , 11} and sigFiltIdx={0, . . . alf_luma_filters_signaled_minus1}.

The coefficients may be copied into the final AlfCoeffL [filtIdx][j]. In this case, filtidx=0, . . . , 24 and j=0, . . . , 11.

The signed delta luma coefficients for a given filter index may be used to determine the first 12 filter coefficients. For example, the thirteenth filter coefficient of the 7×7 filter may be determined based on the following equation. The thirteenth filter coefficient may indicate the above-described center tap filter coefficient.

$$\text{AlfCoeff}_L[\text{filtIdx}][12]=128-\Sigma_k\text{AlfCoeff}_C[\text{filtIdx}][k]\ <<1 \quad \text{[Equation 3]}$$

Here, the filter coefficient index 12 may indicate a thirteenth filter coefficient.

For example, in order to ensure bitstream conformance, the range of the values of the final filter coefficients AlfCoeffL[filtIdx][k] is 0, . . . , 11 may range from $-2^7$ to $2^7-1$, and may range from 0 to $2^8-1$ when k is 12. Here, k may be replaced with j.

When processing on the luma component is performed, processing on the chroma component may be performed based on the syntax element alf_chroma_idc. If the value of the syntax element alf_chroma_idc is greater than 0, the minimum EG order information for the chroma component (i.e., the syntax element alf_chroma_min_eg_order_minus1) may be parsed/signaled. According to the above-described embodiment of the present document, a 5×5 diamond filter shape may be used for the chroma component. In this case, the maximum golomb index may be 2. In this case, the EG order (or EG index) for the chroma component may be determined, for example, as follows.

TABLE 11

1. An initial constant, Kmin is set to be
   alf_chroma_min_eg_order_minus1 + 1
2. For each index, i in the range of {0 to maximum
   golomb index}, an intermediate array, i.e.,
   KminTab[i] is computed, consisting of the sum of
   KminTab[i] = Kmin + alf_chroma_eg_order_increase_flag[i]
3. Kmin is refreshed at the end of each iteration to be
   Kmin = KminTab[i]

Based on the determination process, expGoOrderC may be derived as expGoOrderC=KminTab. Through this, an array including EG orders can be derived, which can be used by the decoding apparatus. The expGoOrderC may indicate the EG order (or EG index) for the chroma component.

If alf_luma_clip_flag is enabled (if available), the minimum exponential Golomb order for clipping can be parsed. Similar to ALF coefficient signaling, alf_luma_clip_eg_order_increase_flag may be parsed. Then, for each filter index, alf_luma_doeff_flag is enabled (available), and if filter coefficients (i.e., j=0 . . . 1) exist, the clipping index may be parsed.

Once the luma filter coefficients are reconstructed, the chroma coefficients may also be parsed. Furthermore, there may be a pre-defined golomb order index (golombOrderIdxC). The pre-defined golomb order may be used to determine a final golomb order for coding the coefficients.

For example, the pre-defined golomb order may be configured as, for example, the following equation.

$$golombOrderIdxC[\ ]=\{0,0,1,0,0,1\} \quad \text{[Equation 4]}$$

Here, the order k=expGoOrderC[golombOrderIdxC[j]], and j may represent the j-th signaled filter coefficient. For example, if j=2, it indicates the third filter coefficient, golomborderIdxY[2]=1, and thus k=expGoOrderC[1].

Based on this, absolute value information and sign information of the chroma filter coefficients may be parsed/signaled. Information including absolute value information and sign information of the chroma filter coefficients may be referred to as information on the chroma filter coefficients. For example, a 5×5 diamond filter shape may be applied to the chroma component, and in this case, absolute delta information (the syntax element alf_chroma_coeff_abs) for each of the six (chroma component) filter coefficients may be parsed/signaled. In addition, if the value of the syntax element alf_chroma_coeff_abs is greater than 0, sign information (the syntax element alf_chroma_coeff_sign) may be parsed/signaled. For example, the six chroma filter coefficients may be derived based on information on the chroma filter coefficients. In this case, the seventh chroma filter coefficient may be determined based on the following equation, for example. The seventh filter coefficient may represent the above-described center tap filter coefficient.

$$golombOrderIdxC[\ ]=\{0,0,1,0,0,1\} \quad \text{[Equation 5]}$$

Here, the filter coefficient index 6 may indicate a seventh filter coefficient. For reference, since the filter coefficient index starts from 0, a value of 6 may indicate a seventh filter coefficient.

For example, in order to ensure bitstream conformance, the range of the values of the final filter coefficients AlfCoeffC[filtIdx][k] may be from $-2^7$ to $2^7-1$ when k is 0, . . . , 5, and the range of the values of the final filter coefficients AlfCoeffC[filtIdx][k] may be from $-2^8$ to $2^8-1$ when k is 6. Here, k may be replaced with j.

Then, similarly to the case of luma, when a clipping index for chroma is determined, alf_luma_clip_flag may be checked. If the flag is enabled (if available), the minimum Golomb order for clipping may be parsed. Then the alf_chroma_clip_index may be parsed if the filter coefficients are present.

As described above, when the (luma/chroma) filter coefficients are derived, ALF based filtering may be performed based on the filter coefficients or a filter including the filter coefficients. Through this, modified reconstructed samples may be derived, as described above. In addition, multiple filters may be derived, and filter coefficients of one of the multiple filters may be used for the ALF process. For example, one of the plurality of filters may be indicated based on the signaled filter selection information. Or, for example, one of the plurality of filters may be selected based on the activity and/or directionality of the current block or the ALF target block, and filter coefficients of the selected filter may be used for the ALF process.

Once the layer information from the APS and slice header is decoded, the coding tree unit (CTU) is decoded. One Network Abstraction Layer (NAL) unit may include a slice header and slice data. Slice data may facilitate decoding of a coding tree unit.

The table below exemplarily represents the syntax of the coding tree unit.

TABLE 12

| coding_tree_unit( ) { | Descriptor |
|---|---|
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| if( slice_sao_luma_flag \|\| slice_sao_chroma_flag ) | |
|   sao( xCtb >> CtbLog2SizeY, yCtb >> CtbLog2SizeY ) | |
| if( slice_alf_enabled_flag ) | |
|   alf_ctb_flag[ 0 ][ xCtb >> Log2CtbSize ][yCtb >> Log2CtbSize ] | ae(v) |
|   if( alf_ctb_flag[ 0 ][ xCtb >> Log2CtbSize ][ yCtb >> Log2CtbSize ] ) { | |
|     if( num_alf_aps_ids > 0) | |
|       alf_ctb_use_first_aps_flag | ae(v) |
|     if( !alf_ctb_use_first_aps_flag ) { | |
|       if( num_alf_aps _ids > 1 ) | |
|         alf_use_aps_flag | ae(v) |
|       if( alf_use_aps_flag ) | |
|         alf_luma_prev_filter_idx_minus1 | ae(v) |
|       else | |
|         alf_luma_fixed_filter_idx | ae(v) |

TABLE 12-continued

| coding_tree_unit( ) { | Descriptor |
|---|---|
|     } | |
|   } | |
|   if( slice_alf_chroma_idc = = 1 \|\| slice_alf_chroma_idc = = 3 ) | |
|     alf_ctb_flag[ 1 ][ xCtb >> Log2CtbSize ][ yCtb >> Log2CtbSize ] | ae(v) |
|   if( slice_alf_chroma_idc = = 2 \|\| slice_alf_chroma_idc = = 3 ) | |
|     alf_ctb_flag[ 2 ][ xCtb >> Log2CtbSize ][ yCtb >> Log2CtbSize ] | ae(v) |
| } | |
| if( slice_type = = I && qtbtt_dual_tree_intra_flag ) | |
|   dual_tree_implicit_qt_split( xCtb, yCtb, CtbSizeY, 0 ) | |
| else | |
|   coding_tree( xCtb, yCtb, CtbSizeY, CtbSizeY, 1, 0, 0, 0, 0, 0, 0, | |
| SINGLE_TREE ) | |
| } | |

The semantics of syntax elements included in the syntax of Table 12 may be expressed, for example, as shown in the following table.

TABLE 13

The CTU is the root node of the coding tree structure.
The array IsInSmr[ x ][ y ] specifying whether the sample at ( x, y) is located inside a shared merging candidate list region, is initialized as follows for x = 0..CtbSizeY – 1 and y = 0..CtbSizeY – 1:
    IsInSmr[ x ][ y ] = FALSE
alf_ctb_flag[ cIdx ][ xCtb >> Log2CtbSize ][ yCtb >> Log2CtbSize ] equal to 1 specifies that the adaptive loop filter is applied to the coding tree block of the colour component indicated by cIdx of the coding tree unit at luma location ( xCtb, yCtb ), alf_ctb_flag [ cIdx ][ xCtb >> Log2CtbSize ][ yCtb >> Log2CtbSize ] equal to 0 specifies that the adaptive loop filter is not applied to the coding tree, block of the colour component indicateD by cIdx of the coding tree unit at luma location ( xCtb, yCtb ).
When alf_ctb_flag[ cIdx ][ xCtb >> Log2CtbSize ][ yCtb >> Log2CtbSize ] is not present, it is inferred to be equal to 0.
alf_ctb_use_first_aps_flag equal to 1 sepcifies that the filter information in APS with adaptive_parameter_set_id equal to slice_alf_aps_id_luma[ 0 ] is used.
alf_ctb_use_first_aps_flag equal to 0 specifies that the luma CTB does not use the filter information in APS with adaptive_parameter_set_id equal to slice_alf_aps_id_luma[ 0 ]. When alf_ctb_use_first_aps_flag is not present, it is inferred to be equal to 0.
alf_use_aps_flag equal to 0 specifies that one of the fixed filter-sets is applied to the luma CTB.
alf_use_aps_flag equal to 1 specifies that a filter set from an APS is applied to the luma CTB.
When alf_use_aps_flag is not present, it is inferred to be equal to 0.
alf_luma_prev_filter_idx_minus1 plus 1 specifies the previous filter that is applied to the luma CTB. The value of alf_luma_prev_filter_idx_minus1 shall be in a range of 0 to num_alf_aps_ids – 2, inclusive.
The variable AlfCtbFiltSetIdxY xCtb >> Log2CtbSize ][ yCtb >> Log2CtbSize ] specifying the filter set index for the luma CTB at location ( xCtb, yCtb ) is derived as follows:
– If alf_ctb_use_first_aps is equal to 1, AlfCtbFiltSetIdxY[ xCtb >> Log2CtbSize ][ yCtb >> Log2CtbSize ] is set equal to 16.
– Otherwise, if alf_use_aps_flag is equal to 0, AlfCtbFiltSetIdxY[ xCtb >> Log2CtbSize ][ yCtb >> Log2CtbSize ] is set equal to alf_luma_fixed_filter_idx.
– Otherwise, AlfCtbFiltSetIdxY[ xCtb >> Log2CtbSize ][ yCtb >> Log2CtbSize ] is set equal to 17 + alf_luma_prev_filter_idx_minus1.
alf_luma_fixed_filter_idx specifies the fixed filter that is applied to the hima CTB. The value of alf_luma_fixed_filter_idx shall be in a range of 0 to 15, inclusive.

In CTU level processing, when ALF is enabled for the slice, the syntax element alf_ctb_flag may be parsed/signaled. alf_ctb_flag may specify that ALF is applied to a coding tree block (CTB). When ALF is applied to CTB and the number of APS IDs transmitted is greater than 0, another flag alf_use_aps_flag may be parsed/signaled. When alf_use_aps_flag is 1, it may specify that filter information of APS is applied to luma CTB. However, when alf_use_aps_flag is deactivated, one of the fixed filter sets may be applied to the CTB.

In an embodiment of the present document, a coding process for efficiently applying the above-described ALF is proposed. According to an embodiment of the present document, an example of a binarization process for the syntax element alf_luma_fixed_filter_idx described above is proposed. Here, alf_luma_fixed_filter_idx may specify a fixed filter applied to (luma) CTB (reconstructed samples).

In one example, if alf_use_aps_flag is true (value of 1), the filter set from APS may be applied to (luma) CTB (reconstructed samples) and based on information about the previous filter (eg alf_luma_prev_filter_idx_minus1) Filter coefficients may be derived. When alf_use_aps_flag is false (a value of 0), a fixed filter may be applied to (luma) CTB (reconstructed samples). For example, the value of alf_luma_fixed_filter_idx may be in the range of 0 to 15.

The table below shows an example of a binarization process of syntax elements related to ALF.

TABLE 14

| Syntax structure | Syntax element | Binarization Process | Input parameters |
|---|---|---|---|
| coding tree unit( ) | alf_ctb_flag[ ][ ][ ] | FL | cMax = 1 |
| | alf_ctb_use_first_aps_flag | FL | cMax = 1 |
| | alf_use_aps_flag | FL | cMax = 1 |
| | alf_luma_fixed_filter_idx | TB | cMax = 15 |
| | alf_luma_prev_filter_idx_minus1 | TB | cMax = num_alf_aps_ids − 2 |

In Table 14, the syntax element alf_luma_fixed_filter_idx may be coded based on a truncated binary (TB) binarization process. For example, the maximum value (ex. cMax) related to the syntax element may be 15. According to the TB binarization process, only complexity can be unnecessarily increased without any additional benefit. To this end, the following example based on a fixed length (FL) binarization process is proposed.

The table below shows another example of information for binarization of syntax elements related to the ALF procedure.

TABLE 15

| Syntax structure | Syntax element | Binarization Process | Input parameters |
|---|---|---|---|
| coding tree unit( ) | alf_ctb_flag[ ][ ][ ] | FL | cMax = 1 |
| | alf_ctb_use_first_aps_flag | FL | cMax = 1 |
| | alf_use_aps_flag | FL | cMax = 1 |
| | alf_luma_fixed_filter_idx | FL | cMax = 15 |
| | alf_luma_prev_filter_idx_minus1 | TB | cMax = num_alf_aps_ids − 2 |

Table 15 is described with a focus on differences from Table 14. In Table 15, the syntax element alf_luma_fixed_filter_idx may be coded based on the FL binarization process. For example, the maximum value (ex. cMax) related to the syntax element may be expressed using 4 bits.

The table below shows an example of assigning ctxInc to syntax elements with context coded bins as context coded bins according to Table 15 above. In Table 15, for example, a bin having a binIdx greater than or equal to 5 may not exist (or may not be available) for the syntax element alf_luma_fixed_filter_idx.

TABLE 16

| | binIdx | | | | | |
|---|---|---|---|---|---|---|
| Syntax element | 0 | 1 | 2 | 3 | 4 | >= 5 |
| end_of_brick_one_bit | terminate | na | na | na | na | na |
| alf_ctb_flag[ ][ ][ ] | 0 . . . 8 (clause 9.5.4.2.2) | na | na | na | na | na |
| alf_ctb_use_first_aps_flag | 0 | na | na | na | na | na |
| alf_use_aps_flag | 0 | na | na | na | na | na |
| alf_luma_fixed_filter_idx | bypass | bypass | bypass | bypass | bypass | na |
| alf_luma_prev_filter_idx_minus1 | bypass | bypass | bypass | bypass | bypass | bypass |

According to an embodiment of the present disclosure, an example of a binarization procedure for the aforementioned syntax element alf_luma_fixed_filter_set_idx is proposed. Here, alf_luma_fixed_filter_set_idx may specify an index of a fixed filter set.

For example, a fixed length (FL) binarization procedure may be applied for signaling of alf_luma_fixed_filter_set_idx.

The table below exemplifies the ALF data syntax.

TABLE 17

| alf_data( adaptation_parameter_set_id ) { | Descriptor |
|---|---|
| alf_luma_filter_signal_flag | u(1) |
| alf_chroma_filter_signal_flag | u(1) |
| if( alf_luma_filter_signal_flag ) { | |
|   alf_lama_clip_flag | u(1) |
|   alf_luma_num_filters_signalled_minus1 | tb(v) |
|   if( alf_luma_num_filters_signalled_minus1 > 0 ) { | |
|     for( filtIdx = 0; filtIdx < NumAlfFilters; filtIdx++ ) | |
|       alf_luma_coeff_delta_idx[ filtIdx ] | tb(v) |
|   } | |
|   alf_luma_use_fixed_filter_flag | u(1) |
|   if( alf_luma_use_fixed_filter_flag ) { | |
|     alf_luma_fixed_filter_set_idx | u(4) |
|     alf_luma_fixed_filter_pred_present_flag | u(1) |
|     if( alf_luma_fixed_filter_pred_present_flag ) { | |
|       for( i = 0; i < NumAlfFilters; i++ ) | |
|         alf_luma_fixed_filter_pred_flag[ i ] | u(1) |
|     } | |
|   } | |
| } | |

Referring to the above table, alf_luma_fixed_filter_set_idx may be coded based on a fixed length (FL) binarization procedure rather than a truncated binary (TB) binarization procedure. The semantics of alf_luma_fixed_filter_set_idx included in the table may be expressed, for example, as shown in the following table.

TABLE 18 alf_luma_fixed_filler_set_idx specifies a fixed filler set index. The value of alf_luma_fixed_filter_set_idx shall be in range of 0 to 15, inclusive.

In an embodiment of the present document, a signaling method related to ALF coefficients for simplifying a signaling derivation process of Golomb orders is proposed. For example, in an embodiment of the present document, the proposed method may be achieved through fixed signaling. In one example, the kth order of the exponential Golomb code may be fixed at 2 for luma and 3 for chroma. However, the embodiment of the present document is not necessarily limited by such an example, and the k order may be fixed to another appropriate value.

The table below shows the syntax of the ALF data field to which the above-described simplification is applied.

TABLE 19

| alf_data( adaptation_parameter_set_id ) { | Descriptor |
|---|---|
|   alf_luma_filter_signal_flag | u(1) |
|   alf_chroma_filter_signal_flag | u(1) |
|   if( alf_luma_filter_signal_flag ) { | |
|     alf_luma_clip_flag | u(1) |
|     alf_luma_num_filters_signalled_minus1 | tb(v) |
|     if( alf_luma_num_filters_signalled_minus1 > 0 ) { | |
|       for( filtIdx = 0; filtIdx < NumAlfFilter; filtIdx++ ) | |
|         alf_luma_coeff_delta_idx[ filtIdx ] | tb(v) |
|     } | |
|     alf_luma_use_fixed_filter_flag | u(1) |
|     if( alf_luma_use_fixed_filter_flag ) { | |
|       alf_luma_fixed_filter_set_idx | tb(v) |
|       alf_luma_fixed_filter_pred_present_flag | u(1) |
|       if( alf_luma_fixed_filter_pred_present_flag ) { | |
|         for( i = 0; i < NumAlfFilters: i++ ) | |
|           alf_luma_fixed_filter_pred_flag[ i ] | |
|       } | |
|     } | |
|     alf_luma_coeff_delta_flag | u(1) |
|     if( !alf_luma_coeff_delta_flag && | |
| alf_luma_num_filters_signalled_minus1 > 0 ) | |
|       alf_luma_coeff_delta_prediction_flag | u(1) |
|     if( alf_luma_coeff_delta_flag ) { | |
|       for( sfIdx = 0; sfIdx <= alf_luma_num_filters_signalled_minus1; sfIdx++ ) | |
|         alf_luma_coeff_flag[ sfIdx ] | |
|     } | |
|     for( sfIdx = 0; sfIdx <= alf_luma_num_filters_signalled_minus1; sfIdx++ ) { | |
|       if( alf_luma_coeff_flag[ sfIdx ] ) { | |
|         for (j = 0; j < 12; j++ ) { | |
|           alf_luma_coeff_delta_abs[ sfIdx ][ j ] | uek(v) |
|           if( alf_luma_coeff_delta_abs[ sfIdx ][ j ] ) | |
|             alf_luma_coeff_delta_sign[ sfIdx ][ j ] | u(1) |
|         } | |
|       } | |
|     } | |
|     if( alf_luma_clip_flag ) { | |
|       alf_luma_clip_min_eg_order_minus1 | ue(v) |
|       for( i = 0; i < 3; i++ ) | |
|         alf_luma_clip_eg_order_increase_flag[ i ] | u(1) |
|       for( sfIdx = 0; sfIdx <= alf_luma_num_filters_signalled_minus1; sfIdx++ ) { | |
|         if( alf_luma_coeff_flag[ sfIdx ] ) | |
|           for( j = 0; j < 12; j++ ) { | |
|             if( filtCoeff[ sfIdx ][ j ] ) | |
|               alf_luma_clip_idx[ sfIdx ][ j ] | uek(v) |
|           } | |
|       } | |
|     } | |
|   } | |
|   if(alf_chroma_filter_signal_flag ) { | |
|     alf_chroma_clip_flag | u(1) |
|     for( j = 0; j < 6; j++ ) { | |
|       alf_chroma_coeff_abs[ j ] | uek(v) |
|       if( alf_chroma_coeff_abs[ j ] > 0 ) | |
|         alf_chroma_coeff_sign[ j ] | u(1) |
|     } | |
|     if( alf_chroma_clip_flag ) { | |
|       alf_chroma_clip_min_eg_order_minus1 | ue(v) |
|       for( i = 0; i < 2; i++ ) | |
|         alf_chroma_clip_eg_order_increase_flag[ i ] | u(1) |
|       for( j = 0; j < 6; j++ ) { | |
|         if( alf_chroma_coeff_abs[ j ] ) | |
|           alf_chroma_clip_idx[ j ] | uek(v) |
|       } | |
|     } | |
|   } | |
| } | |

Semantics of syntax elements included in the syntax of Table 19 may be expressed, for example, as shown in the following table.

TABLE 20 alf_luma_coeff_flag[ sigFiltIdx ] equal 1 specifies that the coefficients of the luma filter indicated by sigFiltIdx are signalled, alf_luma_coef_flag[ sigFiltIdx ] equal to 0 specifies that all filter coefficients of the luma filter indicated by sigFiltIdx are set equal to 0. When not present, alf_luma_coeff_flag[ sigFiltIdx ] is set equal to 1.
alf_luma_coeff_delta_abs[ sigFiltIdx ][ j ] specifies the absolute value of the j-th coefficient delta of the signalled luma filter indicated by sigFiltIdx. When alf_luma_coeff_delta_abs[ sigFiltIdx ][ j ] is not present, it is inferred to be equal 0.
The order k of the exp-Golomb binarization uek(v) is
    k = 2
alf_luma_coeff_delta_sign[ sigFiltIdx ][ j ] specifies the sign of the j-th luma coefficient of the filter indicated by sigFiltIdx as follows:
– If alf_luma_coeff_delta_sign[ sigFiltIdx ][ j ] is equal to 0, the corresponding luma filter coefficient has a positive value.
– Otherwise (alf_luma_coeff_delta_sign[ sigFiltIdx ][ j ] is equal to 1), the corresponding luma filter coefficient has a negative value.
When alf_luma_coeff_delta_sign[ sigFiltIdx ][ j ] is not present, it is inferred to be equal to 0.
The variable filterCoefficients[ sigFiltIdx ][ j ] with sigFiltIdx = 0..alf_luma_num_filters_signalled_minus1, j = 0..11 is initialized as follows:
    filterCoefficients[ sigFiltIdx ][ i ] = alf_luma_coeff_delta_abs[ sigFiltIdx ][ j ] *
                       (1 − 2 * alf_luma_coeff_delta_sign[ sigFiltIdx ][ j ] )
When alf_luma_coeff_delta_prediction_flag is equal 1, filterCoefficients[ sigFiltIdx ][ j ] with sigFiltIdx = 1..alf_luma_num_filters_signalled_minus1 and j = 0..11 are modified as follows:
    filterCoefficients[ sigFiltIdx ][ j ] += filterCoefficients[ sigFilfIdx − 1 ][ j ]
The luma filter coefficients AlfCoeff$_L$ with elements AlfCoeff$_L$[ filtIdx ][ j ], with filtIdx = 0..NumAlfFilters − 1 and j = 0..11 are derived as follows
    AlfCoeff$_L$[ filtIdx ][ j ] = filterCoefficients[ alf_luma_coeff_delta_idx[ filtIdx ] ][ j ]
The last filter coefficients AlfCoeff$_L$[ filtIdx ][ 12 ] for filtIdx = 0..NumAlfFilters − 1 are derived as follows:
    AlfCoeff$_L$[ filtIdx ][ 12 ] = 128 $\Sigma_k$ ( AlfCoeff$_L$[ filtIdx ][ k ] << 1 ), with k = 0..11
It is a requirement of bitstream conformance that the values of AlfCoef$_L$[ filtIdx ][ j ] with filtIdx = 0..NumAlfFilters − 1, j = 0..11 shall be in the range of $-2^7$ to $2^7 - 1$, inclusive and that the values of AlfCoef$_L$[ filtIdx ][ 12 ] shall be in the range of 0 to $2^8 - 1$, inclusive.
alf_chroma_coeff_abs[ j ] specifies the absolute value of the j-th chroma filter coefficient.
When alf_chroma_coeff_abs[ j ] is not present, it is inferred to be equal 0. It is a requirement of bitstream conformance that the values of alf_chroma_coeff_abs[ j ] shall be in the range of 0 to $2^7 - 1$, inclusive.
The order k of the exp-Golomb binarization uek(v) is derived as follows:
    k = 3

In an embodiment of the present document, a method of using pre-determined Golomb orders for each ALF filter coefficient is proposed.

The table below exemplarily shows the Golomb order (kth order) used for decoding the ALF luma coefficients. C0 to C11 denote ALF luma coefficient indices (or, for example, filter coefficients depending on positions in the filter shape for the ALF according to FIG. 6), where, for example, the kth order may be 2 or 3.

TABLE 21

| Coefficient Index | $k^{th}$ order |
|---|---|
| $C_0$ | 2 |
| $C_1$ | 2 |
| $C_2$ | 2 |

TABLE 21-continued

| Coefficient Index | $k^{th}$ order |
|---|---|
| $C_3$ | 2 |
| $C_4$ | 2 |
| $C_5$ | 3 |
| $C_6$ | 3 |
| $C_7$ | 3 |
| $C_8$ | 2 |
| $C_9$ | 2 |
| $C_{10}$ | 2 |
| $C_{11}$ | 3 |

The table below exemplifies semantics based on coding according to this embodiment. For example, the table below may be semantics modified to fix the Golomb order for the luma coefficients or the chroma coefficients.

TABLE 22

The variable NumAlfFilters specify mg the number ot different adaptive loop filters is set equal to 25.
alf_luma_num_filters_signalled minus1 plus 1 specifies the number of adpative loop filter classes for which luma coefficients can be signaled. The value of alf_luma_num_filters_ signalled_minus1 shall be in the range of 0 to NumAlfFilters − 1, inclusive.
The maximum value maxVal of the truncated binary binarization tb(v) is set equal to NumAlfFilters − 1.
alf_luma_coeff_delta_idx[ filtIdx ] specifies the indices of the signalled adaptive loop filter luma coefficient deltas for the filter class indicated by filtIdx ranging from 0 to NumAlfFilters − 1. When alf_luma_coeff_delta_idx[ filtIdx ] is not present, it is inferred to be TABLE 22-continued equal to 0.
The maximum value maxVal of the truncated binary binarization th(v) is set equal to
alf_luma_num_filters_signalled_minus1.
alf_luma_coeff_delta_flag equal to 1 indicates that alf_luma_coeff_delta_prediction_flag is
not signalled. alf_luma_coeff_delta_flag equal to 0 indicates that
alf_luma_coeff_delta_prediction_flag may be signalled.
alf_luma_coeff_delta_prediction_flag equal to 1 specifies that the signalled luma filter
coefficient deltas are predicted from the deltas of the previous luma coefficients.
alf_luma_coeff_delta_prediction_flag equal to 0 specifies that the signalled luma filter
coefficient deltas are not predicted from the deltas of the previous luma coefficients. When not
present, alf_luma_coeff_delta_prediction_flag is inferred to be equal to 0.
alf_luma_coeff_flag[ sigFiltIdx ] equal 1 specifies that the coefficients of the luma filter
indicated by sigFiltIdx are signalled. alf_luma_coeff_flag[ sigFiltIdx ] equal to 0 specifies that
all filter coefficients of the luma filter indicated by sigFiltIdx are set equal to 6. When not
present, alf_luma_coeff_flag[ sigFiltIdx ] is set equal to 1.
alf_luma_coeff_delta_abs[ sigFiltIdx ][ j ] specifies the absolute value of the j-th coefficient
delta of the signalled luma filter indicated by sigFiltIdx. When
alf_luma_coeff_delta_abs[ sigFiltIdx ][ j ] is not present, it is inferred to be equal 0.
The order k of the exp-Golomb binarization uek(v) is
    expGoOrderY = { 2, 2, 2, 2, 2, 3, 3, 3, 2, 2, 2, 3 }
    k = expGoOrderY[ j ]
alf_luma_coeff_delta_sign[ sigFiltIdx ][ j ] specifies the sign of the j-th luma coefficient of the
filter indicated by sigFiltIdx as follows:
– If alf_luma_coeff_delta_sign[ sigFiltIdx ][ j ] is equal to 0, the corresponding luma filter
  coefficient has a positive value.
– Otherwise (alf_luma_coeff_delta_sign[ sigFiltIdx ][ j ] is equal to 1), the corresponding
  luma filter coefficient has a negative value.
When alf_luma_coeff_delta_sign[ sigFiltIdx ][ j ] is not present, it is inferred to be equal to 0.
The variable filterCoefficients[ sigFiltIdx ][ j ] with
sigFiltIdx = 0..alf_luma_num_filters_sigralled_minus1, j = 0..11 is initialized as follows:
    filterCoefficients[ sigFiltIdx ][ j ] = alf_luma_coeff_delta_abs[ sigFiltIdx ][ j ] *
                    ( 1 − 2 * alf_luma_coeff_delta_sign[ sigFiltIdx ][ j ] )
When alf_luma_coeff_delta_prediction_flag is equal 1, filterCoefficients[ sigFiltIdx ][ j ] with
sigFiltIdx = 1..alf_luma_num_filters_signalled_minus1 and j = 0..11 are modified as follows:
    filterCoefficients[ sigFiltIdx ][ j ] += filterCoefficients[ sigFiltdx − 1 ][ j ]
The luma filter coefficients AlfCoeff$_L$ with elements AlfCoeff$_L$[ filtIdx ][ j ], with
filtIdx = 0..NumAlfFilters − 1 and j = 0..11 are derived as follows
    AlfCoeff$_L$[ filtIdx ][ j ] = filterCoefficients[ alf_luma_coeff_delta_idx[ filtIdx ] ][ j ]
The last filter coefficients AlfCoeff$_L$[ filtIdx ][ 12 ] for filtIdx = 0..NumAlfFilters − 1 are
derived as follows:
    AlfCoeff$_L$[ filtIdx ][ 12 ] = 128 − $\Sigma_k$ ( AlfCoeff$_L$[filtIdx][ k ] << 1 ), with k = 0..11
It is a requirement of bitstream conformance that the values of AlfCoeff$_L$[ filtIdx ][ j ] with
filtIdx = 0..NumAlfFilters − 1, j = 0..11 shall be in the range of −$2^7$ to $2^7$ − 1, inclusive and that
the values of AlfCoeff$_L$[ filtIdx ][ 12 ] shall be in the range of 0 to $2^8$ − 1, inclusive.
alf_chroma_coeff_abs[ j ] specifies the absolute value of the j-th chroma filter coefficient.
When alf_chroma_coeff_abs[ j ] is not present, it is inferred to be equal 0. It is a requirement of
bitstream conformance that the values of alf_chroma_coeff_abs[ j ] shall be in the range of 0 to
$2^7$ − 1, inclusive.
The order k of the exp-Golomb binarization uek(v) is
    k = 3
alf_chroma_coeff_sign[ j ] specifies the sign of the j-th chroma filter coefficient as follows:
– If alf_chroma_coeff_sign[ j ] is equal to 0, the corresponding chroma filter coefficient has a
  positive value.
– Otherwise (alf_chroma_coeff_sign[ j ] is equal to 1), the corresponding chroma filter
  coefficient has a negative value.
When alf_chroma_coeff_sign[ j ] is not present, it is inferred to be equal to 0.
The chroma filter coefficients AlfCoeff$_C$ with elements c$_C$[ j ], with j = 0..5 are derived as
follows:
    AlfCoeff$_C$[ j ] = alf_chroma_coeff_abs[ j ] * ( 1 − 2 * alf_chroma_coeff_sign[ j ] )
The last filter coefficient for j = 6 is derived as follows:
    AlfCoeff$_C$[ 6 ] = 128 − $\Sigma_k$ (AlfCoeff$_C$[ k ] << 1 ), with k = 0..5
It is a requirement of bitstream conformance that the values of AlfCoeff$_C$[ j ] with j = 0..5 shall
be in the range of −$2^7$ − 1 to $2^7$ − 1, inclusive and that the values of AlfCoeff$_C$[ 6 ] shall be in the
range of 0 to $2^8$ − 1, inclusive.

In an embodiment of the present document, a method of signaling a fixed Golomb order only for chroma components is proposed. That is, an example of signaling for fixing the Golomb order for chroma components is implemented according to this embodiment.

The table below exemplarily shows the syntax of the ALF data field based on coding according to an embodiment of the present document.

TABLE 23

| alf_data( adaptation_paramerer_set_id ) { | Descriptor |
|---|---|
|   alf_luma_filter_signal_flag | u(1) |
|   alf_chroma_filter_signal_flag | u(1) |
|   if( alf_luma_filter_signal_flag ) { | |
|     alf_luma_clip_flag | u(1) |
|     alf_luma_num_filters_signalled_minus1 | tb(v) |
|     if( alf_luma_num_filters_signalled_minus1 > 0 ) { | |
|       for( filtIdx = 0; filtIdx < NumAlfFilters; filtIdx++ ) | |
|         alf_luma_coeff_delta_idx[ filtIdx ] | tb(v) |
|     } | |
|     alf_luma_use_fixed_filter_flag | u(1) |
|     if( alf_luma_num_fixed_filter_flag ) { | |
|       alf_luma_fixed_filter_set_idx | tb(v) |
|       alf_luma_fixed_filter_pred_present_flag | u(1) |
|       if( alf_luma_fixed_filter_pred_present_flag ) { | |
|         for( i = 0; i < NumAlfFilters; i++ ) | |
|           alf_luma_fixed_filter_pred_flag[ i ] | u(1) |
|       } | |
|     } | |
|     alf_luma_coeff_delta_flag | u(1) |
|     if( !alf_luma_coeff_delta_flag && alf_luma_num_filters_signalled_minus1 > 0 ) | |
|       alf_luma_coeff_delta_prediction_flag | u(1) |
|     alf_luma_min_eg_order_minus1 | ue(v) |
|     for( i = 0; i < 3; i++ ) | |
|       alf_luma_eg_order_increase_flag[ i ] | u(1) |
|     if( alf_luma_coeff_delta_flag ) { | |
|       for( sfIdx = 0; sfIdx = alf_luma_num_filters_signalled_minus1; sfIdx++) | |
|         alf_luma_coeff_flag[ sfIdx ] | u(1) |
|     } | |
|     for( sfIdx = 0; sfIdx <= alf_luma_num_filters_signalled_minus1; sfIdx++ ) { | |
|       if( alf_luma_coeff_flag[ sfIdx ] ) { | |
|         for( j = 0; j < 12; j++ ) | |
|           alf_luma_coeff_delta_abs[ sfIdx ][ j ] | uek(v) |
|           if( alf_luma_coeff_delta_abs[ sfIdx ][ j ] ) | |
|             alf_luma_coeff_delta_sign[ sfIdx ][ j ] | u(1) |
|         } | |
|       } | |
|     } | |
|     if( alf_luma_clip_flag ) { | |
|       alf_luma_clip_min_eg_order_minus1 | ue(v) |
|       for( i = 0; i < 3; i++ ) | |
|         alf_luma_clip_eg_order_increase_flag[ i ] | u(1) |
|       for( sfIdx = 0; sfIdx <= alf_luma_num_filters_signalled_minus1; sfIdx++ ) { | |
|         if( alf_luma_coeff_flag[ sfIdx ] ) { | |
|           for ( j = 0: j < 12; j++ ) | |
|             if( filtCoeff[ sfIdx ][ j ] ) | |
|               alf_luma_clip_idx[ sfIdx ][ j ] | uek(v) |
|           } | |
|         } | |
|       } | |
|     } | |
|   } | |
|   if( alf_chroma_filter_signal_flag ) { | |
|     alf_chroma_clip_flag | u(1) |
|     for( j = 0; j < 6; j++ ){ | |
|       alf_chroma_coeff_abs[ j ] | uek(v) |
|       if( alf_chroma_coeff_abs[ j ] > 0 ) | |
|         alf_chroma_coeff_sign[ j ] | u(1) |
|     } | |
|     if( alf_chroma_clip_flag ) { | |
|       alf_chroma_clip_min_eg_order_minus1 | ue(v) |
|       for( i = 0; i < 2; i++ ) | |
|         alf_chroma_clip_eg_order_increase_flag[ i ] | u(1) |
|       for( j = 0; j < 6; j++ ){ | |

TABLE 23-continued

| alf_data( adaptation_paramerer_set_id ) { | Descriptor |
|---|---|
|         if( alf_chroma_coeff_abs[ j ] ) | |
|            alf_chroma_clip_idx[ j ] | uek(v) |
|         } | |
|       } | |
|     } | |
| } | |

Semantics of syntax elements included in the syntax of Table 23 may be expressed, for example, as shown in the following table.

TABLE 24 alf_chroma_coeff_abs[ j ] specifies the absolute value of the j-th chroma filter coefficient. When alf_chroma_coeff_abs[ j ] is not present, it is inferred to be equal 0. It is a requirement of bitstream conformance that the values of alf_chroma_coeff_abs[ j ] shall be in the range of 0 to $2^7 - 1$, inclusive.
The order k of the exp-Golomb binarization uek(v) is:
        k = 3

In an embodiment of the present document, fixed signaling for coding information about ALF clipping (eg, alf_luma_clip_idx[sfIdx][j], alf_chroma_clip_idx[j] etc.) is proposed. For example, the k order Golomb may be pre-determined or pre-fixed and used as in the embodiments described above.

The table below exemplifies the syntax of the ALF data field based on coding according to the present embodiment.

TABLE 25

| alf_data( adaptation_parameter_set_id ) { | Descriptor |
|---|---|
|   alf_luma_filter_signal_flag | u(1) |
|   alf_chroma_filter_signal_flag | u(1) |
|   if( alf_luma_filter_signal_flag ) { | |
|     alf_luma_clip_flag | u(1) |
|     alf_luma_num_filters_signalled_minus1 | tb(v) |
|     if( alf_luma_num_filters_signalled_minus1 > 0 ) { | |
|       for( filtIdx = 0; filtIdx < NumAlfFilters; filtIdx++ ) | |
|         alf_luma_coef_delta_idx[ filtIdx ] | tb(v) |
|     } | |
|     alf_luma_use_fixed_filter_flag | u(1) |
|     if( alf_luma_use_fixed_filter_flag ) { | |
|       alf_luma_fixed_filter_set_idx | tb(v) |
|       alf_luma_fixed_filter_pred_present_flag | u(1) |
|       if( alf_luma_fixed_filter_pred_present_flag { | |
|         for( i = 0; i < NumAlfFilters; i++ ) | |
|           alf_luma_fixed_filter_pred_flag[ i ] | u(1) |
|       } | |
|     } | |
|     alf_luma_coeff_delta_flag | u(1) |
|     if( !alf_luma_coeff_delta_flag && alf_luma_num_filters_signalled_minus1 > 0 ) | |
|       alf_luma_coeff_delta_prediction_flag | u(1) |
|     alf_luma_min_eg_order_minus1 | ue(v) |
|     for( i = 0; i < 3; i++ ) | |
|       alf_luma_eg_order_increase_flag[ i ] | u(1) |
|     if( alf_luma_coeff_delta_flag ) { | |
|       for( sfIdx = 0; sfIdx <= alf_luma_num_filters_signalled_minus1; sfIdx++ ) | |
|         alf_luma_coeff_flag[ sfIdx ] | u(1) |
|     } | |
|     for( sfIdx = 0; sfIdx <= alf_luma_num_filters_signalled_minus1; sfIdx++ ) { | |
|       if( alf_luma_coeff_flag[ sfIdx ] ) { | |
|         for( j = 0; j < 12; j++ ) { | |
|           alf_luma_coeff_delta_abs[ sfIdx ][ j ] | uek(v) |
|           if( alf_luma_coeff_delta_abs[ sfIdx ][ j ] ) | |
|             alf_luma_coeff_delta_sign[ sfIdx ][ j ] | u(1) |
|         } | |
|       } | |

TABLE 25-continued

| alf_data( adaptation_parameter_set_id ) { | Descriptor |
|---|---|
|     } | |
|     if( alf_luma_clip_flag ) { | |
|         for( sfIdx = 0; sfIdx <= alf_luma_num_filters_signalled_minus1; sfIdx++ ) { | |
|             if( alf_luma_coeff_flag[ sfIdx ][ j ] { | |
|                 for( j = 0; j < 12; j++ ) { | |
|                   if( filtCoeff[ sfIdx ][ j ] ) | |
|                     alf_luma_clip_idx[ sfIdx ][ j ] | uek(v) |
|                 } | |
|             } | |
|         } | |
|     } | |
|     if( alf_chroma_filter_signal_flag ) { | |
|         alf_chroma_clip_flag | u(1) |
|         alf_chroma_min_eg_order_minus1 | ue(v) |
|         for( i = 0; i < 2; i++ ) | |
|             alf_chroma_eg_order_increase_flag[ i ] | u(1) |
|         for( j = 0; j < 6; j++ ) { | |
|             alf_chroma_coeff_abs[ j ] | uek(v) |
|             if( alf_chroma_coeff_abs[ j ] > 0 ) | |
|                 alf_chroma_coeff_sign[ j ] | u(1) |
|         } | |
|         if( alf_chroma_clip_flag ) { | |
|             for( j = 0; j < 6; j++ ) { | |
|                 if( alf_chroma_coef_abs[ j ] ) | |
|                   alf_chroma_clip_idx[ i ] | uek(v) |
|             } | |
|         } | |
|     } | |
| } | |

Semantics of syntax elements included in the syntax of Table 25 may be expressed, for example, as shown in the following table.

TABLE 26 alf_luma_clip_idx[ sfIdx ][ j ] specifies the clipping index of the clipping value to use before multiplying by the j-th coefficient of the signalled luma filter indicated by sfId x. When alf_luma_clip_idx[ sfIdx ][ j ] is not present, it is inferred to be equal 0 (no clipping): It is a requirement of bitstream conformance that the values of alf_luma_clip_idx[ sfIdx ][ j ] with sfIdx = 0..alf_luma_num_filters_signalled_minus1 and j = 0..11 shall be in the range of 0 to 3, inclusive.
The order k of the exp-Golomb binarization uek(v) is:
    k = 2
The variable filterClips[ sfIdx ][ j ] with sfIdx = 0..alf_luma_num_filters_signalled_minus1, j = 0..11 is initialized as fellows:
    filterClips[ sfIdx ][ j ] = Round ($2^{(BitDepthY * ( 4 - alf\_luma\_clip\_idx[ sfIdx ][ j ] ) / 4)}$)
The luma filter clipping values AlfClip$_L$[ adaptation_parameter_set_id ] with elements AlfClip$_L$[ adaptation_parameter_set_id ][ filtIdx ][ j ], with filtIdx = 0..NumAlfFilters − 1 and j = 0.11 are derived as follows:
    AlfClip$_L$[ adaptation_parameter_set_id ][ filtIdx ][ j ] = filterClips[ alf_luma_coeff_delta_idx[ filtIdx ] ][ j ]
alf_chroma_clip_flag equal to 0 specifies that linear adaptive loop filtering is applied on chroma components; alf_chroma_clip_flag equal to 1 specifies that non-linear adaptive loop filtering is applied on chroma component. When not present, alf_chroma_clip_flag is inferred to be equal to 0.
alf_chroma_min_eg_order_minus1 plus 1 specifies the minimum order of the exp-Golomb code for chroma filter coefficient signalling. The value of alf_chroma_min_eg_order_minus1 shall be in the range of 0 to 6, inclusive.
alf_chroma_eg_order_increase_flag[ i ] equal to 1 specifies that the minimum order of the exp-Golomb code for chroma filter coefficient signalling is incremented by 1.
alf_chroma_eg_order_increase_flag[ i ] equal to 0 specifies that the minimum order of the exp-Golomb code for chroma filter coefficient signalling is not incremented by 1
The order expGoOrderC[ i ] of the exp-Golomb code used to decode the values of alf_chroma_coeff_abs[ j ] is derived as follows:
    expGoOrderC[ i ] = alf_chroma_min_eg_order_minus1 + 1 + alf_chroma_eg_order_increase_flag[ i ]
alf_chroma_coeff_abs[ j ] specifies the absolute value of the j-th chroma filter coefficient. When alf_chroma_coeff_abs[ j ] is not present, it is inferred to be equal 0. It is a requirement of bitstream conformance that the values of alf_chroma_coeff_abs[ j ] shall be in the range of 0 to $2^7$ − 1, inclusive.

TABLE 26-continued

The order k of the exp-Golomb binarization uek(v) is derived as follows:
    golombOrderIdxC[ ] = { 0, 0, 1,0, 0, 1 }
    k = expGoOrderC[ golombOrderIdxC[ j ] ]
alf_chroma_coeff_sign[ j ] specifies the sign of the j-th chroma filter coefficient as follows:
– If alf_chroma_coeff_sign[ i ] is equal to 0, the corresponding chroma filter coefficient has a
  positive value.
– Otherwise (alf_chroma_coeff_sign[ j ] is equal to 1), the corresponding chroma filter
  coefficient has a negative value.
When alf_chroma_coeff_sign[ j ] is not present, it is inferred to be equal to 0.
The chroma filter coefficients AlfCoeff$_C$[ adaptation_parameter_set_id ] with elements
AlfCoeff$_C$[ adaptation_parameter_set_id ][ j ], with j = 0..5 we derived as follows:
    AlfCoeff$_C$[ adaptation_parameter_set_id ][ j ] = alf_chroma_coeff_abs[ j ] *
                  ( 1 − 2 * alf_chroma_coeff_sign[ j ] )
It is a requirement of bitstream conformance that the values of
AlfCoeff$_C$[ adaptation_parameter_set_id ][ j ] with j = 0..5 shall be in the range of $-2^7 - 1$ to
$2^7 - 1$, inclusive.
alf_chroma_clip_idx[ j ] specifies the clipping index of the clipping value to use before
multiplying by the j-th coefficient of the chroma filter. When alf_chroma_clip_idx[ j ]
  is not present, it is inferred to be equal 0 (no clipping), it is a requirement of bitstream
conformance that the values of alf_chroma_clip_idx[ j ] with j = 0..5 shall be in the
range of 0 to 3, inclusive.
The order k of the exp-Golomb binarization uek(v) is derived as follows:
    k = 3
The chroma filter clipping values AlfClip$_C$[ adaptation_parameter_set_id ] with elements
AlfClip$_C$[ adaptation_parameter_set_id ][ j ], with j = 0..5 are derived as follows:
AlfClip$_C$[ adaptation_parameter_set_id ][ j ] = Round( $2^{(BitDepthC - 8)} * 2^{(8 * (3 - alf\_chroma\_clip\_idx[j])/3)}$ )

In an embodiment of the present document, a signaling combination from various viewpoints for the ALF data field based on (or relying on) exponential Golomb coding is proposed. That is, an example of signaling combining at least one of the above-described embodiments may be implemented through this embodiment.

The table below exemplarily shows the syntax of the ALF data field based on coding according to the present embodiment.

TABLE 27

| alf_data( adaptation_parameter_set_id ) { | Descriptor |
|---|---|
|   alf_luma_filter_signal_flag | |
|   alf_chroma_filter_signal_flag | u(1) |
|   if( alf_luma_filter_signal_flag ) ( | |
|     alf_luma_clip_flag | u(1) |
|     alf_luma_num_filters_signalled_minus1 | tb(v) |
|     if( alf_luma_num_filters_signalled_minus1 > 0 ) { | |
|       for( filtIdx = 0; filtIdx < NumAlfFilters; filtIdx++ ) | |
|         alf_luma_coeff_delta_idx[ filtIdx ] | tb(v) |
|     } | |
|     alf_ luma_use_fixed_filter_flag | u(1) |
|     if( alf_luma_use_fixed_filter_flag ) { | |
|       alf_luma_lixed_filter_set_idx | tb(v) |
|       alf_luma_fixed_filter_pred_present_flag | u(1) |
|       if( alf_luma_fixed_filter_pred_present_flag ) { | |
|         for( i = 0; i < NumAlfFilters: i++ ) | |
|           alf_luma_fixed_filter_pred_flag[ i ] | u(1) |
|       } | |
|     } | |
|     alf_luma_coeff_delta_flag | u(1) |
|   if( !alf_luma_coeff_delta_flag && | |
| alf_luma_num_filters_signalled_minus1 > 0 ) | |
|     alf_luma_coeff_delta_prediction_flag | u(1) |
|   if( alf_luma_coeff_delta_flag ) { | |
|     for( sfIdx = 0; sfIdx <= alf_luma_num_filters_signalled_minus1; sfIdx++ ) | |
|       alf_luma_coeff_flag[ sfIdx ] | u(1) |
|   } | |
|   for( sfIdx = 0; sfIdx <= alf_luma_num_filters_signalled_minus1; sfIdx++ ){ | |
|     if( alf_luma_coeff_flag[ sfIdx ] ) { | |
|       for( j = 0; j < 12; j++ ) { | |
|         alf_luma_coeff_delta_abs[ sfIdx ][ j ] | uek(v) |
|         if( alf_luma_coeff_delta_abs[ sfIdx ][ j ] ) | |
|           alf_luma_coeff_delta_sign[ sfIdx ][ j ] | u(1) |
|       } | |

TABLE 27-continued

| alf_data( adaptation_parameter_set_id ) { | Descriptor |
|---|---|
|     } | |
|   } | |
|   if( alf_luma_clip_flag ) { | |
|     for( sfIdx = 0; sfIdx <= alf_luma_num_filters_signalled_minus1; sfIdx++ ) { | |
|       if( alf_luma_coeff_flag[ sfIdx ] ) { | |
|         for( j = 0; j < 12; j++ ) { | |
|           if( filtCoeff[ sfIdx ][ j ] ) | |
|             alf_luma_clip_idx[ sfIdx ][ j ] | uek(v) |
|         } | |
|       } | |
|     } | |
|   } | |
|   if( alf_chroma_filter_signal_flag ) { | |
|     alf_chroma_clip_flag | u(1) |
|     for( j = 0; j < 6; j++ ) { | |
|       alf_chroma_coeff_abs[ j ] | uek(v) |
|       if( alf_chroma_coeff_abs[ j ] > 0 ) | |
|         alf_chroma_coeff_sign[ j ] | u(1) |
|     } | |
|     if( alf_chroma_clip_flag ) { | |
|       for( j = 0; j < 6; j++ ) { | |
|         if( alf_chroma_coeff_abs[ j ] ) | |
|           alf_chroma_clip_idx[ j ] | uek(v) |
|       } | |
|     } | |
|   } | |
| } | |

The semantics of syntax elements included in the syntax 30 of Table 27 may be expressed, for example, as shown in the following table.

TABLE 28 alf_luma_coeff_flag[ sfIdx ] equal 1 specifies that the coefficients of the luma filter indicated by sfIdx are signalled. alf_luma_coeff_flag[ sfIdx ] equal to 0 specifies that all filter coefficients of the luma filter indicated by sfIdx are set equal to 0. When not present, alf_luma_coeff_flag[ sfIdx ] is set equal to 1.
alf_luma_coeff_delta_abs[ sfIdx ][ j ] specifies the absolute value of the j-th coefficient delta of the signalled luma filter indicated by sfIdx. When alf_luma_coeff_delta_abs[ sfIdx ][ j ] is not present, it is inferred to be equal 0.
The order k of the exp-Golomb binarization uek(v) is:
    k = 2
alf_luma_clip_idx[ sfIdx ][ j ] specifies the clipping index of the clipping value to use before multiplying by the j-th coefficient of the signalled luma filter indicated by sfId x. When alf_luma_clip_idx[ sfIdx ][ j ] is not present, it is inferred to be equal 0 ( no clipping). It is a requirement of bitstream conformance that the values of alf_luma_clip_idx[ sfIdx ][ j ] with sfIdx = 0..alf_luma_num_filters_signalled_minus1 and j = 0..11 shall be in the range of 0 to 3, inclusive.
The order k of the exp-Golomb binarization uek(v) is:
    k = 2
The variable filterClips[ sfIdx ][ j ] with sfIdx = 0..alf_luma_num_filters_signalled_minus1,
  j = 0..11 is initialized as follows:
    filterClips[ sfIdx ][ j ] = Round( $2^{( BitDepthY * ( 4 - alf\_luma\_clip\_idx[sfIdx][ j ] ) / 4 )}$ )
The luma filter clipping values $AlfClip_L$[ adaptation_parameter_set_id ] with elements $AlfClip_L$[ adaptation_parameter_set_id ][ filtIdx ][ j ], with filtIdx = 0..NumAlfFilters − 1 and j = 0..11 are derived as follows:
    $AlfClip_L$[ adaptation_parameter_set_id ][ filtIdx ][ j ] = filterClips[ alf_luma_coeff_delta_idx[ filtIdx ][ j ]
alf_chroma_clip_flag equal to 0 specifies that linear adaptive loop filtering is applied on chroma components: alf_chroma_clip_flag equal to 1 specifies that non-linear adaptive loop filtering is applied on chroma component. When not present, alf_chroma_clip_flag is inferred to be equal to 0.
alf_chroma_coeff_abs[ j ] specifies the absolute value of the j-th chroma filter coefficient. When alf_chroma_coeff_abs[ j ] is not present, it is inferred to be equal 0. It is a requirement of bitstream conformance that the values of alf_chroma_coeff_abs[ j ] shall be in the range of 0 to $2^7 − 1$, inclusive.
The order k of the exp-Golomb binarization uek(v) is:
    k = 3
alf_chroma_coeff_sign[ j ] specifies the sign of the j-th chroma filter coefficient as follows:
 − If alf_chroma_coeff_sign[ j ] is equal to 0, the corresponding chroma filter coefficient has a positive value.

TABLE 28-continued

– Otherwise (alf_chroma_coeff_sign[ j ] is equal to 1), the corresponding chroma filter coefficient has a negative value.
When alf_chroma_coeff_sign[ j ] is not present, it is inferred to be equal to 0.
The chroma filter coefficients AlfCoeff$_C$[ adaptation_parameter_set_id ] with elements.
AlfCoeff$_C$[ adaptation_parameter_set_id ][ j ], with j = 0..5 are derived as follows:
   AlfCoeff$_C$[ adaptation_parameter_set_id ][ j ] = alf_chroma_coeff_abs[ j ] *
                                           ( 1 − 2 * alf_chroma_coeff_sign[ j ] )
It is a requirement of bitstream conformance that the values of AlfCoeff$_C$[ adaptation_parameter_set_id ][ j ] with j = 0..5 shall be in the range of $-2^7 - 1$ to $2^7 - 1$, inclusive.
alf_chroma_clip_idx[ i ] specifies the clipping index of the clipping value to use before multiplying by the j-th coefficient of the chroma filter. When alf_chroma_clip_idx[ j ] is not present, it is inferred to be equal 0 (no clipping). It is a requirement of bitstream conformance that the values of alf_chroma_clip_idx[ j ] with j = 0..5 shall be in the range of 0 to 3, inclusive.
The order k of the exp-Golomb binarization uek(v) is:
   k = 3
The chroma filter clipping values AlfClip$_C$[ adaptation_parameter_set_id ] with elements
AlfClip$_C$[ adaptation_parameter_set_id ][ j ], with j = 0..5 are derived as follows:
AlfClip$_C$[ adaptation_parameter_set_id ][ j ] = Round( $2^{(BitDepthC - 8)} * 2^{(8 * (3 - alf\_chroma\_clip\_idx[j])/3)}$ )

In an embodiment of the present disclosure, a method for preventing APS ID for chroma from being signaled and inferred is proposed.

The table below exemplifies the syntax of the slice header based on coding according to the present embodiment.

TABLE 29

| slice_header( ) { | Descriptor |
|---|---|
| slice_pic_parameter_set_id | ue(v) |
| ... | |
| if( sps_alf_enabled_flag ) { | |
|   slice_alf_enabled_flag | u(1) |
|   if( slice_alf_enabled_flag ) { | |
|     slice_num_alf_aps_ids_luma | tb(v) |
|     for( i = 0; i < slice_num_alf_aps_ids_luma; i++ ) | |
|       slice_alf_aps_id_luma[ i ] | u(5) |
|     slice_alf_chroma_idc | n(v) |
|   if( slice_alf_chroma_idc) | |
|     slice_alf_aps_id_chroma | u(5) |
| ... | |

The semantics of syntax elements included in the syntax of the table above may be expressed, for example, as shown in the following table.

TABLE 30 slice_num_alf_aps_ids_luma specifies the number of ALF APSs that the slice refers to. The value of slice_num_alf_aps_ids_luma shall be in the range of 0 to 6, inclusive. The maximum value maxVal of the truncated binary binarization tb(v) is set equal to 6.
slice_alf_aps_id_chroma specifies file adaptation_parameter_set_id that the chroma component of the slice refers to. The TemporalId of the ALF APS MAL unit having adaptation_parameter_set_id equal to slice_alf_aps_id_chroma shall be less than or equal to the TemporalId of the coded slice NAL unit.

Referring to the table above, slice_alf_aps_id_chroma may be signaled regardless of whether the slice type is not I or the number of ALF APSs referenced by the slice is not one.

In addition, in an embodiment of the present disclosure, a method of parsing/signaling alternative filter information for a chroma component is proposed.

The table below exemplarily shows the syntax of the ALF data field based on coding according to the present embodiment.

TABLE 31

| alf_data( adaptation_parameter_set_id ) { | Descriptor |
|---|---|
| alf_luma_filter_signal_flag | u(1) |
| alf_chroma_filter_signal_flag | u(1) |
| if( alf_luma_filter_signal_flag ) { | |
|   alf_luma_clip_flag | u(1) |
|   alf_luma_num_filters_signalled_minus1 | tb(v) |
|   if( alf_luma_num_filters_signalled_minus1 > 0 ) { | |
|     for( filtIdx = 0; filtIdx < NumAllFilters; filtIdx++ ) | |
|       alf_luma_coeff_delta_idx[ filtIdx ] | tb(v) |
|   } | |

TABLE 31-continued

| alf_data( adaptation_parameter_set_id ) { | Descriptor |
|---|---|
|     } | |
|   } | |
|   alf_luma_coeff_signal_flag | u(1) |
|   if( alf_luma_coeff_signal_flag ) { | |
|     for( sfIdx = 0; sfIdx <= alf_luma_num_filters_signalled_minus1; sfIdx++ ) | |
|       alf_luma_coeff_flag[ sfIdx ] | u(1) |
|   } | |
|   for( sfIdx = 0; sfIdx <= alf_luma_num_filters_signalled_minus1; sfIdx++ ) { | |
|     if( alf_luma_coeff_flag[ sfIdx ] { | |
|       for( j = 0; j < 12; j++ ) | |
|         alf_luma_coeff_abs[ sfIdx ][ j ] | ue3(v) |
|         if( alf_luma_coeff_abs[ sfIdx ][ j ] ) | |
|           alf_luma_coeff_sign[ sfIdx ][ j ] | u(1) |
|       } | |
|     } | |
|   } | |
|   if( alf_luma_clip_flag ) { | |
|     for( sfIdx = 0; sfIdx <= alf_luma_num_filters_signalled_minus1; sfIdx++ ) { | |
|       for ( j = 0; j < 12; j++ ) { | |
|         alf_luma_clip_idx[ sfIdx ][ j ] | u(2) |
|       } | |
|     } | |
|   } | |
| } | |
| if( alt_chroma_filter_fignal_flag ) { | |
|   alf_chroma_num_alts_minus1 | tb(v) |
|   for( altIdx = 0, altIdx <= alf_chroma_num_alts_minus1; altIdx++ ) { | |
|     alf_chroma_clip_flag[ altIdx ] | u(1) |
|     for( j = 0; j < 6; j++ ) { | |
|       alf_chroma_coeff_abs[ altIdx ][ j ] | ue3(v) |
|       if( alf_chroma_coeff_abs[ altIdx ][ j ] > 0 ) | |
|         alf_chroma_coeff_sign[ altidx ][ j ] | u(1) |
|     } | |
|     if( alf_chroma_clip_flag[ altIdx ] ) { | |
|       for( j = 0; i < 6, j++ ) { | |
|         alf_chroma_clip _idx[ altIdx ][ j ] | u(2) |
|       } | |
|     } | |
|   } | |

The semantics of syntax elements included in the syntax of the table above may be expressed, for example, as shown in the following table.

TABLE 32 alf_luma_filter_signal_flag equal to 1 specifies that a luma filter set is signalled.
alf_luma_filter_signal_flag equal to 0 specifies that a luma filter set is not signalled.
alf_chroma_filter_signal_flag equal to 1 specifies that a chroma filter is signalled.
alf_chroma_filter_signal_flag equal to 0 specifies that a chroma filter is not signalled.
The variable NumAlfFilters specifying the number of different adaptive loop filters is set equal to 25.
alf_luma_clip_flag equal to 0 specifies that linear adaptive loop filtering is applied on luma component. alf_luma_clip_flag equal to 1 specifies that non-linear adaptive loop filtering may be applied on luma component.
alf_luma_num_filters_signalled_minus1 plus 1 specifies the number of adpative loop filter classes for which luma coefficients can be signalled. The value of alf_luma_num_filters_signalled_minus1 shall be in the range of 0 to NumAlfFilters − 1, inclusive.
The maximum value maxVal of the truncated binary binarization tb(v) is set equal to NumAlfFilters − 1.
alf_luma_coeff_delta_idx[ filtIdx ] specifies the indices of the signalled adaptive loop filter luma coefficient deltas for the filter class indicated by filtIdx ranging, from 0 to NumAlfFilters − 1. When alf_luma_coeff_delta_idx[ filtIdx ] is not present, it is inferred to be equal to 0.
The maximum value maxVal of the truncated binary binarization th(v) is set equal to alf_luma_num_filters_signalled_minus1.
alf_luma_coeff_signal_flag equal to 1 indicates that alf_luma_coeff_flag[ sfIdx ] is signalled.
alf_luma_coeff_signal_flag equal to 0 indicates that alf_luma_coeff_flag[ sfIdx ] is not signalled.
alf_luma_coeff_flag[ sfIdx ] equal 1 specifies that the coefficients of the luma filter indicated by sfIdx are signalled. alf_luma_coeff_flag[ sfIdx ] equal to 0 specifies that all filter coefficients of the luma filter indicated by sfIdx are set equal to 0. When not present. alf_luma_coeff_flag[ sfIdx ] is set equal to 1.
alf_luma_coeff_abs[ sfIdx ][ j ] specifies the absolute value of the j-th coefficient delta of the signalled luma filter indicated by sfIdx. When alf_luma_coeff_abs[ sfIdx ][ j ] is not present, it is inferred to be equal 0.

TABLE 32-continued alf_luma_coeff_sign[ sfIdx ][ j ] specifies the sign of the j-th luma coefficient of the filter indicated by sfIdx as follows:
– If alt_luma_coeff_sign[ sfIdx ][ j ] is equal to 0, the corresponding luma filter coefficient has a positive value.
– Otherwise (alf_luma_coeff_sign[ sfIdx ][ j ] is equal to 1), the corresponding luma filter coefficient has a negative value.
When alf_luma_coeff_sign[ sfIdx ][ j ] is not present, it is inferred to be equal to 0.
The variable filtCoeff[ sfIdx ][ j ] with sfIdx = 0..alf_luma_num_filters_signalled_minus1, j = 0..11 is initialized as follows:
   filtCoeff[ sfIdx ][ j ] = alf_luma_coeff_abs[ fIdx ][ j ] *
   ( 1 − 2 * alf_luma_coeff_sign[ sfIdx ][ j ] )                              (7-68)
The luma filter coefficients AlfCoeff$_L$[ adaptation_parameter_set_id ] with elements AlfCoeff$_L$[ adaptation_parameter_set_id ][ filtIdx ][ j ], with filtIdx = 0..NumAlfFilters − 1 and j = 0..11 are derived as follows:
   AlfCoeff$_L$[ adaptation_parameter_set_id ][ filtIdx ][ j ] = filtCoeff[ alf_luma_coeff_delta_
   idx[ filtIdx ][ j ]          (7-70)
   AlfFixFiltCoeff =                                                                                                                              (7-72)
   {
      { 0, 0, 2, −3, 1, −4, 1, 7, −1, 1, −1, 5}
      { 0, 0, 0, 0, 0, −1, 0, 1, 0, 0, −1, 2}
      { 0, 0, 0, 0, 0, 0, 0, 1, 0, 0, 0, 0}
      { 0, 0, 0, 0, 0, 0, 0, 0, 0, 0, −1, 1}
      { 2, 2, −7, −3, 0, −5, 13, 22, 12, −3, −3, 17}
      {−1, 0, 6, −8, 1, −5, 1, 23, 0, 2, −5, 10}
      { 0, 0, −1, −1, 0, −1, 2, 1, 0, 0, −1, 4}
      { 0, 0, 3, −11, 1, 0, −1, 35, 5, 2, −9, 9}
      { 0, 0, 8, −8, −2, −7, 4, 4, 2, 1, −1, 25}
      { 0, 0, 1, −1, 0, −3, 1, 3, −1, 1, −1, 3}
      { 0, 0, 3, −3, 0, −6, 5, −1, 2, 1, −4, 21}
      {−7, 1, 5, 4, −3, 5, 11, 13, 12, −8, 11, 12}
      {−5, −3, 6, −2, −3, 8, 14, 15, 2, − 7, 11, 16}
      { 2, −1, −6, −5, −2, −2, 20, 14, −4, 0, −3, 25}
      { 3, 1, −8, −4, 0, −8, 22, 5, −3, 2 −10, 29}
      { 2, 1, −7, −1, 2, −11, 23, −5, 0, 2, −10, 29}
      {−6, −3, 8, 9, −4, 8, 9, 7 14, −2, 8, 9}
      { 2, 1, −4, −7, 0, −8, 17, 22, 1, −1, −4, 23}
      { 3, 0, −5, −7, 0, −7, 15, 18, −5, 0, −5, 27}
      { 2, 0, 0, −7, 1, −10, 13, 13, −4, 2, −7, 24}
      { 3, 3, −13, 4, −2, −5, 9, 21, 25, −2, −3, 12}
      {−5, −2, 7, −3, −7, 9, 8, 9, 16, −2 , 15, 12}
      { 0, −1, 0, −7, −5, 4, 11, 11, 8, −6, 12, 21}
      { 3, −2, −3, −8, −4, −1, 16, 15, −2, −3, 3, 26}
      { 2, 1, −5, −4, −1, −8, 16, 4, −2, 1, −7, 33}
      { 2, 1, −4, −2, 1, −10, 17, −2, 0, 2, −11, 33}
      { 1, −2, 7, −15, −16, 10, 8, 8, 20, 11, 14, 11}
      { 2, 2, 3, −13, − 13, 4, 8, 12, 2, −3, 16, 24}
      { 1, 4, 0, −7, −8, −4, 9, 9, −2, −2, 8, 29}
      { 1, 1, 2, −4, −1, −6, 6, 3, −1, −1, −3, 10}
      {−7, 3, 2, 10, −2, 3, 7, 11, 19, −7, 8, 10}
      { 0, −2, −5, −3, 2, 4, 20, 15, −1, −3, −1, 22}
      { 3, −1, −8, −4, −1, −4, 22, 8, −4, 2, −8, 28}
      { 0, 3, −14, 3, 0, 1, 19, 17, 8, −3, −7, 20}
      { 0, 2, −1, −8, 3, −6, 5, 21, 1, 1, −9, 13}
      {−4, −2, 8, 20, −2, 2, 3, 5, 21, 4, 6, 1}
      { 2, −2, −3, −9, −4, 2, 14, 16, 3, 6, 8, 24}
      { 2, 1, 5, −16, −7, 2, 3, 11, 15, −3, 11, 22}
      { 1, 2, 3, −11, −2, −5, 4, 8, 9, −3, −2, 26}
      { 0, −1, 10, −9, −1, −8, 2, 3, 4, 0, 0, 29}
      { 1, 2, 0, −5, 1, −9, 9, 3, 0, 1, −7, 20}
      {−2, 8, −6, −4, 3, −9, −8, 45, 14, 2, −13, 7}
      { 1, −1, 16, −19, −8, −4, −3, 2, 19, 0, 4, 30}
      { 1, 1, −3, 0, 2, −11, 15, −5, 1, 2, −9, 24}
      { 0, 1, −2, 0, 1, −4, 4, 0, 0, 1, −4, 7}
      { 0, 1, 2, −5, 1, −6, 4, 10, −2, 1, −4, 10}
      { 3, 0, −3, −6, −2, −6, 14, 8, −1, −1, −3, 31}
      { 0, 1, 0, −2, 1, −6, 5, 1, 0, 1, −5, 13}
      { 3, 1, 9, −19, −21, 9, 7, 6, 13, 5, 15, 21}
      { 2, 4, 3, −12, −13, 1, 7, 8, 3, 0, 12, 26}
      { 3, 1, −8, −2, 0, −6, 18, 2, −2, 3, −10, 23}
      { 1, 1, 4, 1, 1, 5, 8, 1, 1, 2, 5, 10}
      { 0, 1, −1, 0, 0, −2, 2, 0, 0, 1, −2, 3}
      { 1, 1, −2, −7, 1, −7, 14, 18, 0, 0, −7, 21}
      { 0, 1, 0, −2, 0, −7, 8, 1, −2, 0, −3, 24}
      { 0, 1, 1, −2, 2, −10, 10, 0, −2, 1, −7, 23}
      { 0, 2, 2, −11, 2, −4, −3, 39, 7, 1, 4 −10, 9}
      { 1, 0, 13, −16, −5, −6, −1, 8, 6, 0, 6, 29}
      { 1, 3, 1, −6, −4, −7, 9, 6, −3, −2, 3, 33}
      { 4, 0, −17, −1, −1, 5, 26, 8, −2, 3, − 15, 30}
      { 0, 1, −2, 0, 2, −8, 12, −6, 1, 1, −6, 16}
      { 0, 0, 0, −1, 1, −4, 4, 0, 0, 0, −3, 11}

TABLE 32-continued

```
      { 0, 1, 2, -8, 2, -6, 5, 15, 0, 2, -7, 9}
      { 1, -1, 12, -15, -7, -2, 3, 6, 6, -1, 7, 30}
    },
AlfClassToFiltMap =                                                       (7-73)
    {
      { 8, 2, 2, 2, 3, 4, 53, 9, 9, 52, 4, 4, 5, 9, 2, 8, 10, 9, 1,
3, 39, 39, 10, 9, 52 }
      { 11, 12, 13, 14, 15, 30, 11, 17, 18, 19, 16, 20, 4, 53, 21, 22, 23, 14, 25, 26, 26,
27, 28, 10 }
      { 16, 12, 31, 32, 14, 16, 30, 33, 53, 34, 35, 16, 20, 4, 7, 16, 21, 36, 18, 19, 21, 26,
37, 38, 39 }
      { 35, 11, 13, 14, 43, 35, 16, 4, 34, 62, 35, 35, 30, 56, 7, 35, 21, 38, 24, 40, 16, 21,
48, 57, 39 }
      { 11, 31, 32, 43, 44, 16, 4, 17, 34, 45, 30, 20, 20, 7, 5, 21, 22, 46, 40, 47, 26, 48,
63, 58, 10 }
      { 12, 13, 50, 51, 52, 11, 17, 53, 45, 9, 30, 4, 53, 19, 0, 22, 23, 25, 43, 44, 37, 27,
28, 10, 55 }
      { 30, 33, 62, 51, 44, 20, 41, 56, 34, 45, 20, 41, 41, 56, 5, 30, 56, 38, 40, 47, 11, 37,
42, 57, 8 }
      { 35, 11, 23, 32, 14, 35, 20, 4, 17, 18, 21, 20, 20, 20, 4, 16, 21, 36, 46, 25, 41, 26,
48, 49, 58 }
      { 12, 31, 59, 59, 3, 33, 33, 59, 59, 52, 4, 33, 17, 59, 55, 22, 36, 59, 59, 60, 22, 36,
59, 25, 55 }
      { 31, 25, 15, 60, 60, 22, 17, 19, 55, 55, 20, 20, 53, 19, 55, 22, 46, 25, 43, 60, 37, 28,
10, 55, 52 }
      { 12, 31, 32, 50, 51, 11, 33, 53, 19, 45, 16, 4, 4, 53, 5, 22, 36, 18, 25, 43, 26, 27,
27, 28, 10 }
      { 5, 2, 44, 52, 3, 4, 53, 45, 9, 3, 4, 56, 5, 0, 2, 5, 10, 47, 52, 3,
63, 39, 10, 9, 52 }
      { 12, 34, 44, 44, 3, 56, 56, 62, 45, 9, 56, 56, 7, 5, 0, 22, 38, 40, 47, 52, 48,
57, 39, 10, 9 }
      { 35, 11, 23, 14, 51, 35, 20, 41, 56, 62, 16, 20, 41, 56, 7, 16, 21, 38, 24, 40, 26, 26,
42, 57, 39 }
      { 33, 34, 51, 51, 52, 41, 41, 34, 62, 0, 41, 41, 56, 7, 5, 56, 38, 38, 40, 44, 37, 42,
57, 39, 10 }
      { 16, 31, 32, 15, 60, 30, 4, 17, 1 9, 25, 22, 20, 4, 53, 19, 21, 22, 46, 25, 55, 26, 48,
63, 58, 55 }
    },
```

It is a requirement of bitstream conformance that the values of AlfCoeff$_L$[ adaptation_parameter_set_id ][ filtIdx ][ j ] with filtIdx = 0..NumAlfFilters − 1, j = 0..11 shall be in the range of −2$^7$ to 2$^7$ −1, inclusive.

It is a requirement of bitstream conformance that the values of AlfCoeff$_L$[ adaptation_parameter_set_id ][ filtIdx ][ j ] with filtIdx = 0..NumAlfFilters − l, j = 0..11 shall be in the range of −2$^7$ to 2$^7$ − 1, inclusive.

alf_luma_clip_idx[ sfIdx ][ j ] specifies the clipping index of the clipping value to use before multiplying by the j-th coefficient of the signalled luma filter indicated by sfIdx. When alf_luma_clip_idx[ sfIdx ][ j ] is not present, it is inferred to be equal 0 (no clipping). It is a requirement of bitstream conformance that the values of alf_luma_clip_idx[ sfIdx ][ j ] with sfIdx = 0..alf_luma_num_filters_signalled_minus1 and j = 0.11 shall be in the range of 0 to 3, inclusive.

The variable filterClips[ sfIdx ][ j ] with sfIdx = 0..alf_luma_num_filters_signalled_minus1, j = 0..11 is initialized as follows:

$$\text{filterClips}[\text{sfIdx}][j] = \text{Round}(2^{(BitDepthY * (4 - alf\_luma\_clip\_idx[sfIdx][j])/4)}) \quad (7\text{-}76)$$

The luma filter clipping values AlfClip$_L$[ adaptation_parameter_set_id ] with elements AlfClip$_L$[ adaptation_parameter_set_id ][ filtIdx ][ j ], with filtIdx = 0..NumAlfFilters − 1 and i = 0..11 are derived as follows:

AlfClip$_L$[ adaptation_parameter_set_id ][ filtIdx ][ j ] = filterClips[ alf_luma_coeff_delta_idx[ filtIdx ] ][ j ]     (7-77)

alf_chroma_num_alts_minus1 specifies the number of alternative filters for Chroma components.

The maximum value maxVal of the truncated binary binarization tb(v) is set equal to 8.

alf_chroma_clip_flag[ altIdx ] equal to 0 specifies that linear adaptive loop filtering is applied on chroma components when using the Chroma filter with index altIdx ranging from 0 to alf_chroma_num_alts_minus1; alf_chroma_clip_flag[ altIdx ] equal to 1 specifies that non-linear adaptive loop filtering is applied on chroma component when using the Chroma filter with index altIdx. When not present, alf_chroma_clip_flag[ altIdx ] is inferred to be equal to 0.

alf_chroma_coeff_abs[ altIdx ][ j ] specifies the absolute value of the j-th chroma filter coefficient of the alternative Chroma filter with index altIdx, for altIdx ranging from 0 to alf_chroma_num_alts_minus1. When alf_chroma_coeff_abs[ altIdx ][ j ] is not present, it is inferred to be equal 0. It is a requirement of bitstream conformance that the values of alf_chroma_coeff_abs[ altIdx ][ j ] shall be in the range of 0 to 2$^7$ − 1, inclusive.

alf_chroma_coeff_sign[ altIdx ][ j ] specifies the sign of the j-th chroma filter coefficient of the alternative Chroma filter with index altIdx, for altIdx ranging from 0 to alf_chroma_num_alts_minus1, as follows:

- If alf_chroma_coeff_sign[ altIdx ][ j ] & equal to 0, the corresponding chroma filter coefficient has a positive value.
- Otherwise (alf_chroma_coeff_sign[ altIdx ][ j ] is equal to 1), the corresponding chroma filter coefficient has a negative value.

TABLE 32-continued

When alf_chroma_coeff_sign[ altIdx ][ j ] is not present, it is inferred to be equal to 0.
The chroma filter coefficients AlfCoeff$_C$[ adaptation_parameter_set_id ][ altIdx ] with elements
AlfCoeff$_C$[ adaptation_parameter_set_id ][ altIdx ][ j ], with
altIdx = 0..alf_chroma_num_alts_minus1, j = 0..5 are derived as follows:
   AlfCoeff$_C$[ adaptation_parameter_set_id ][ altIdx ][ j ] = alf_chroma_coeff_abs[ altIdx ][ j ] *
   ( 1 − 2 * alf_chroma_coeff_sign[ altIdx ][ j ] )        (7-82)
It is a requirement of bitstream conformance that the values of
AlfCoeff$_C$[ adaptation_parameter_set_id ][ altIdx ][ j ] with
altIdx = 0..alf_chroma_num_alts_minus1, j = 0..5 shall be in the range of $-2^7 -1$ to $2^7 - 1$,
inclusive.
alf_chroma_clip_idx[ altIdx ][ j ] specifies the clipping index of the clipping value to use
before multiplying by the i-th coefficient of the alternative Chroma filter with index
  altIdx, for altIdx ranging from 0 to alf_chroma_num_alts_minus1. When alf_chroma_clip_
idx[ altIdx ][ j ] is not present, it is inferred to be equal 0 (no clipping). It is a requirement
of bitstream conformance that the values of alf_chroma_clip_idx[ altIdx ][ j ] with
j = 0..5 shall be in the range of 0 to 3, inclusive.
The chroma filter clipping values AlfClip$_C$[ adaptation_parameter_set_id ][ altIdx ] with el
e m e n t s A l f C l i p $_C$[ adaptation_parameter_set_id[ altIdx ][ j ] , w i t h
altIdx = 0..alf_chroma_num_alts_minus1 and j = 0..5 are derived as follows:
   AlfClip$_C$[ adaptation_parameter_set_id ][ altIdx ][ j ] =
   Round( $2^{( BitDepthC - 8 )} * 2^{( 8 * ( 3 - alf\_chroma\_clip\_idx[\ altIdx ][ j ] ) / 3 )}$ )
        (7-86)

Referring to the table above, the ALF data field may include alternative filter information for the chroma component.

For example, the syntax element alf_chroma_num_alts_minus1 may indicate the number of alternative filters for the chroma component. The index altIdx of the alternative filters for the chroma component may have a value within the range of 0 to alf_chroma_num_alts_minus1. In addition, the syntax element alf_chroma_coeff_abs[altIdx][j] may indicate the absolute value of the i-th coefficient included in the alternative filter having the index altIdx. In addition, the syntax element alf_chroma_coeff_sign[altIdx][j] may indicate the sign of the i-th coefficient included in the alternative filter having the index altIdx.

In comparison with Table 32 above with Table 7 above, it can be understood that in an embodiment of the present disclosure, syntax related to exponential Golomb coding of ALF coefficients and clipping coefficients is simplified, and the syntax for predicting the filter coefficients has been removed by using a fixed filter prediction. In addition, referring to Table 32 above, in an embodiment of the present disclosure, a method of signaling a fixed exponential Golomb order instead of signaling the order k of the exponential Golomb (EG) code is proposed.

The table below exemplifies the syntax of a coding tree unit (CTU).

TABLE 33

| coding_tree_unit( ) { | Descriptor |
|---|---|
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag | | slice_sao_chroma_flag ) | |
|     sao( xCtb >> CtbLog2SizeY, yCtb > CtbLog2SizeY ) | |
|   if( slice_alf_enabled_flag ){ | |
|     alf_ctb_fag[ 0 ][ xCtb >> Log2CtbSize][ yCtb >> Log2CtbSize ] | ae(v) |
|     if( alf_ctb_flag[ 0 ][ xCtb >> Log2CtbSize ][ yCtb >> Log2CtbSize] ) { | |
|       if( slice_num_alf_aps_ids_luma > 0) | |
|         alf_ctb_use_first_aps_flag | ae(v) |
|       if( !alf_ctb_use_first_aps_flag ) { | |
|         if( slice_num_alf_aps_ids_luma > 1 ) | |
|           alf_use_aps_flag | ae(v) |
|         if( alf_use_aps_flag ) | |
|           alf_luma_prev_filter_idx_minus1 | ae(v) |
|         else | |
|           alf_luma_fixed_filter_idx | ae(v) |
|       } | |
|     } | |
|     if( slice_alf_chroma_idc = = 1 | | slice_alf_chroma_idc = = 3 ) { | |
|       alf_ctb_flag[ 1 ][ xCtb >> Log2CtbSize ][ yCtb >> Log2Ctbsize ] | ae(v) |
|       if( alf_ctb_flag[ 1 ][ xCtb >> LogCtbSize ][ yCtb >> LogCtbSize ] | |
|         && aps_alf_chroma_num_alts_minus1 > 0 ) | |
|         alf_ctb_filter_alt_idx[ 1 ][ xCtb >> Log2CtbSize][ yCtb >> Log2CtbSize][ 0 ] | ae(v) |
|     } | |
|     if( slice_alf_chroma_idc = = 2 | | slice_alf_chroma_idc = = 3 ) { | |
|       alf_ctb_flag[ 2 ][ xCtb >> Log2CtbSize ][ yCtb >> Log2CtbSize ] | ae(v) |
|       if( alf_ctb_flag[ 2 ][ xCtb >> Log2CtbSize ][ yCtb >> Log2CtbSize ] | |
|         && aps_alf_chroma_num_alts_minus1 > 0 ) | |
|         alf_ctb_filter_alt_idx[ 2 ][ xCtb >> Log2CtbSize ][ yCtb >> Log2CtbSize ][ 0 ] | ae(v) |
|     } | |
|   } | |
| } | |

TABLE 33-continued

| coding_tree_unit( ) { | Descriptor |
|---|---|
|   if( slice_type = = I && qtbtt_dual_tree_intra_flag ) | |
|     dual_tree_implicit_qt_split ( xCtb, yCtb, CtbSizeY, 0 ) | |
|   else | |
|     coding_tree(xCtb, yCtb,CtbSizeY, CrbSizeY, 1, 0, 0, 0, 0, 0, SINGLE_TREE) | |
| } | |

The semantics of syntax elements included in the syntax of the table above may be expressed, for example, as shown in the following table.

TABLE 34

The array IsInSmr[ x ][ y ] specifying whether the sample at ( x, y ) is located inside a
shared merging candidate list region, is initialized as follows for x = 0..
CtbsizeY − 1 and y = 0..CtbsizeY − 1:
   IsInSmr[ x ][ y ] = FALSE                                                      (7-96)
alf_ctb_flag[ cIdx ][ xCtb >> Log2ctbSize ][ yCtb >> Log2CtbSize ] equal to 1 specifies
that the adaptive loop filter is applied to the coding tree block of the colour component
indicated by cIdx of the coding tree unit at luma location ( xCtb, yCtb ). alf_ctb_flag
[ cIdx ][ xCtb >> Log2CtbSize ][ yCtb >> Log2CtbSize ] equal to 0 specifies that the
adaptive loop filter is not applied to the coding tree block of the colour component
indicated by cIdx of the coding tree unit at luma location ( xCtb, yCtb ).
When alf_ctb_flag[ cIdx ][ xCtb >> Log2CtbSize ][ yCtb >> Log2CtbSize ] is not present,
it is inferred to be equal to 0.
alf_cth_use_first_aps_flag equal to 1 sepeifies that the filter information in APS with
adaptive_parameter_set_id   equal   to   slice_alf_aps_id_luma[ 0 ]   is   used.
alf_ctb_use_first_aps_flag equal to 0 specifies that the luma CTB does not use the filter
information in APS with adaptive_parameter_set_id equal to slice_alf_aps_id_luma[ 0 ]. When
alf_ctb_use_first_aps_flag is not present, it is inferred to be equal to 0.
    alf_use_aps_flag equal to 0 specifies that one of the fixed filter sets is applied to the luma CTB.
    alf_use_aps_flag equal to 1 specifies that a filter set fan an APS is applied to the luma CTB.
    When alf_use_aps_flag is not present, it is inferred to be equal to 0.
    alf_luma_prev_filter_idx_minus1 plus 1 specifies the previous filter that is applied to the luma
    CTB. The value of alf_luma_prev_filter_idx_minus1 shall be in a range of 0 to
    slice_num_alf_aps_ids_luma − 2, inclusive.
    The variable AlfCtbFiltSetIdxY[ xCtb >> Log2CtbSize ][ yCtb >> Log2CtbSize ] specifying
    the filter set index for the luma CTB at location ( xCtb, yCtb ) is derived as follows:
    -   If   alf_ctb_use_first_aps   is   equal   to   1,
       AlfCtbFiltSetIdxY[ xCtb >> Log2CtbSize ][ yCtb >> Log2CtbSize ] is set equal to 16.
    -   Otherwise,   if   alf_use_aps_flag   is   equal   to   0,
       AlfCtbFiltSetIdxY[ xCtb >> Log2CtbSize ][ yCtb >> Log2CtbSize ] is set equal to
       alf_luma_fixed_filter_idx.
    -   Otherwise, AlfCtbFiltSetIdxY[ xCtb >> Log2CtbSize ][ yCtb >> Log2CtbSize ] is set
       equal to 17 + alf_luma_prev_filter_idx_minus1.
    alf_luma_fixed_filter_idx specifies the fixed filter that is applied to the luma CTB. The value
    of alf_luma_fixed_filter_idx shall be in a range of 0 to 15, inclusive.
    alf_ctb_filter_alt_idx[ 1 ][ xCtb >> Log2CtbSize ][ yCtb >> Log2CtbSize ][ sfIdx ]   specify
    the index of the alternative chroma filter to use when applying the adaptive loop filter on chroma
    component with index 1 of the coding tree unit at luma location ( xCtb, yCtb ). When
    alf_ctb_filter_alt_idx[ 1 ][ xCtb >> Log2CtbSize ][ yCtb >> Log2CtbSize ][ sfIdx ]   is   not
    present, it is infered to be equal to zero.
    alf_ctb_filter_alt_idx[ 2 ][ xCtb >> Log2CtbSize ][ yCtb >> Log2CtbSize ][ sfIdx ]   specify
    the index of the alternative chroma filter to use when applying the adaptive loop filter on chroma
    component with index 2 of the coding tree unit at luma location ( xCtb, yCtb ). When
    alf_ctb_filter_alt_idx[ 2 ][ xCtb >> Log2CtbSize ][ yCtb >> Log2CtbSize ][ sfIdx ]   is   not
    present, it is infered to be equal to zero.

Referring to the above table, index information of an alternative filter for a coding tree unit (CTU) to which ALF is applied or a chroma component of a current block may be included. For example, the syntax element alf_ctb_filter_alt_idx may designate an index of an alternative filter for a chroma component when ALF is applied to a chroma component having a chroma index of 1 or 2.

The table below exemplifies syntax of sample adaptive offset syntax (SAO).

TABLE 35

| sao( rx, ry ) { | Descriptor |
|---|---|
|   if( rx > 0 ) { | |
|     leftCtbInBrick = BrickId[ CtbAddrInBs ] = = | |
|         BrickId[ CtbAddrRsToBs[ CtbAddrInRs − 1 ] ] | |
|     if( lefCtbInBrick ) | |
|       sao_merge_left_flag | ae(v) |

TABLE 35-continued

| sao( rx, ry ) { | Descriptor |
|---|---|
| } | |
|   if( ry > 0 && !sao_merge_left_flag ) { | |
|     upCtbInBrick = BrickId[ CtbAddrInBs ] = = | |
|         BrickId[ CtbAddrRsToBs[ CtbAddrInRs − PicWidthInCtbsY ] ] | |
|     if( upCtbInBrick ) | |
|       sao_merge_up_flag | ae(v) |
|   } | |
|   if( !sao_merge_up_flag && !sao_merge_left_flag ) | |
|     for( cIdx = 0; cIdx < ( ChromaArrayType != 0 ? 3 : 1 ); cIdx++ ) | |
|       if( ( slice_sao_luma_flag && cIdx = = 0 ) \|\| | |
|         ( slice_sao_chroma_flag && cIdx > 0 ) ) { | |
|         if( cIdx = = 0 ) | |
|           sao_type_idx_luma | ae(v) |
|         else if( cIdx = = 1 ) | |
|           sao_type_idx_chroma | ae(v) |
|         if( SaoTypeIdx[ cIdx ][ rx ][ ry ] != 0 ) { | |
|           for( i = 0; i < 4; i++ ) | |
|             sao_offset_abs[ cIdx ][ rx ][ ry ][ i ] | ae(v) |
|           if( SaoTypeIdx[ cIdx ][ rx ][ ry ] = = 1 ) { | |
|             for( i = 0; i < 4; i++ ) | |
|               if( sao_offset_abs[ cIdx ][ rx ][ ry ][ i ] != 0 ) | |
|                 sao_offset_sign[ cIdx ][ rx ][ ry ][ i ] | ae(v) |
|             sao_band_position[ cIdx ][ rx ][ ry ] | ae(v) |
|           } else { | |
|             if( cIdx = = 0 ) | ae(v) |
|               sao_eo_class_luma | |
|             if( cIdx = = 1 ) | |
|               sao_eo_class_chroma | ae(v) |
|           } | |
|         } | |
|       } | |
| } | |

The table below shows an example of the ALF procedure in a standard document format.

TABLE 36

Adaptive loop filter process
General
Inputs of this process are the reconstructed picture sample array prior to adaptive loop filter recPictureL and, when ChromaArrayType is not equal to 0, the arrays recPictureCb and recPictureCr.
Outputs of this process are the modified reconstructed picture sample array after adaptive loop filter alfPictureL and, when ChromaArrayType is not equal to 0, the arrays alfPictureCb and alfPictureCr.
The sample values in the modified reconstructed picture sample array after adaptive loop filter alfPictureL and, when ChromaArrayType is not equal to 0, the arrays alfPictureCb and alfPictureCr are initially set equal to the sample values in the reconstructed picture sample array prior to adaptive loop filter recPictureL and, when ChromaArrayType is not equal to 0, the arrays recPictureCb and recPictureCr, respectively.
When slice_alf_enabled_flag is equal to 1, for every coding tree unit with luma coding tree block location ( rx, ry ), where rx = 0..PicWidthInCtbs − 1 and ry = 0..PicHeightInCtbs − 1, the following applies:
When alf_ctb_flag[ 0 ][ rx ][ ry ] is equal to 1, the coding tree block filtering process for luma samples as specified in clause 8.8.5.2 is invoked with recPictureL, alfPictureL, and the luma coding tree block location ( xCtb, yCtb ) set equal to ( rx << CtbLog2SizeY, ry << CtbLog2SizeY ) as inputs, and the output is the modified filtered picture alfPictureL.
When ChromaArrayType is not equal to 0 and alf_ctb_flag[ 1 ][ rx ][ ry ] is equal to 1, the coding tree block filtering process for chroma samples as specified in clause 8.8.5.4 is invoked with recPicture set equal to recPictureCb, alfPicture set equal to alfPictureCb, compIdx set equal to 1, and the chroma coding tree block location ( xCtbC, yCtbC ) set equal to ( ( rx << CtbLogSizeY ) / SubWidthC, ( ry << CtbLog2SizeY ) / SubHeightC ) as inputs, and the output is the modified filtered picture alfPictureCb.
When ChromaArrayType is not equal to 0 and alf_ctb_flag[ 2 ][ rx ][ ry ] is equal to 1, the coding tree block filtering process for chroma samples as specified in clause 8.8.5.4 is invoked with recPicture set equal to recPictureCr, alfPicture set equal to alfPictureCr, compIdx set equal to 2, and the chroma coding tree block location ( xCtbC, yCtbC ) set equal to ( ( rx << CtbLog2SizeY ) / SubWidthC, ( ry << CtbLog2SizeY ) / SubHeightC ) as inputs, and the output is the modified filtered picture alfPictureCr.

In addition, the table below shows an example of a coding tree unit filtering procedure for luma samples in a standard document format.

TABLE 37

Coding tree block filtering process for luma samples
Inputs of this process are:
a reconstructed luma picture sample array recPictureL prior to the adaptive loop filtering process,
a filtered reconstructed luma picture sample array alfPictureL,
a luma location ( xCtb, yCtb ) specifying the top-left sample of the current luma coding tree block relative to the top left sample of the current picture.
Output of this process is the modified filtered reconstructed luma picture sample array alfPictureL.
The derivation process for filter index clause 8.8.5.3 is invoked with the location ( xCtb, yCtb ) and the reconstructed luma picture sample array recPictureL as inputs, and filtIdx[ x ][ y ] and transposeIdx[ x ][ y ] with x, y = 0..CtbSizeY − 1 as outputs.
For the derivation of the filtered reconstructed luma samples alfPictureL[ x ][ y ], each reconstructed luma sample inside the current luma coding tree block recPictureL[ x ][ y ] is filtered as follows with x, y = 0..CtbSizeY − 1:
The array of luma filter coefficients f[ j ] and the array of luma clipping values c[ j ] corresponding to the filter specified by filtIdx[ x ][ y ] is derived as follows with j = 0..11:
If AlfCtbFiltSetIdxY[ xCtb >> Log2CtbSize ][ yCtb >> Log2CtbSize ] is less than 16, the following applies:
i = AlfCtbFiltSetIdxY[ xCtb >> Log2CtbSize ][ yCtb >> Log2CtbSize ]    (8-1172)
f[ j ] = AlfFixFiltCoeff[ AlfClassToFiltMap[ i ][ filtidx ] ][ j ]    (8-1173)
c[ j ]=2BitdepthY    (8-1174)
Otherwise (AlfCtbFiltSetIdx [ xCtb >> Log2CtbSize ][ yCtb >> Log2CtbSize ] is greater than or equal to 16, the following applies:
i = slice_alf_aps_id_luma[ AlfCtbFiltSetIdxY[ xCtb >> Log2CtbSize ][ yCtb >> Log2CtbSize ] − 16](8-1175)
f[ j ] = AlfCoeffL[ i ][ filtIdx[ x ][ y ] ][ j ]    (8-1176)
c[ j ] = AlfClipL[ i ][ filtIdx[ x ][ y ][ j ]    (8-1177)
The luma filter coefficients and clipping values index idx are derived depending on transposeIdx[ x ][ y ] as follows:
If transposeIndex[ x ][ y ] is equal to 1, the following applies:
idx[ ] = { 9, 4, 10, 8, 1, 5, 11 7, 3, 0, 2, 6 }    (8-1178)
Otherwise, if transposeIndex[ x ][ y ] is equal to 2, the following applies:
idx[ ] = { 0, 3, 2, 1, 8, 7, 6, 5, 4, 9, 10, 11 }    (8-1179)
Otherwise, if transposeIndex[ x ][ y ] is equal to 3, the following applies:
idx[ ] = { 9, 8, 10, 4, 3, 7, 11, 5, 1, 0, 2, 6 }    (8-1180)
Otherwise, the following applies:
idx[ ] = { 0, 1, 2, 3, 4, 5, 6, 7, 8, 9, 10, 11 }    (8-1181)
The locations ( hx + i, vy + j ) for each of the corresponding tana samples ( x, y ) inside the given array recPicture of luma samples with i, j = −3..3 are derived as follows:
If  pps_loop_filter_across_virtual_boundaries_disabled_flag  is  equal  to  1  and xCtb + x − PpsVirtualBoundariesPosX[ n ] is greater than or equal to 0 and less than 3 for any n = 0..pps_num_ver_virtual_boundaries − 1, the following applies:
hx + i = Clip3( PpsVirtualBoundariesPosX[ n ], pic_width_in_luma_samples − 1, xCtb + x + i )    (8-1182)
Otherwise, if pps_loop_filter_across_virtual_boundaries_disabled_flag is equal to 1 and PpsVirtualBoundariesPosX[ n ]− xCtb − x is greater than 0 and less than 4 for any n = 0..pps_num_ver_virtual_boundaries − 1, the following applies:
hx + i = Clip3( 0, PpsVirtualBoundariesPosX[ n ] − 1, xCtb + x + i )    (8-1183)
Otherwise, the following applies:
hx + i = Clip3( 0, pic_width_in_luma_samples − 1, xCtb + x + i ) (8-1184)
If  pps_loop_filter_across_virtual_boundaries_disabled_flag  is  equal  to  1  and yCtb + y − PpsVirtualBoundariesPosY[ n ] is greater than or equal to 0 and less than 3 for any n − 0..pps_num_hor_virtual_boundaries − 1, the following applies:
vy + j = Clip3( PpsVirtualBoundariesPosY[ n ], pic_height_in_in_luma_samples − 1, yCtb + y + j )    (8-1185)
Otherwise, if pps_loop_filter_across_virtual_boundaries_disabled_flag is equal to 1 and PpsVirtualBoundariesPosY[ n ] − yCtb − y is greater than 0 and less than 4 for any n = 0..pps_num_hor_virtual_boundaries − 1, the following applies:
vy + j = Clip3( 0, PpsVirtualBoundariesPosY[ n ] − 1, yCtb + y + j )    (8-1186)
Otherwise, the following applies:
vy + j = Clip3( 0, pic_height_in_luma_samples − 1, yCtb + y + j ) (8-1187)
The variable applyVirtualBoundary is derived as follows:
If one or more of the following conditions are true, applyVirtualBoundary is set equal to 0:
The bottom boundary of the current coding tree block is the bottom boundary of the picture.
The bottom boundary of the current coding tree block is the bottom boundary of the brick and loop_filter_across_bricks_enabled_flag is equal to 0.
The bottom boundary of the current coding tree block is the bottom boundary of the slice and loop_filter_across_slices_enabled_flag is equal to 0.
The bottom boundary of the current coding tree block is one of the bottom virtual boundaries of the picture and pps_loop_filter_across_virtual_boundaries_disabled_flag is equal to 1.
Otherwise, applyVirtualBoundary is set equal to 1.
The reconstructed sample offsets r1, r2 and r3 are specified in Table 8-22 according to the horizontal luma sample position y and applyVirtualBoundary.

TABLE 37-continued

The variable curr is derived as follows:
curr = recPictureL[ hx, vy ]     (8-1188)
The variable sum is derived as follows:
sum = f[ idx[ 0 ] ] * ( Clip3( −c[ idx[ 0 ] ], c[ idx[ 0 ] ], recPicture[ hx, vy + r3 ] − curr )
+
    Clip3( −c[ idx[ 0 ] ], c[ idx[ 0 ] ], recPictureL[ hx, vy − r3 ] − curr ) ) +
f[ idx [ 1 ] ] * ( Clip3( −c[ idx[ 1 ] ], c[ idx[ 1 ] ], recPictureL[ hx + 1, vy + r2 ] −
curr ) +
    Clip3( −c[ idx[ 1 ] ], c[ idx[ 1 ] ], recPictureL[ hx − 1, vy − r2 ] − curr ) ) +
f[ idx[ 2 ] ] * ( Clips( −c[ idx[ 2 ] ], c[ idx[ 2 ] ], recPictureL[ hx, vy + r2 ] −
curr ) +
    Clip3( −c[ idx[ 2 ] ], c[ idx[ 2 ] ], recPictureL[ hx, vy − r2 ] − curr ) ) +
f[ idx[ 3 ] ] * ( Clip3( −c[ idx[ 3 ] ], c[ idx[ 3 ] ], recPictureL[ hx − 1, vy + r2 ] −
curr ) +
    Clip3( −c[ idx[ 3 ] ], c[ idx[ 3 ] ], recPictureL[ hx + 1, vy − r2 ] − curr ) ) +
f[ idx[ 4 ] ] * ( Clip3( −c[ idx[ 4 ] ], c[ idx[ 4 ] ], recPictureL[ hx + 2, vy + r1 ] −
curr ) +
    Clip3( −c[ idx[ 4 ] ], c[ idx 4 ] ], recPictureL[ hx − 2, vy − r1 ] − curr ) ) +
f[ idx[ 5 ] ] * ( Clip3( −c[ idx[ 5 ] ], c[ idx[ 5 ] ], recPictureL[ hx, +1, vy + r1 ] −
curr ) +
    Clip3( −c[idx[ 5 ] ], c[ idx[ 5 ] ], recPictureL[ hx − 1, vy − r1 ] − curr ) ) +
f[ idx[ 6 ] ] * ( Clip3( −c[ idx[ 6 ] ], c[ idx[ 6 ] ], recPictureL[ hx, vy + r1 ] −
curr ) +
    Clip3( −c[ idx[ 6 ] ], c[ idx[ 6 ] ], recPictureL[ hx, vy − r1 ] − curr ) ) +
f[ idx[ 7 ] ] * ( Clip3( −c[ idx[ 7 ] ], c[ idx[ 7 ] ], recPictureL[ hx − 1, vy + r1 ] −
curr ) +
    Clip3( −c[ idx[ 7 ] ], c[ idx[ 7 ] ], recPictureL[ hx + 1, vy − r1] − curr ) ) +
f[ idx[ 8 ] ] * ( Clip3( −c[ idx[ 8 ] ], c[ idx[ 8 ] ], recPictureL[ hx − 2, vy + r1 ] −
curr ) +
    Clip3( −c[ idx[ 8 ] ], c[ idx[ 8 ] ], recPictureL[ hx + 2, vy − r1 ] − curr ) ) +
f[ idx[ 9 ] ] * ( Clip3( −c[ idx[ 9 ] ], c[ idx[ 9 ] ], recPictureL[ hx + 3, vy ] − curr )
+
    Clip3( −c[ idx[ 9 ] ], c[ idx[ 9 ] ], recPictureL[ hx − 3, vy ] − curr ) ) +
f[ idx[ 10 ] ] * ( Clip3( −c[ idx[ 10 ] ], c[ idx[ 10 ] ], recPictureL[ hx + 2, vy ] − curr )
+
    Clip3( −c[ idx[ 10 ] ], c[ idx[ 10 ] ], recPictureL[ hx − 2, vy ] − curr ) ) +
f[ idx[ 11 ] ] * ( Clips3( −c[ idx[ 11 ] ], c[ idx[ 11 ] ], recPictureL[ hx + 1, vy ] − curr )
+
    Clip3( −c[ idx[ 11 ] ], c[ idx[ 11 ] ], recPictureL[ hx − 1, vy ] − curr ) )
(8-1189)
sum = curr + ( ( sum + 64 ) >> 7 )     (8-1190)
The modified filtered reconstructed luma picture sample alfPictureL[ xCtb + x ][ yCtb + y ] is
derived as follows:
If pcm_loop_filter_disabled_flag and pcm_flag[ xCtb + x ][ yCtb + y ] are both equal to 1, the
following applies:
alfPictureL[ xCtb + x ][ yCtb + y ] = recPictureL[ hx, vy ](8-1191)
Otherwise (pcm_loop_filter_disabled_flag is equal to 0 or pcm_flag[ x ][ y ] is equal 0), the
following applies:
alfPictureL[ xCtb + x ][ yCtb + y ] = Clip3( 0, ( 1 << BitDepthY ) − 1, sum )     (8-1192)

Table 8-22-Specification of r1, r2, and r3 according to the horizontal luma sample position y and applyVirtualBoundary

| condition | | r1 | r2 | r3 |
|---|---|---|---|---|
| ( y  = =  CtbSizeY − 5  | |   y  = =  CtbSizeY − 4 ) && ( applyVirtualBoundary = = 1 ) | 0 | 0 | 0 |
| ( y  = =  CtbSizeY − 6  | |   y  = =  CtbSizeY − 3 ) && ( applyVirtualBoundary = = 1 ) | 1 | 1 | 1 |
| ( y  = =  CtbSizeY − 7  | |   y  = =  CtbSizeY − 2 ) && ( applyVirtualBoundary = = 1 ) | 1 | 2 | 2 |
| otherwise | | 1 | 2 | 3 |

In addition the table below shows an example of a procedure for deriving the ALF transpose and filter index for luma samples in a standard document format.

TABLE 38

Derivation process for ALF transpose and filter index for luma samples

Inputs of this process are:

a luma location ( xCtb, yCtb ) specifying the top-left sample of the current luma coding tree block relative to the top left sample of the current picture, a reconstructed luma picture sample array recPictureL prior to the adaptive loop filtering process.

TABLE 38-continued

Outputs of this process are
the classification filter index array filtIdx[ x ][ y ] with x, y = 0..CtbSizeY − 1,
the transpose index array transposeIdx[ x ][ y ] with x, y = 0..CtbSizeY − 1.
The locations ( hx + i, vy + j ) for each of the corresponding luma samples ( x, y ) inside the
given array recPicture of luma samples with i, j = −2..5 are derived as follows:
If pps_loop_filter_across_virtual_boundaries_disabled_flag is equal to 1 and
xCtb + x − PpsVirtualBoundariesPosX[ n ] is greater than or equal to 0 and less than 2 for any
n = 0..pps_num_ver_virtual_boundaries − 1, the following applies:
hx + i = Clip3( PpsVirtualBoundariesPosX[ n ], pic_width_in_luma_samples − 1, xCtb +
x + i )    (8-1193)
Otherwise, if pps_loop_filter_across_virtual_boundaries_disabled_flag is equal to 1 and
PpsVirtualBoundariesPosX[ n ] − xCtb − x is greater than 0 and less than 6 for any
n = 0..pps_num_ver_virtual_boundaries − 1, the following applies:
hx + i = Clip3( 0, PpsVirtualBoundariesPosX[ n ] − 1, xCtb + x + i )    (8-1194)
Otherwise, the following applies:
hx + i = Clip3( 0, pic_width_in_luma_samples − 1, xCtb + x + i ) (8-1195)
If pps_loop_filter_across_virtual_boundaries_disabled_flag is equal to 1 and
yCtb + y − PpsVirtualBoundariesPosY[ n ] is greater than or equal to 0 and less than 2 for any
n = 0..pps_num_hor_virtual_boundaries − 1, the following applies:
vy + j = Clip3( PpsVirtualBoundariesPosY[ n ], pic_height_in_luma_samples − 1, yCtb + y +
j )    (8-1196)
Otherwise, if pps_loop_filter_across_virtual_boundaries_disabled_flag is equal to 1 and
PpsVirtualBoundariesPosY[ n ] − yCtb − y is greater than 0 and less than 6 for any
n = 0..pps_num_hor_virtual_boundaries − 1, the following applies:
vy + j = Clip3( 0, PpsVirtualBoundariesPosY[ n ] − 1, yCtb + y + j )    (8-1197)
Otherwise, the following applies:
If yCtb + CtbSizeY is greater than or equal to pic_height_in_luma_samples, the following
applies:
vy + j = Clip3( 0, pic_height_in_luma_samples − 1, yCtb + y + j ) (8-1198)
Otherwise, if y is less than CtbSizeY − 4, the following applies:
vy + j = Clip3( 0, yCtb + CtbSizeY − 5, yCtb + y + j )    (8-1199)
Otherwise, the following applies:
vy + j = Clip3( yCtb + CtbSizeY − 4,  pic_height_in_luma_samples − 1, yCtb + y + j )
  (8-1200)
The classification filter index array filtIdx and the transpose index array transposeIdx are derived
by the following ordered steps:
The variables filtH[ x ][ y ], filtV[ x ][ y ], filtD0[ x ][ y ] and filtD1[ x ][ y ] with
x, y = −2..CtbSizeY + 1 are derived as follows:
If both x and y are even numbers or both x and y are uneven numbers, the following applies:
filtH[ x ][ y ] = Abs( ( recPicture[ hx, vy ] << 1 ) − recPicture[ hx − 1, vy ]−   (8-1201)
  recPicture[ hx + 1, vy ] )
filtV[ x ][ y ] = Abs( ( recPicture hx, vy ] << 1 ) − recPicture[ hx, vy − 1 ]−   (8-1202)
  recPicture[ hx, vy + 1 ] )
filtD0[ x ][ y ] = Abs( ( recPicture[ hx, vy ] << 1 ) − recPicture[ hx − 1,vy − 1 ] −
  recPicture[ hx + 1, vy + 1 ] ) (8-1203)
filtD1[ x ][ y ] = Abs( ( recPicture[ hx, vy ] << 1 ) − recPicture [ hx + 1, vy − 1 ] −
  recPicture[ hx − 1, vy + 1 ] ) (8-1204)
Otherwise, filtH[ x ][ y ], filtV[ x ][ y ], filtD0[ x ][ y ] and filtD1[ x ][ y ] are set equal to 0.
The variables minY, maxY and ac are derived as follows:
If ( y << 2 ) is equal to ( CtbSizeY − 8 ) and ( yCtb + CtbSizeY ) is less than
pic_height_in_luma_samples − 1, minY is set equal to −2, maxY is set equal to 3 and ac is set
equal to 96.
Otherwise, if ( y << 2 ) is equal to ( CtbSizeY − 4) and ( yCtb + CtbSizeY ) is less than
pic_height_in_luma_samples − 1, minY is set equal to 0, maxY is set equal to 5 and ac is set
equal to 96.
Otherwise, minY is set equal to −2 and maxY is set equal to 5 and ac is set equal to 64.
The variables varTempH1[ x ][ y ], varTempV1[ x ][ y ], varTempD01[ x ][ y ],
varTempD11[ x ][ y ] and varTemp[ x ][ y ] with x, y = 0..( CtbSizeY − 1 ) >> 2 are derived as
follows:
sumH[ x ][ y ] = ΣiΣj    filtH[ h(x << 2 ) + i − xCtb ][ v(y << 2) + j − yCtb ]    with
i = −2..5, j = minY..maxY    (8-1205)
sumV[ x ][ y ] = ΣiΣj    filtV[ h(x << 2 ) + i − xCtb ][ v(y << 2) + j − yCtb ]    with
i = −2..5, j = minY..maxY    (8-1206)
sumD0[ x ][ y ] = ΣiΣj    filtD0[ h(x << 2 ) + i − xCtb ][ v(y << 2) + j − yCtb ]    with
i = −2..5, j = minY..maxY    (8-1207)
sumD1[ x ][ y ] = ΣiΣj    filtD1[ h(x << 2 ) + i − xCtb ][ v(y << 2) + j − yCtb ]    with
i = −2..5, j = minY..maxY    (8-1208)
sumOfHV[ x ][ y ] = sumH[ x ][ y ] + sumV[ x ][ y ]    (8-1209)
The valables dir1[ x ][ y ], dir2[ x ][ y ] and dirS[ x ][ y ] with x, y = 0..CtbSizeY − 1 are
derived as follows:
The variables hv1, hv0 and dirHV are derived as follows:
If sumV[ x >> 2 ][ y >> 2 ] is greater than sumH[ X >> 2 ][ y >> 2 ], the following applies:
hv1 = sumV[ x >> 2 ][ y >> 2 ]    (8-1210)
hv0 = sumH[ x >> 2 ][ y >> 2 ]    8-1210)
dirHV = 1    (8-1212)
Otherwise, the following applies:
hv1 = svmH[ x >> 2 ][ y >> 2 ]    (8-1213)
hv0 = sumV[ x >> 2 ][ y >> 2 ]    (8-1214)
dirHV = 3    (8-1215)

TABLE 38-continued

The variables d1, d0 and dirD are derived as follows:
If sumD0[ x >> 2 ][ y >> 2 ] is greater than sumD1[ x >> 2 ][ y >> 2 ], the following applies:
d1 = sumD0[ x >> 2][ y >> 2 ]   (8-1216)
d0 = sumD1[ x >> 2 ][ y >> 2 ]   (8-1217)
dirD = 0   (8-1218)
Otherwise, the following applies:
d1 = sumD1[ x >> 2 ][ y >> 2 ]   (8-1219)
d0 = sumD0[ x >> 2 ][ y >> 2 ]   (8-1220)
dirD = 2   (8-1221)
The variables hvd1, hvd0, are derived as follows:
hvd1 = ( d1 * hv0 > hv1 * d0 ) ? d1 : hv1   (8-1222)
hvd0 = ( d1 * hv0 > hv1 * d0 ) ? d0 : hv0   (8-1223)
The variables dirS[ x ][ y ], dir1[ x ][ y ] and dir2[ x ][ y ] derived as follows:
dir1[ x ][ y ] = ( d1 * hv0 > hv1 * d0 ) ? dirD : dirHV   (8-1224)
dir2[ x ][ y ] = ( d1 * hv0 > hv1 * d0 ) ? dirHV : dirD   (8-1225)
dirS[ x ][ y ] = ( hvd1 > 2 * hvd0 ) ? 1 : ( ( hvd1 * 2 > 9 * hvd0 ) ? 2 : 0 )   (8-1226)
The variable avgVar[ x ][ y ] with x, y = 0..CtbSizeY − 1 is derived as follows:
varTab[ ] = { 0, 1, 2, 2, 2, 2, 2, 3, 3, 3, 3, 3, 3, 3, 3, 4 }   (8-1227)
avgVar[ x ][ y ] = varTab[ Clip3( 0, 15, ( sumOfHV[ x >> 2 ][ y >> 2 ] * ac ) >> ( 3 + BitDepthY ) ) ]   (8-1228)
The classification filter index array filtIdx[ x ][ y ] and the transpose index array
transposeIdx[ x ][ y ] with x = y = 0..CtbSizeY − 1 are derived as follows:
transposeTable[ ] = { 0, 1, 0, 2, 2, 3, 1, 3 }
transposeIdx[ x ][ y ] = transposeTable[ dir1[ x ][ y ] * 2 + ( dir2[ x ][ y ] >> 1 ) ]
filtIdx[ x ][ y ] = avgVar[ x ][ y ]
When dirS[ x ][ y ] is not equal 0, filtIdx[ x ][ y ] is modified as follows:
filtIdx[ x ][ y ] += ( ( ( dir1[ x ][ y ] & 0x1 ) << 1 ) + dirS[ x ][ y ] ) * 5   (8-1229)

In addition, the table below shows an example of a coding tree unit filtering procedure for chroma samples in a standard document format.

TABLE 39

Coding tree block filtering process for chroma samples
Inputs of this process are:
a reconstructed chroma picture sample array recPicture prior to the adaptive loop filtering
process,
a filtered reconstructed chroma picture sample array alfPicture,
a component index compIdx specifying the chroma component index of the current chroma
coding treeblock,
a chroma location ( xCtbC, yCtbC ) specifying the top-left sample of the current chroma coding
tree block relative to the top left sample of the current picture.
Output of this process is the modified filtered reconstructed chroma picture sample array
alfPicture.
The width and height of the current chroma coding tree block ctbWidthC and ctbHeightC is
derived as follows:
ctbWidthC = CtbSizeY / SubWidthC   (8-1230)
ctbHeightC = CtbSizeY / SubHeightC   (8-1231)
   For the derivation of the filtered reconstructed chroma samples alfPicture[ x ][ y ], each
   reconstructed chroma sample inside the current chroma coding tree block recPicture[ x ][ y ] is
   filtered as follows with x = 0..ctbWidthC − 1, y = 0..ctbHeightC − 1:
   The locations ( hx + i, vy + j ) for each of the corresponding chroma samples ( x, y ) inside the
   given array recPicture of chroma samples with i, j = −2..2 are derived as follows:
   If pps_loop_filter_across_virtual_boundaries_disabled_flag is equal to 1 and
   xCtbC + X − PpsVirtualBoundariesPosX[ n ] / SubWidthC is greater than or equal to 0 and less
   than 2 for any n = 0..pps_num_ver_virtual_boundaries − 1, the following applies:
   hx + i = Clip3( PpsVirtualBoundariesPosX[ n ] / SubWidthC,   (8-1232)
       pic_width_in_luma_samples / SubWidthC − 1, xCtbC + x + i )
   Otherwise, if pps_loop_filter_across_virtual_boundaries_disabled_flag is equal to 1 and
   PpsVirtualBoundariesPosX[ n ] / SubWidthC − xCtbC − x is greater than 0 and less than 3 for
   any n = 0..pps_num_ver_virtual_boundaries − 1, the following applies:
   hx + i = Clip3( 0, PpsVirtualBoundariesPosX[ n ] / SubWidthC − 1, xCtbC + x + i )
       (8-1233)
   Otherwise, the following applies:
   hx + i = Clip3( 0, pic_width_in_luma_samples / SubWidthC − 1, xCtbC + x + i )   (8-1234)
   If pps_loop_filter_across_virtual_boundaries_disabled_flag is equal to 1 and
   yCtbC + y − PpsVirtualBoundariesPosY[ n ] / SubHeightC is greater than or equal to 0 and less
   than 2 for any n = 0..pps_num_hor_virtual_boundaries − 1, the following applies:
   vy + j = Clip3( PpsVirtualBoundariesPosY[ n ] / SubHeightC ,   (8-1235)
       pic_height_in_luma_samples / SubHeightC − 1, yCtbC + y + j )
   Otherwise, if pps_loop_filter_across_virtual_boundaries_disabled_flag is equal to 1 and
   PpsVirtualBoundariesPosY[ n ] / SubHeightC − yCtbC − y is greater than 0 and less than 3 for
   any n = 0..pps_num_hor_virtual_boundaries − 1, the following applies:
   vy + j = Clip3( 0, PpsVirtualBoundariesPosY[ n ] / SubHeightC − 1, yCtbC + y + j )
       (8-1236)

TABLE 39-continued

Otherwise, the following applies:
vy + j = Clip3( 0, pic_height_in_luma_samples / SubHeightC − 1, yCtbC + y + j ) (8-1237)
The variable applyVirtualBoundary is derived as follows:
If one or more of the following conditions are true, applyVirtualBoundary is set equal to 0:
The bottom boundary of the current coding tree block is the bottom boundary of the picture.
The bottom boundary of the current coding tree block is the bottom boundary of the brick and
loop_filter_across_bricks_enabled_flag is equal to 0.
The bottom boundary of the current coding tree block is the bottom boundary of the slice and
loop_filter_across_slices_enabled_flag is equal to 0.
The bottom boundary of the current coding tree block is one of the bottom virtual boundaries of
the picture and pps_loop_filter_across_virtual_boundaries_disabled_flag is equal to 1.
Otherwise, applyVirtualBoundary is set equal to 1.
The reconstructed sample offsets r1 and r2 are specified in Table 8-22 according to the horizontal
luma sample position y and applyVirtualBoundary.
The variable curr is derived as follows:
curr = recPicture[ hx, vy ]         (8-1238)
The variable altIdx is derived as follows:
altIdx =
alf_ctb_filter_alt_idx[ compIdx ][ xCtb >> Log2CtbSize ][ yCtb >> Log2CtbSize ][ 0 ]
  (8-1239)
The array of chroma filter coefficients f[ j ] and the array of chroma clipping values c[ j ] is
derived as follows with j = 0..5:
f[ j ] = AlfCoeffC[ slice_alf_aps_id_chroma ][ altIdx ][ j ] (8-1239)
c[ j ] = AlfClipC[ slice_alf_aps_id_chroma ][ altIdx ][ j ] (8-1240)
The variable sum is derived as follows:
sum = f[ 0 ] * ( Clip3( −c[ 0 ], c[ 0 ], recPicture[ hx, vy + r2 ] − curr ) +
    Clip3( −c[ 0 ], c[ 0 ], recPicture[ hx, vy − r2 ] − curr ) ) +
  f[ 1 ] * ( Clip3( −c[ 1 ], c[ 1 ], recPicture[ hx + 1, vy + r1 ] − curr ) +
    Clip3( −c[ 1 ], c[ 1 ], recPicture[ hx − 1, vy − r1 ] − curr ) ) +
  f[ 2 ] * ( Clip3( −c[ 2 ], c[ 2 ], recPicture[ hx, vy + r1 ] − curr ) +
    Clip3( −c[ 2 ], c[ 2 ], recPicture[ hx, vy − r1 ] − curr ) ) +     (8-1241)
  f[ 3 ] * ( Clip3( −c[ 3 ], c[ 3 ], recPicture[ hx − 1, vy + r1 ] − curr ) +
    Clip3( −c[ 3 ], c[ 3 ], recPicture[ hx + 1, vy − r1 ] − curr ) ) +
  f[ 4 ] * ( Clip3( −c[ 4 ], c[ 4 ], recPicture[ hx + 2, vy ] − curr ) +
    Clip3( −c[ 4 ], c[ 4 ], recPicture[ hx − 2, vy ] − curr ) ) +
  f[ 5 ] * ( Clip3( −c[ 5 ], c[ 5 ], recPicture[ hx + 1, vy ] − curr ) +
    Clip3( −c[ 5 ], c[ 5 ], recPicture[ hx − 1, vy ] − curr ) )
sum = curr + ( sum + 64 ) >> 7 )      (8-1242)
The modified filtered reconstructed chroma picture sample alfPicture[ xCtbC + x ][ yCtbC + y ]
is derived as follows:
If                 pcm_loop_filter_disabled_flag                 and
pcm_flag[ ( xCtbC + x ) * SubWidthC ][ ( yCtbC + y ) * SubHeightC ] are both equal to 1, the
following applies:
alfPicture[ xCtbC + x ][ yCtbC + y ] = recPictureL[ hx, vy ]   (8-1243)
Otherwise (pcm_loop_filter_disabled_flag is equal to 0 or pcm_flag[ x ][ y ] is equal 0), the
following applies:
alfPicture[ xCtbC + x ][ yCtbC + y ] = Clip3( 0, ( 1 << BitDepthC ) − 1, sum )   (8-1244)

Table 8-23-Specification of r1 and r2 according to the horizontal luma sample position y and
applyVirtualBoundary

| condition | r1 | r2 |
|---|---|---|
| ( y == ctbHeightC − 2  ‖  y == ctbHeightC − 3 )  &&  ( applyVirtualBoundary == 1 ) | 0 | 0 |
| ( y == ctbHeightC − 1  ‖  y == ctbHeightC − 4 )  &&  ( applyVirtualBoundary == 1 ) | 1 | 1 |
| otherwise: | 1 | 2 |

In addition, the table below shows an example of an initialization value (initValue) and a shift index (shiftIdx) according to a context index increment (ctxInc) for the syntax element alf_ctb_filter_alt_idx.

TABLE 40

| | initValue of alf_ctb_filter_alt_idx | | | |
|---|---|---|---|---|
| ctxInc | initType == 0 | initType == 1 | initType == 2 | shiftIdx |
| 0 | — | — | — | — |
| 1 | 100 | 153 | 200 | 0 |
| 2 | 100 | 153 | 200 | 0 |

Referring to the table above, the initialization value (initValue) for the syntax element alf_ctb_filter_alt_idx indicating index information of the alternative filter may be determined based on the context index increment (ctxInc) or the initialization type (initType) for alf_ctb_filter_alt_idx. In addition, the shift index (shiftIdx) for alf_ctb_filter_alt_idx may be determined based on the context index increment (ctxInc) for alf_ctb_filter_alt_idx.

In addition, the table below shows an example of binarization related to various syntaxes including the syntax element alf_ctb_filter_alt_idx.

TABLE 41

| Syntax structure | Syntax element | Binarization | |
|---|---|---|---|
| | | Process | Input parameters |
| slice_data( ) | end_of_brick_one_bit | FL | cMax = 1 |
| coding_tree_unit( ) | alf_ctb_flag[ ][ ][ ] | FL | cMax = 1 |
| | alf_ctb_use_first_aps_flag | FL | cMax = 1 |
| | alf_use_aps_flag | FL | cMax = 1 |
| | alf_luma_fixed_filter_idx | TB | cMax = 15 |
| | alf_luma_prev_filter_idx_minus1 | TB | cMax = slice_num_alf_aps_ids_luma − 2 |
| | alf_ctb_filter_alt_idx[ 1 ][ ][ ][ ] | TR | cMax = alf_chroma_num_alts_minus1, cRiceParam = 0 |
| | alf_ctb_filter_alt_idx[ 2 ][ ][ ][ ] | TR | cMax = alf_chroma_num_alts_minus1, cRiceParam = 0 |
| sao( ) | sao_merge_left_flag | FL | cMax = 1 |
| | sao_merge_up_flag | FL | cMax = 1 |
| | sao_type_idx_luma | TR | cMax = 2, cRiceParam = 0 |
| | sao_type_idx_chroma | TR | cMax = 2, cRiceParam = 0 |
| | sao_offset_abs[ ][ ][ ][ ] | TR | cMax = ( 1 << (Min(bitDepth, 10) − 5 ) ) − 1, cRiceParam = 0 |
| | sao_offset_sign[ ][ ][ ][ ] | FL | cMax = 1 |
| | sao_band_position[ ][ ][ ] | FL | cMax = 31 |
| | sao_eo_class_luma | FL | cMax = 3 |
| | sao_eo_class_chroma | FL | cMax = 3 |
| coding_tree( ) | split_cu_flag | FL | cMax = 1 |
| | split_qt_flag | FL | cMax = 1 |
| | mtt_split_cu_vertical_flag | FL | cMax = 1 |
| | mtt_split_cu_binary_flag | FL | cMax = 1 |
| coding_unit( ) | cu_skip_flag[ ][ ] | FL | cMax = 1 |
| | pred_mode_ibc_flag | FL | cMax = 1 |
| | pred_mode_flag | FL | cMax = 1 |
| | pcm_flag[ ][ ] | FL | cMax = 1 |
| | intra_bdpcm_flag[ ][ ] | FL | cMax = 1 |
| | intra_bdpcm_dir_flag[ ][ ] | FL | cMax = 1 |
| | intra_mip_flag[ ][ ] | FL | cMax = 1 |
| | intra_mip_mpm_flag[ ][ ] | FL | cMax = 1 |
| | intra_mip_mpm_idx[ ][ ] | TR | cMax = 2, cRiceParam = 0 |
| | intra_mip_mpm_remainder[ ][ ] | FL | cMax = (cbWidth = = 5 && cbHeight = = 4) ? 31 : ( (cbWidth <= 8 && cbHeight <= 8) ? 15 : 7) |
| | intra_luma_ref_idx[ ][ ] | TR | cMax = 2, cRiceParam = 0 |
| | intra_subpartitions_mode_flag | FL | cMax = 1 |
| | itnra_subpartitions_split_flag | FL | cMax = 1 |
| | intra_luma_mpm_flag[ ][ ] | FL | cMax = 1 |
| | intra_luma_not_planar_flag[ ][ ] | FL | cMax = 1 |
| | intra_luma_mpm_idx[ ][ ] | TR | cMax = 4, cRiceParam = 0 |
| | intra_luma_mpm_remainder[ ][ ] | TB | — |
| | intra_chroma_pred_mode[ ] | 9.5.3.8 | cMax = 1 |
| | general_merge_flag[ ][ ] | FL | cMax = 1 |
| | inter_pred_idc[ x0 ][ y0 ] | 9.5.3.9 | cbWidth, cbHeight |
| | inter_affine_flag[ ][ ] | FL | cMax = 1 |
| | cu_affine_type_flag[ ][ ] | FL | cMax = 1 |
| | sym_mvd_flag[ ][ ] | FL | cMax = 1 |
| | ref_idx_l0[ ][ ] | TR | cMax = NumRefIdxActive[ 0 ] − 1, cRiceParam = 0 |
| | mvp_l0_flag[ ][ ] | FL | cMax = 1 |
| | ref_idx_l1[ ][ ] | TR | cMax = NumRefIdxActive[ 1 ] − 1, cRiceParam = 0 |
| | mvp_l1_flag[ ][ ] | FL | cMax = 1 |
| | avmr_flag[ ][ ] | FL | cMax = 1 |
| | amvr_precision_flag[ ][ ] | FL | cMax = 1 |
| | bcw_idx[ ][ ] | TR | cMax = NoBackwardPredFlag ? 4: 2 |
| | cu_cbf | FL | cMax = 1 |
| | cu_sbt_flag | FL | cMax = 1 |
| | cu_sbt_quad_flag | FL | cMax = 1 |
| | cu_sbt_horizontal_flag | FL | cMax = 1 |
| | cu_sbt_pos_flag | FL | cMax = 1 |
| merge_data( ) | regular_merge_flag[ ][ ] | FL | cMax = 1 |
| | mmvd_merge_flag[ ][ ] | FL | cMax = 1 |
| | mmvd_cand_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | merge_subblock_flag[ ][ ] | AL | cMax = 1 |
| | merge_subblock_idx[ ][ ] | TR | cMax = MaxNumSubblockMergeCand − 1, cRiceParam = 0 |
| | merge_triangle_split_dir[ ][ ] | FL | cMax = 1 |
| | merge_triangle_idx0[ ][ ] | TR | cMax = MaxNumTriangleMergeCand − 1, cRiceParam = 0 |
| | merge_triangle_idx1[ ][ ] | TR | cMax = MaxNumTriangleMergeCand − 2, cRiceParam = 0 |
| | merge_idx[ ][ ] | TR | cMax = MaxNumMergeCand − 1, cRiceParam = 0 |
| mvd_coding( ) | abs_mvd_greater0_flag[ ] | FL | cMax = 1 |
| | abs_mvd_greater1_flag[ ] | FL | cMax = 1 |
| | abs_mvd_minus2[ ] | EG1 | — |
| | mvd_sign_flag[ ] | FL | cMax = 1 |
| transform_unit( ) | tu_cbf_luma[ ][ ][ ] | FL | cMax = 1 |
| | tu_cbf_cb[ ][ ][ ] | FL | cMax = 1 |
| | tu_cbf_cr[ ][ ][ ] | FL | cMax= 1 |

TABLE 41-continued

| Syntax structure | Syntax element | Binarization | |
|---|---|---|---|
| | | Process | Input parameters |
| | cu_qp_delta_abs | 9.5.3.10 | — |
| | cu_qp_delta_sign_flag | FL | cMax = 1 |
| | transform_skip_flag[ i ] | FL | cMax = 1 |
| | tu_mts_idx[ ][ ] | TR | cMax = 4, cRiceParam = 0 |
| | tu_joint_cbcr_residual[ ][ ] | FL | cMax = 1 |
| residual_coding( ) | last_sig_coeff_x_prefix | TR | cMax = ( log2ZoTbWidth << 1 ) − 1, cRiceParam = 0 |
| | last_sig_coeff_y_prefix | TR | cMax = ( log2ZoTbHeight << 1 ) − 1, cRiceParam = 0 |
| | last_sig_coeff_x_suffix | FL | cMax = ( 1 << ( ( last_sig_coeff_x_prefix >> 1 ) −1 ) − 1 ) |
| | last_sig_coeff_y_suffix | FL | cMax = ( 1 << ( ( last_sig_coeff_y_prefix >> 1 ) − 1 ) − 1 ) |
| | coded_sub_block_flag[ ][ ] | FL | cMax = 1 |
| | sig_coeff_flag[ ][ ] | FL | cMax = 1 |
| | par_level_flag[ ] | FL | cMax = 1 |
| | abs_level_gtx_flag[ ][ ] | FL | cMax = 1 |
| | abs_remainder[ ] | 9.5.3.11 | cIdx, current sub-block index i, x0, y0 |
| | dec_abs_level[ ] | 9.5.3.12 | cIdx, x0, y0, xC, yC, log2TbWidth, log2TbHeight |
| | coeff_sign_flag[ ] | Fl | cMax = 1 |

Referring to the table above, the syntax element alf_ctb_filter_alt_idx indicating index information of the alternative filter for the coding tree unit (CTU) to which the ALF is applied or the chroma component of the current block may be coded based on a truncated rice binarization method of the index parameter of the alternative filter. In addition, a maximum value (cMax) of the index parameter of the alternative filter for the chroma component may correspond to alf_chroma_num_alts_minus1. alf_chroma_num_alts_minus1 may correspond to a value that is one less than the number of alternative filters for the chroma component. In addition, the truncated rice binarization method may be performed based on a rice parameter (cRiceParam) value of 0.

In addition, the table below shows an example of a procedure for deriving a context index increment (ctxInc) for the syntax element alf_ctb_filter_alt_idx in a standard document format.

TABLE 42

1.1.1.2.1 Derivation process of ctxInc for the syntax element alf_ctb_filter_alt_idx
Input of this process is the colour component index cIdx.
Output of this process is the variable ctxInc.
The variable ctxInc is derived as follows:
ctxInc = cIdx             (9-50)

Bins of a bin string for the index information of the alternative filter may be entropy-decoded based on the context model, and the context model for the bins of the bin string for the index information of the alternative filter may be determined based on the context index increment for the bins. Referring to the table above, the context model for the index information of the alternative filter may be determined based on the context index increment for the syntax element alf_ctb_filter_alt_idx indicating the index information of the alternative filter, and the context index increment for the index information of the alternative filter may be determined based on the CTU to which the ALF is applied or the chroma component of the current block. For example, the context index increment for the index information of the alternative filter may be determined based on the index of the chroma component. For example, the context index increment derived when the chroma component of the current block is cb may be different from the context index increment derived when the chroma component of the current block is cr. For example, when the index of the chroma component is 0, the context index increment for alf_ctb_filter_alt_idx may have a value of 0, and when the index of the chroma component is 1, the context index increment for alf_ctb_filter_alt_idx may have a value of 1. Alternatively, for example, when the index of the chroma component is 1, the context index increment for alf_ctb_filter_alt_idx may have a value of 1, and when the index of the chroma component is 2, the context index increment for alf_ctb_filter_alt_idx may have a value of 2.

Figure 13:
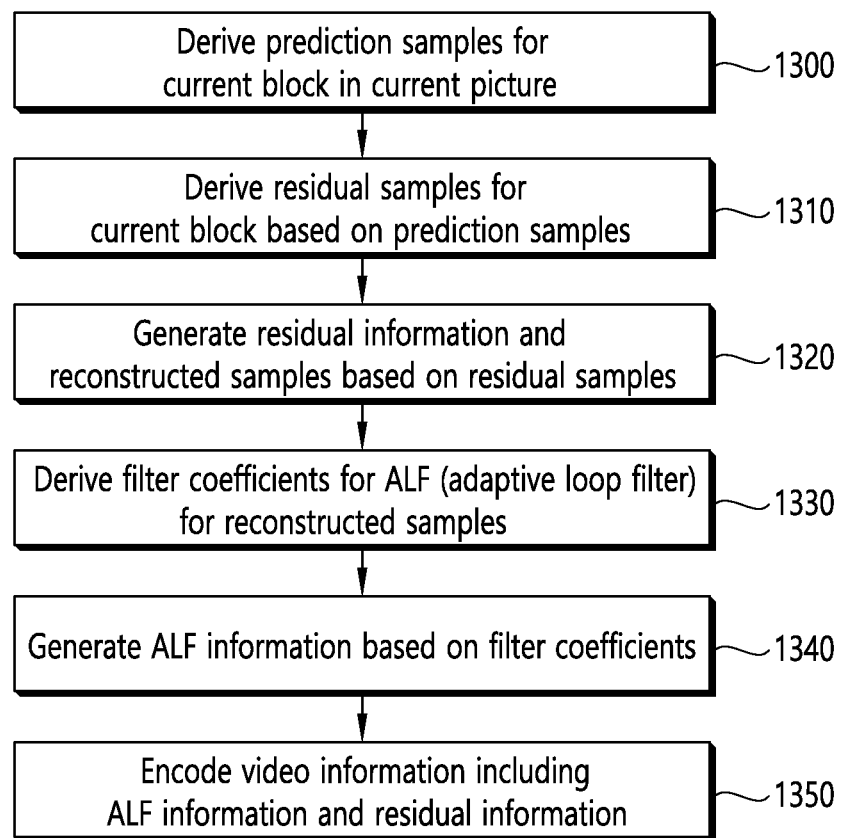
FIG. 13 and FIG. 14 schematically show an example of a video/image encoding method and related components according to embodiment(s) of the present disclosure.
Figure 14:
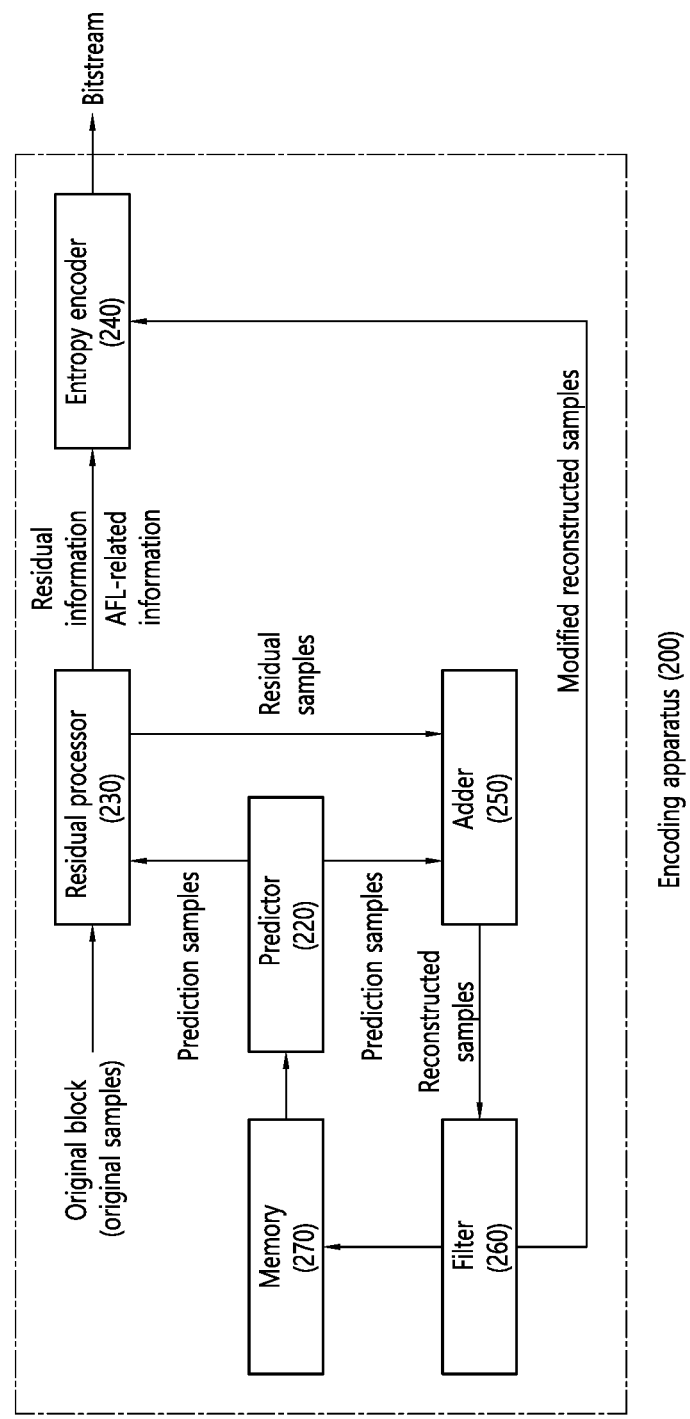

FIGS. 13 and 14 schematically show an example of a video/image encoding method and related components according to embodiment(s) of the present disclosure. The method illustrated in FIG. 13 may be performed by the encoding apparatus illustrated in FIG. 2. Specifically, for example, S1300 may be performed by the predictor 220 of the encoding apparatus, S1310 may be performed by the residual processor 230 of the encoding apparatus, and S1320 may be performed by the residual processor 230 or the adder 250 of the encoding apparatus. In addition, S1330 to S1340 may be performed by the adder 250 of the encoding apparatus, and S1350 may be performed by the entropy encoder 240 of the encoding apparatus. The method illustrated in FIG. 13 may include the embodiments described above in the present disclosure.

Referring to FIG. 13, the encoding apparatus derives prediction samples for a current block in a current picture (S1300). The encoding apparatus may derive prediction samples of the current block based on a prediction mode. The encoding apparatus may generate prediction mode information indicating a prediction mode applied to the current block. In this case, various prediction methods described in the present disclosure, such as inter prediction or intra prediction, may be applied. In this case, the encoding apparatus may generate prediction mode information. The encoding apparatus may generate prediction mode information indicating a prediction mode applied to the current block.

The encoding apparatus derives residual samples for a current block based on prediction samples (S1210). The encoding apparatus may derive residual samples based on the prediction samples and the original samples. For example, the encoding apparatus may derive residual samples based on a comparison between the original samples and the modified reconstructed samples.

The encoding apparatus generates residual information and reconstructed samples based on residual samples (S1320). Based on the residual information, (modified) residual samples may be derived. Reconstructed samples may be generated based on the (modified) residual samples and the prediction samples.

The encoding apparatus derives filter coefficients for an adaptive loop filter (ALF) for reconstructed samples (S1330). The encoding apparatus may generate ALF-related information. The encoding apparatus may derive an ALF-related parameter that may be applied for filtering the reconstructed samples.

In addition, the encoding apparatus generates ALF information based on filter coefficients (S1340). For example, the ALF information may include information on the ALF filter coefficients described above in the present disclosure, information on a fixed filter, information on clipping, and the like. Alternatively, for example, the ALF information may include alternative filter information for the chroma component of the current block.

The encoding apparatus encodes the image information including ALF information and residual information (S1250). The image/video information may include information for generating the reconstructed samples and/or information related to the ALF. The information for generating the reconstructed samples may include, for example, prediction-related information, residual information, and/or quantization/transformation-related information. The prediction-related information may include information on various prediction modes (e.g., merge mode, MVP mode, etc.), MVD information, and the like.

The encoded image/video information may be output in the form of a bitstream. The bitstream may be transmitted to a decoding apparatus through a network or a storage medium.

The image/video information may include various types of information according to an embodiment of the present disclosure.

In an embodiment, the alternative filter information may include information on the number of alternative filters for the chroma component of the current block, absolute value information of coefficients included in the alternative filters for the chroma component of the current block, and sign information of coefficients included in the alternative filters for the chroma component of the current block.

In an embodiment, the alternative filter information may include index information of the alternative filter for the chroma component of the current block, and the index information of the alternative filter may be based on truncated rice binarization.

In an embodiment, a maximum value (cMax) of the index information of the alternative filter may be equal to a value that is one less than the number of alternative filters for the chroma component of the current block, and the truncated rice binarization may be performed based on a rice parameter (cRiceParam) value of 0.

In an embodiment, bins of a bin string for index information of the alternative filter may be entropy-encoded based on a context model. The context model for the bins of the bin string with respect to the index information of the alternative filter may be determined based on a context index increment for the bins. In addition, the context index increment may be determined based on an index of a chroma component of the current block.

In an embodiment, the context index increment derived when the chroma component of the current block is cb may be different from the context index increment derived when the chroma component of the current block is cr.

In an embodiment, the image information may include information on ALF clipping, and the information on ALF clipping may include a flag indicating whether clipping is applied to the chroma component of the current block and clipping index information indicating a clipping value.

Figure 15:
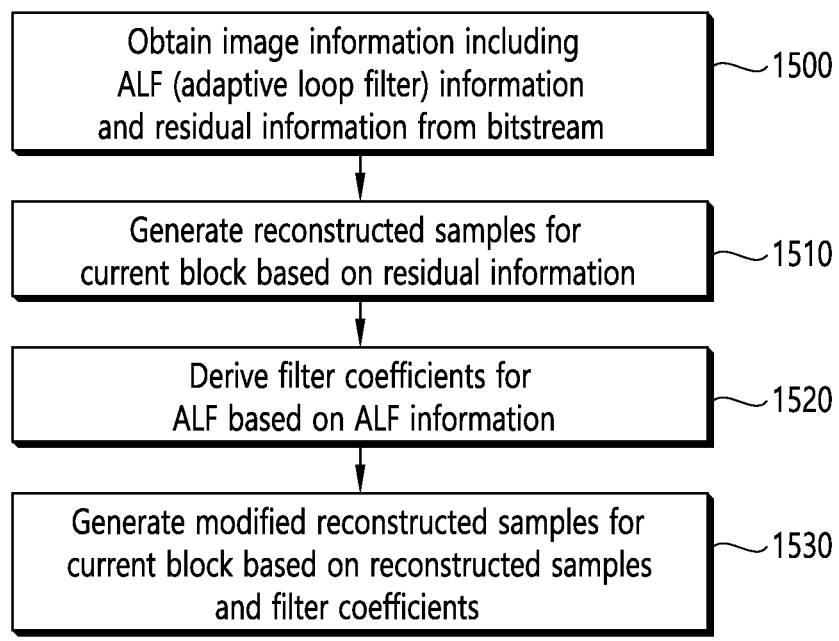
FIG. 15 and FIG. 16 schematically show an example of an image/video decoding method and related components according to an embodiment of the present disclosure.
Figure 16:
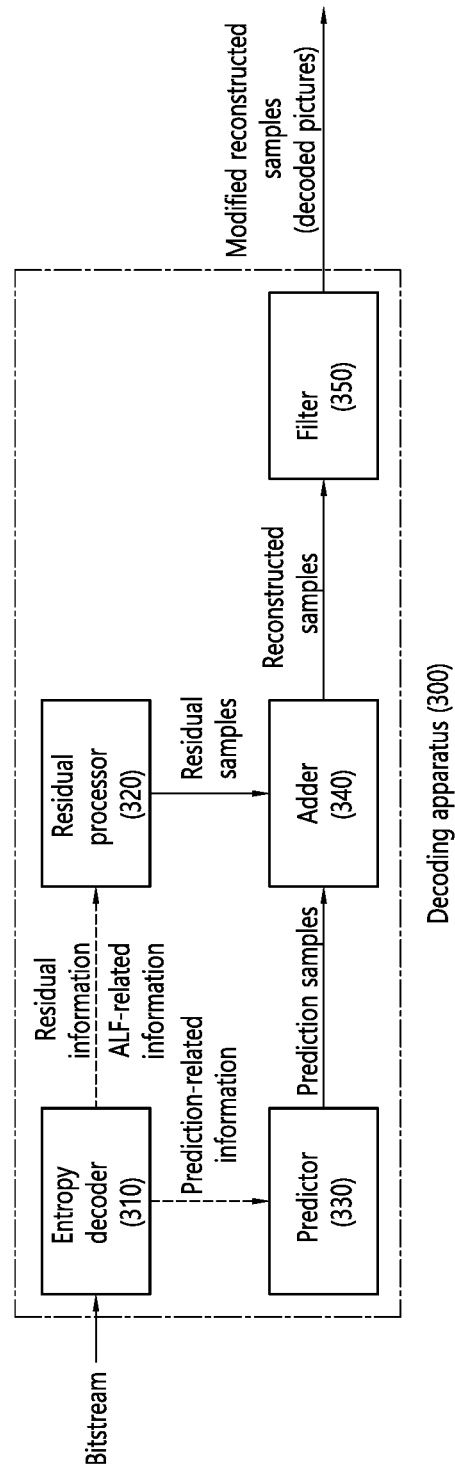

FIGS. 15 and 16 schematically show an example of an image/video decoding method and related components according to an embodiment of the present disclosure. The method illustrated in FIG. 15 may be performed by the decoding apparatus illustrated in FIG. 3. Specifically, for example, S1500 may be performed by the entropy decoder 310 of the decoding apparatus, S1510 may be performed by the adder 340 of the decoding apparatus, and S1520 to S1530 may be performed by the filter 350 of the decoding apparatus. The method illustrated in FIG. 15 may include the embodiments described above in the present disclosure.

Referring to FIG. 15, the decoding apparatus obtains image information including adaptive loop filter (ALF) information and residual information from a bitstream (S1500). The image information may include various information according to the aforementioned embodiment(s) of the present disclosure. For example, the image information may include at least a part of prediction-related information or residual-related information.

For example, the prediction-related information may include inter prediction mode information or inter prediction type information. For example, the inter prediction mode information may include information indicating at least a portion of various inter prediction modes. For example, various modes such as a merge mode, a skip mode, a motion vector prediction (MVP) mode, an affine mode, a subblock merge mode, or a merge with MVD (MMVD) mode may be used. In addition, decoder side motion vector refinement (DMVR) mode, adaptive motion vector resolution (AMVR) mode, bi-prediction with CU-level weight (BCW), or bi-directional optical flow (BDOF), etc. may be used in addition to or instead of an ancillary mode. For example, the inter prediction type information may include an inter_pred_idc syntax element. Alternatively, the inter prediction type information may include information indicating any one of L0 prediction, L1 prediction, and pair (bi) prediction.

In addition, the image information may include various information according to an embodiment of the present disclosure. For example, the image information may include ALF information, and the ALF information may include information described in at least one of Tables 1 to 42 described above. For example, the ALF information may include information on the ALF filter coefficients described above in the present disclosure, information on a fixed filter, information on clipping, and the like. Alternatively, for example, the ALF information may include alternative filter information for the chroma component of the current block.

The decoding apparatus generates reconstructed samples for a current block based on residual information (S1510). The decoding apparatus may derive prediction samples of the current block based on prediction-related information included in image/video information. The decoding apparatus may derive residual samples based on residual information included in the image/video information. The decoding apparatus may generate reconstructed samples based on the prediction samples and the residual samples. A reconstructed block and a reconstructed picture may be derived based on the reconstructed samples.

The decoding apparatus derives filter coefficients for an ALF based on ALF information (S1520). The decoding apparatus may derive filter coefficients for the ALF. One filter may include a set of filter coefficients. The filter or the filter coefficients may be derived based on the ALF information. Alternatively, filter coefficients for a chroma component of a current block may be generated based on alternative filter information.

The decoding apparatus generates modified reconstructed samples for the current block based on the reconstructed samples and the ALF information (S1530). The decoding apparatus may derive filter coefficients for ALF from the ALF information, and generate the reconstructed samples and modified reconstructed samples based on the filter coefficients.

For example, the decoding apparatus may generate modified reconstructed samples by filtering reconstructed samples, and the filtering procedure of reconstructed samples may be performed using a filter based on filter coefficients. The picture reconstructed by the decoding apparatus may include reconstructed samples.

In an embodiment, the alternative filter information may include information on the number of alternative filters for the chroma component of the current block, absolute value information of coefficients included in alternative filters for the chroma component of the current block, and sign information of coefficients included in the alternative filters for the chroma component of the current block.

In an embodiment, the alternative filter information may include index information of the alternative filter for the chroma component of the current block, and the index information of the alternative filter may be based on truncated rice binarization.

In an embodiment, a maximum value (cMax) of the index information of the alternative filter may be equal to a value that is one less than the number of alternative filters for the chroma component of the current block, and the truncated rice binarization may be performed based on a rice parameter (cRiceParam) value of 0.

In an embodiment, bins of a bin string for index information of the alternative filter may be entropy-encoded based on a context model. The context model for the bins of the bin string with respect to the index information of the alternative filter may be determined based on a context index increment for the bins. In addition, the context index increment may be determined based on an index of a chroma component of the current block.

In an embodiment, the context index increment derived when the chroma component of the current block is cb may be different from the context index increment derived when the chroma component of the current block is cr.

In an embodiment, the image information may include information on ALF clipping, and the information on ALF clipping may include a flag indicating whether clipping is applied to the chroma component of the current block and clipping index information indicating a clipping value.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the above-described embodiments of the present document may be implemented in software form, and the encoding apparatus and/or decoding apparatus according to the present document is, for example, may be included in the apparatus that performs the image processing of a TV, a computer, a smart phone, a set-top box, a display device, etc.

When the embodiments in the present document are implemented in software, the above-described method may be implemented as a module (process, function, etc.) that performs the above-described function. A module may be stored in a memory and executed by a processor. The memory may be internal or external to the processor, and may be coupled to the processor by various well-known means. The processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in the present document may be implemented and performed on a processor, a microprocessor, a controller, or a chip. For example, the functional units shown in each figure may be implemented and performed on a computer, a processor, a microprocessor, a controller, or a chip. In this case, information on instructions or an algorithm for implementation may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (i.e., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present document is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (i.e., transmission through the Internet). In addition, a bitstream generated by the encoding method may be stored in a computer-readable recording medium or may be transmitted over wired/wireless communication networks.

In addition, the embodiments of the present document may be implemented with a computer program product according to program codes, and the program codes may be performed in a computer by the embodiments of the present document. The program codes may be stored on a carrier which is readable by a computer.

Figure 17:
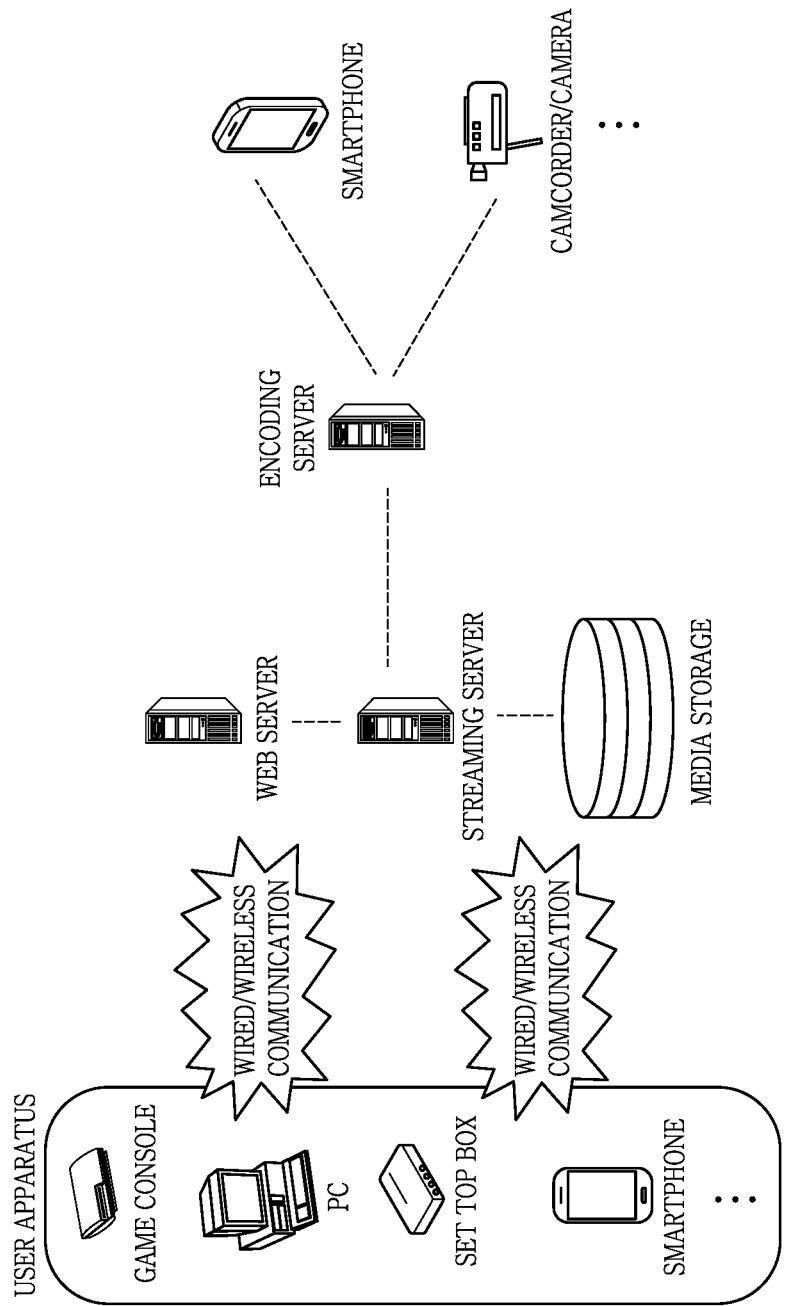
FIG. 17 shows an example of a content streaming system to which embodiments disclosed in the present disclosure may be applied.

FIG. 17 shows an example of a content streaming system to which embodiments disclosed in the present document may be applied.

Referring to FIG. 17, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

Each server in the content streaming system may be operated as a distributed server, and in this case, data received from each server may be distributed and processed.

The claims described herein may be combined in various ways. For example, the technical features of the method claims of the present document may be combined and implemented as an apparatus, and the technical features of the apparatus claims of the present document may be combined and implemented as a method. In addition, the technical features of the method claim of the present document and the technical features of the apparatus claim may be combined to be implemented as an apparatus, and the technical features of the method claim of the present document and the technical features of the apparatus claim may be combined and implemented as a method.

What is claimed is:

1. An image decoding method performed by a decoding apparatus, the method comprising:

obtaining image information including prediction related information, residual information and adaptive loop filter (ALF) information from a bitstream;

deriving prediction samples of a current block based on the prediction related information;

deriving residual samples of the current block based on the residual information;

generating reconstructed samples of the current block based on the prediction samples and the residual samples;

deriving filter coefficients for an ALF based on the ALF information; and performing an adaptive loop filter (ALF) process on the reconstructed samples to generated modified reconstructed samples of the current block based on the filter coefficients, wherein the image information includes index information of an alternative filter for a chroma component of the current block, wherein the ALF information includes alternative filter information for the chroma component of the current block including information on a number of alternative filters for the chroma component of the current block, wherein based on the information on the number of the alternative filters for the chroma component of the current block, the alternative filter information includes absolute value information of coefficients included in alternative filters for the chroma component of the current block and sign information of coefficients included in the alternative filters for the chroma component of the current block, wherein the index information of the alternative filter is based on truncated rice binarization, wherein bins of a bin string for the index information of the alternative filter are entropy-decoded based on a context model, wherein the context model for the bins of the bin string related to the index information of the alternative filter is determined based on a context index increment for the bins, and wherein the context index increment is determined based on the chroma component of the current block.

2. The method of claim 1, wherein a maximum value (cMax) of the index information of the alternative filter is equal to a value that is one less than the number of the alternative filters for the chroma component of the current block, and wherein the truncated rice binarization is performed based on a value of a rice parameter (cRiceParam) value being 0.

3. The method of claim 1, wherein the context index increment derived based on the chroma component of the current block being cb is different from the context index increment derived based on the chroma component of the current block being cr.

4. The method of claim 1, wherein the image information includes information on ALF clipping, and wherein the information on the ALF clipping includes a flag related to whether clipping is applied to the chroma component of the current block and clipping index information related to a clipping value.

5. An image encoding method performed by an encoding apparatus, the method comprising:

deriving prediction samples of a current block;

deriving residual samples of the current block based on the prediction samples;

generating reconstructed samples based on the prediction samples and the residual samples
generating residual information based on the residual samples;
deriving filter coefficients for an adaptive loop filter (ALF) for the reconstructed samples;
generating ALF information based on the filter coefficients; and
encoding image information including the residual information and the ALF information,
wherein the image information includes index information of an alternative filter for a chroma component of the current block,
wherein the ALF information includes alternative filter information for the chroma component of the current block including information on a number of alternative filters for the chroma component of the current block,
wherein based on the information on the number of the alternative filters for the chroma component of the current block, the alternative filter information includes absolute value information of coefficients included in alternative filters for the chroma component of the current block and sign information of coefficients included in the alternative filters for the chroma component of the current block,
wherein the index information of the alternative filter is based on truncated rice binarization,
wherein bins of a bin string for the index information of the alternative filter are entropy-encoded based on a context model,
wherein the context model for the bins of the bin string related to the index information of the alternative filter is determined based on a context index increment for the bins, and
wherein the context index increment is determined based on the chroma component of the current block.

6. The method of claim 5, wherein a maximum value (cMax) of the index information of the alternative filter is equal to a value that is one less than the number of the alternative filters for the chroma component of the current block, and
wherein the truncated rice binarization is performed based on a value of a rice parameter (cRiceParam) value being 0.

7. The method of claim 5, wherein the context index increment derived based on the chroma component of the current block being cb is different from the context index increment derived based on the chroma component of the current block being cr.

8. The method of claim 5, wherein the image information includes information on ALF clipping, and
wherein the information on ALF clipping includes a flag related to whether clipping is applied to the chroma component to which an alternative filter of the current block is applied and clipping index information related to a clipping value.

9. A non-transitory computer-readable storage medium storing a bitstream generated by a method, wherein the method comprises: \
deriving prediction samples of a current block;
deriving residual samples of the current block based on the prediction samples;
generating reconstructed samples based on the prediction samples and the residual samples
generating residual information based on the residual samples;
deriving filter coefficients for an adaptive loop filter (ALF) for the reconstructed samples;
generating ALF information based on the filter coefficients; and
encoding image information including the residual information and the ALF information,
wherein the image information includes index information of an alternative filter for a chroma component of the current block,
wherein the ALF information includes alternative filter information for the chroma component of the current block including information on a number of alternative filters for the chroma component of the current block,
wherein based on the information on the number of the alternative filters for the chroma component of the current block, the alternative filter information includes absolute value information of coefficients included in alternative filters for the chroma component of the current block and sign information of coefficients included in the alternative filters for the chroma component of the current block,
wherein the index information of the alternative filter is based on truncated rice binarization,
wherein bins of a bin string for the index information of the alternative filter are entropy-encoded based on a context model,
wherein the context model for the bins of the bin string related to the index information of the alternative filter is determined based on a context index increment for the bins, and
wherein the context index increment is determined based on the chroma component of the current block.

* * * * *